United States Patent
Kremin et al.

(10) Patent No.: US 10,579,849 B2
(45) Date of Patent: Mar. 3, 2020

(54) METHODS AND SENSORS FOR MULTIPHASE SCANNING IN THE FINGERPRINT AND TOUCH APPLICATIONS

(71) Applicant: Cypress Semiconductor Corporation, San Jose, CA (US)

(72) Inventors: Viktor Kremin, Lviv (UA); Spartak Mankovskyy, Lviv (UA); Roman Ogirko, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 227 days.

(21) Appl. No.: 15/487,210

(22) Filed: Apr. 13, 2017

(65) Prior Publication Data

US 2017/0351897 A1    Dec. 7, 2017

Related U.S. Application Data

(63) Continuation of application No. 14/671,129, filed on Mar. 27, 2015, now Pat. No. 9,639,733.

(60) Provisional application No. 62/084,036, filed on Nov. 25, 2014.

(51) Int. Cl.
   *G06K 9/00* (2006.01)
   *G06F 3/044* (2006.01)

(52) U.S. Cl.
   CPC .......... *G06K 9/0002* (2013.01); *G06F 3/044* (2013.01); *G06K 9/00033* (2013.01)

(58) Field of Classification Search
   None
   See application file for complete search history.

(56) References Cited

U.S. PATENT DOCUMENTS

| 5,432,779 A | 7/1995 | Shimo et al. |
| 5,940,526 A | 8/1999 | Setlak et al. |
| 8,031,094 B2 | 10/2011 | Hotelling et al. |
| 8,120,591 B2 | 2/2012 | Krah et al. |
| 8,493,331 B2 | 7/2013 | Krah et al. |
| 8,723,827 B2 | 5/2014 | Wright et al. |

(Continued)

FOREIGN PATENT DOCUMENTS

| CN | 103870817 A | 6/2014 |
| TW | 201337782 A | 9/2013 |

(Continued)

OTHER PUBLICATIONS

"MTCH6301 Projected Capacitive Touch Controller", Microchip Technology Inc., dated Mar. 2014; 40 pages.

(Continued)

*Primary Examiner* — Fred H Hu

(57) ABSTRACT

Techniques for multi-phase scanning based on pseudo-random sequences in capacitive fingerprint applications are described herein. In an example embodiment, a method performed by a processing device comprises: receiving measurements that are representative of a portion of a finger on a capacitive fingerprint sensor array, where the measurements are obtained from sensor elements of the capacitive fingerprint sensor array that are scanned in a multi-phase mode based on an excitation vector generated from a pseudo-random sequence; and generating a fingerprint image for the portion of the finger based on the measurements.

20 Claims, 25 Drawing Sheets

(56) References Cited

U.S. PATENT DOCUMENTS

| | | |
|---|---|---|
| 8,729,911 B2 | 5/2014 | Maharyta et al. |
| 8,810,537 B2 | 8/2014 | Yousefpor et al. |
| 8,860,682 B1 | 10/2014 | Kremin et al. |
| 9,164,641 B1 | 10/2015 | Rowe |
| 2002/0156593 A1 | 10/2002 | Hayes et al. |
| 2009/0153152 A1 | 6/2009 | Maharyta et al. |
| 2009/0237374 A1 | 9/2009 | Li et al. |
| 2011/0115729 A1 | 5/2011 | Kremin et al. |
| 2011/0163992 A1 | 7/2011 | Cordeiro et al. |
| 2011/0273398 A1 | 11/2011 | Ho et al. |
| 2012/0182253 A1 | 7/2012 | Brosnan |
| 2013/0021294 A1 | 1/2013 | Maharyta et al. |
| 2013/0177220 A1 | 7/2013 | Erhart et al. |
| 2014/0333328 A1 | 11/2014 | Nelson et al. |

FOREIGN PATENT DOCUMENTS

| | | | |
|---|---|---|---|
| WO | 2014021918 A1 | 2/2014 | |
| WO | WO-2014021918 A1 * | 2/2014 | ............. G06F 3/044 |

OTHER PUBLICATIONS

"TouchPath™ Capacitive Touch Screen Controller", TSC3060, Texas Instruments, dated Jan. 2013; 49 pages.
International Search Report for International Application No. PCT/US2015/050871 dated Feb. 18, 2015; 2 pages.
USPTO Non-Final Rejection for U.S. Appl. No. 14/671,129 dated Jun. 23, 2015; 18 pages.
USPTO Non-Final Rejection for U.S. Appl. No. 14/671,129 dated Aug. 25, 2016; 17 pages.
USPTO Non-Final Rejection for U.S. Appl. No. 14/671,129 dated Dec. 11, 2015; 20 pages.
USPTO Notice of Allowance for U.S. Appl. No. 14/671,129 dated Jan. 5, 2017; 7 pages.
USPTO Notice of Allowance for U.S. Appl. No. 14/671,129 dated Apr. 27, 2016; 7 pages.
Written Opinion of the International Searching Authority for International Application No. PCT/US2015/050871 dated Dec. 18, 2015; 6 pages.
SIPO Office Action for Application No. 201580001070.1 dated May 14, 2018; 10 pages.

* cited by examiner

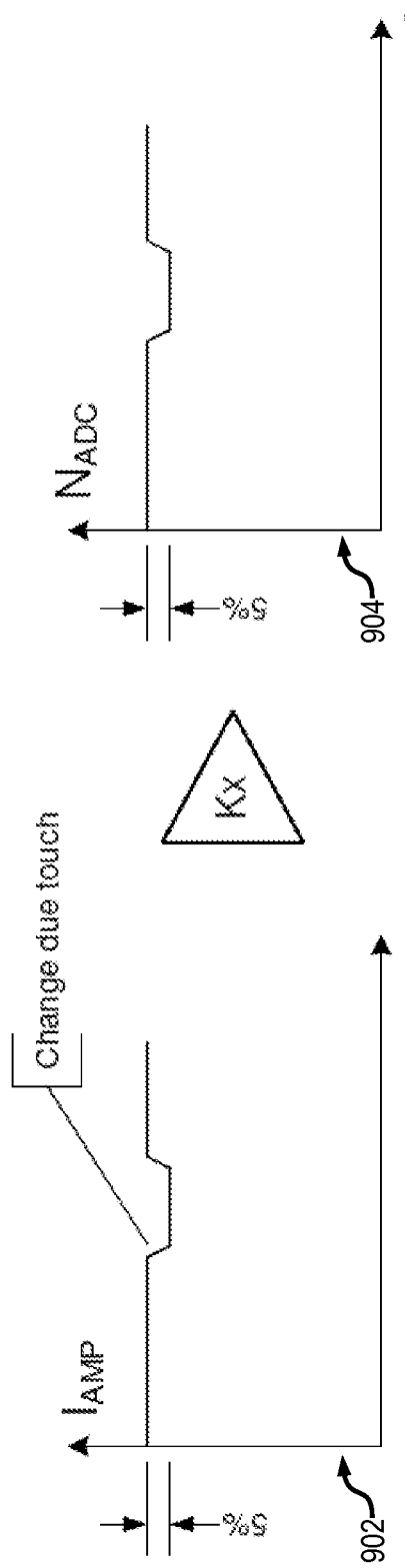
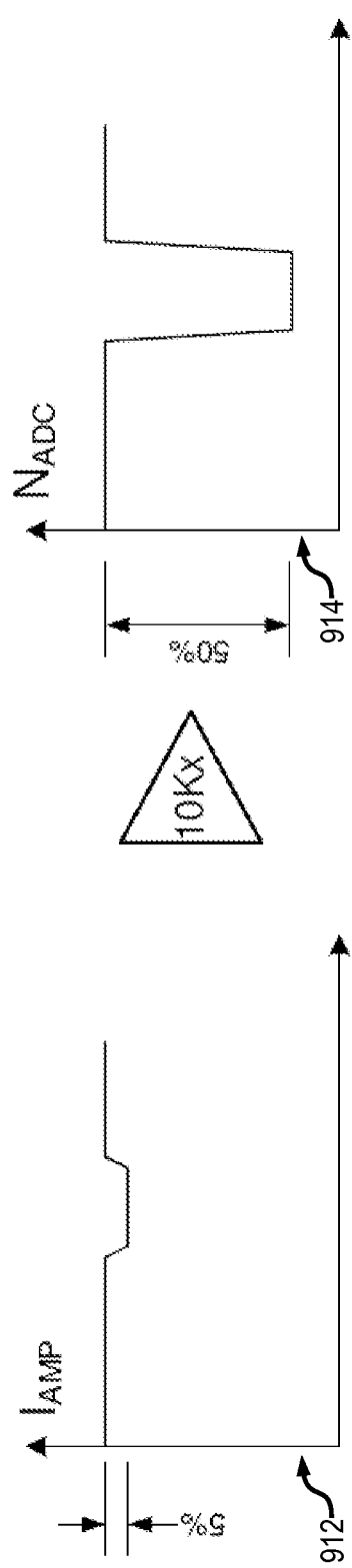
FIG. 9A
FIG. 9B

METHODS AND SENSORS FOR MULTIPHASE SCANNING IN THE FINGERPRINT AND TOUCH APPLICATIONS

PRIORITY

This application is a Continuation of U.S. patent application Ser. No. 14/671,129, filed Mar. 27, 2015, which claims the benefit of U.S. Provisional Patent Application No. 62/084,036, filed Nov. 25, 2014, all of which are incorporated by reference herein in their entirety.

TECHNICAL FIELD

This disclosure generally relates to the field of capacitive fingerprint devices and, in particular, to processing data acquired from capacitive fingerprint sensor arrays.

BACKGROUND

Some computing devices, such as notebook computers, personal digital assistants, mobile communication devices (e.g., such as smartphones, cellphones, tablets, etc.), and others, may include user interface devices configured to use fingerprint sensors to acquire a fingerprint image from a user and, typically, to perform some operation or action based on the acquired fingerprint image. One type of such user interface device is a touch input device that operates a fingerprint sensor by way of capacitance sensing. For example, a touch input device may include a capacitive fingerprint sensor comprising an array of capacitive sensor elements. Capacitive sensing typically involves scan operations that periodically measure changes in capacitance associated with the capacitive sensor elements to determine presence, position, and/or other characteristics of a conductive object (e.g., such as a user's finger, stylus, etc.) relative to the sensing surface of a capacitive sensor.

The structure and operation of capacitive fingerprint sensors differ from other, common capacitive sensors (e.g., such as touch-screen sensors) in at least several aspects. For example, the active area of a capacitive fingerprint sensor is one to two orders of magnitude (e.g., typically about 100 times) smaller than the active area of a typical capacitive touch-screen sensor, and the number of sensor elements in a capacitive fingerprint sensor is about an order of magnitude less than the number of sensor elements in a capacitive touch-screen sensor. Further, the strength of a fingerprint signal acquired by a capacitive fingerprint sensor is two to three orders of magnitudes smaller than a signal acquired by a typical capacitive touch-screen sensor, thereby requiring extremely sensitive and low-noise circuitry in order to capture a usable fingerprint image. Thus, acquiring and processing fingerprint image data from capacitive fingerprint sensors poses some unique challenges that are not necessarily (if at all) addressed by techniques developed for typical capacitive sensors (e.g., such as touch-screen sensors).

BRIEF DESCRIPTION OF THE DRAWINGS

FIG. 9A illustrates a dynamic signal range without hardware baseline compensation, according to an example embodiment.

FIG. 9B illustrates a dynamic signal range with hardware baseline compensation, according to an example embodiment in comparison with the embodiment of FIG. 9A.

DETAILED DESCRIPTION

Figure 1:
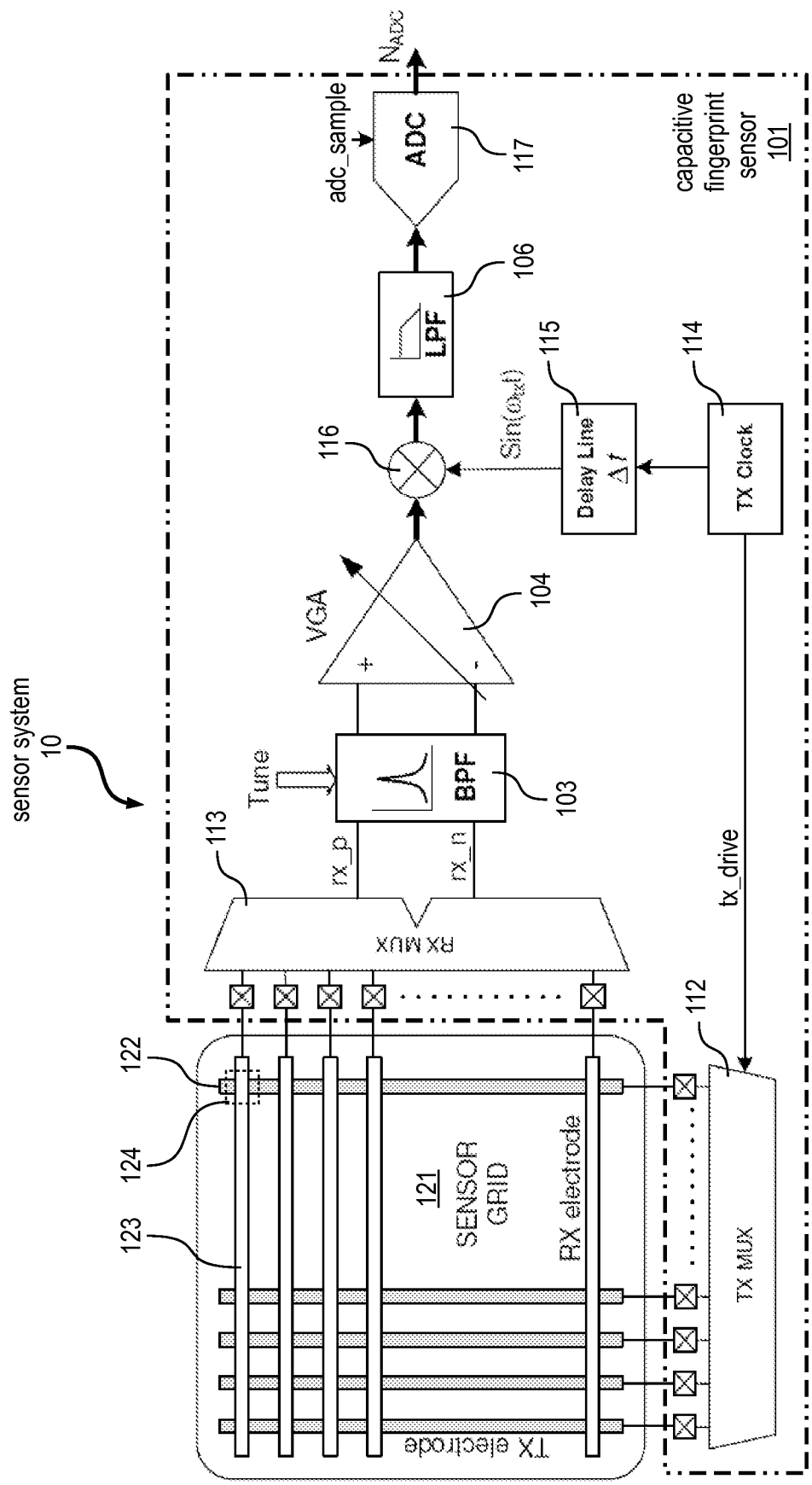
FIG. 1 illustrates an embodiment of an example sensor system according to some of the techniques described herein.

The following description sets forth numerous specific details such as examples of specific systems, components, methods, and so forth, in order to provide a good understanding of various embodiments of the techniques described herein for multi-phase mode scanning in capacitive fingerprint and touch applications. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment", "one embodiment", "an example embodiment", "some embodiments", and "various embodiments" means that a particular feature, structure, or characteristic described in connection with the embodiment(s) is included in at least one embodiment of the invention. Further, the appearances of the phrases "an embodiment". "one embodiment", "an example embodiment", "some embodiments", and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Overview

Described herein are various embodiments of techniques for multi-phase scanning in capacitive fingerprint and touch applications that use capacitive sensor arrays. In some embodiments, a capacitive sensor array (grid) includes transmit (TX) and receive (RX) electrodes that are interdigitated or intersecting with each other (e.g., in the same or multiple layers of the array) but while maintaining electrical insulation from each other. As used herein, "sensor element" refers to a discrete unit or location area (e.g., adjacency) of electrode(s) from which a measurement or signal can be obtained that is separate and distinct from measurements/signals obtained from other units or location areas in the capacitive sensor array.

A capacitive touch (e.g., touch-screen) sensor array refers to a capacitive sensor array that is configured with sensor elements suitable for detecting, determining positions of, and/or tracking contacts from conductive objects (e.g., a stylus, user's finger(s), etc.) on a touch-sensing surface (e.g., such as a touch-screen or touch pad). A capacitive fingerprint sensor array refers to a capacitive sensor array that is configured with sensor elements that can produce signals suitable for generating a fingerprint image of at least a portion of a user's finger. As used herein, "fingerprint image" refers to a set of data values that represents a fingerprint in digital format. In some embodiments, a fingerprint image may be a dataset that visually represents the valleys and ridges of a fingerprint with their arches, loops, and whorls; examples of such datasets include, without limitation, grayscale heatmaps, surface plots, etc. In other embodiments, a fingerprint image may be a dataset that digitally represents a fingerprint in a non-visual form—e.g., such as a data structure with data values from which a visual representation of the fingerprint may be obtained after further processing or which may be used by various fingerprint processing operations.

Measurements and measurement signals may be obtained from a capacitive sensor array in scan operations. A scan operation is performed in "multi-phase" mode when, during a given drive and/or sense period (e.g., slot) of the scan operation, multiple electrodes of the capacitive sensor array are driven and/or sensed concurrently (e.g., based on signals that differ in phase and/or polarity from each other). Multi-phase TX (MPTX) sensing is one example of a multi-phase scan mode. In MPTX sensing, multiple TX electrodes are energized (driven) concurrently, and a balanced TX driver with a multiplexer may be used to drive the several TX electrodes at the same time. For instance, in MPTX scan mode, multiple TX electrodes of a capacitive sensor array may be driven by corresponding multiple signals that have substantially the same magnitude (e.g., voltage, current, etc.) but have opposing polarities (e.g., such as a pair of inverted and non-inverted signals). Multi-phase RX (MPRX) sensing is another example of a multi-phase scan mode. In MPRX sensing, multiple RX electrodes are coupled (e.g., connected) to a receiver concurrently, and one or more differential RX receivers and multiplexers may be used to sense several RX electrodes at the same time. For instance, in MPRX scan mode, output signals having different phases (e.g., polarities) from one or more RX electrodes may be convoluted into a single signal that is acquired from the capacitive sensor array. A scan operation on a capacitive sensor array is performed in "fully-differential" (also referred to as "zero-sum") mode if the magnitudes (and possibly the phases) of the multiple signals in a multi-phase scan mode sum up substantially to zero. For example, a scan operation is performed in fully-differential mode if the number of electrodes driven by a given (e.g., positive) signal is equal to the number of electrodes driven by the inverted (e.g., negative) signal, so the net sum of the drive signals' magnitudes is substantially zero (e.g., the positive and negative charge applied by multi-phase drive signals cancel each other out).

In an example embodiment, a method for generating a fingerprint image comprises: receiving, by a processing device, measurements that are representative of a finger on a capacitive fingerprint sensor array, where the measurements are obtained from sensor elements of the array that are scanned in a fully-differential multi-phase mode; and generating, by the processing device, the fingerprint image for the finger based on the measurements. In an example aspect of this embodiment, generating the fingerprint image comprises generating an excitation matrix and an output signal matrix, where the excitation matrix represents polarities of control signals applied to multiplex multiple (TX/RX) electrodes of the sensor elements and the output signal matrix represents the obtained measurements. In an example aspect of this embodiment, generating the fingerprint image may comprise reducing the excitation matrix by one row and one column to obtain an inverse matrix (it is noted, however, that the actual excitation is performed without reducing the excitation matrix), reducing the output signal matrix by one row, and generating a recovered image matrix representing the fingerprint image by concatenating one row of constants to a multiplication product of the output signal matrix and an inverse matrix of the excitation matrix. In another example aspect of this embodiment, generating the fingerprint image comprises: generating an excitation matrix based on a pseudorandom sequence and an autocorrelation function; generating an output signal matrix based on the plurality of measurements; and generating a recovered image matrix representing the fingerprint image based on a multiplication product of the output signal matrix and a transpose matrix of the excitation matrix.

In an example embodiment, a device for generating a fingerprint image comprises a sequencer, a differential receiver, and a deconvolution engine. The sequencer is configured to control scanning of a capacitive fingerprint sensor array in a fully-differential multi-phase mode. The differential receiver is configured to receive measurement signals that are representative of a finger on the capacitive fingerprint sensor array. The deconvolution engine is configured to generate a fingerprint image for the finger based on the measurements. In an example aspect of this embodiment, the sequencer may comprise a transmit (TX) control circuit configured to control multiplexing of drive signals to multiple TX electrodes of the capacitive fingerprint sensor array, and a receive (RX) control circuit configured to control multiplexing of output signals from multiple RX electrodes of the capacitive fingerprint sensor array to the differential receiver. In an example aspect of this embodiment, the differential receiver may comprise: a differential amplifier configured to receive the measurement signals from receive (RX) electrodes of the capacitive fingerprint sensor array; a quadrature demodulator coupled to the differential amplifier and configured to generate pairs of phase-shifted signals based on output from the differential amplifier; and a pair of analog-to-digital converters (ADCs) configured to generate I-component digital values and Q-component digital values based on the pairs of phase-shifted signals. In an example aspect of this embodiment, the deconvolution engine may comprise one or more hardware circuits that are configured at least to: reduce an excitation matrix by one row and one column; reduce an output signal matrix by one row; and generate a recovered image matrix representing the fingerprint image by concatenating one row of constants to a multiplication product of the output signal matrix and an inverse matrix of the excitation matrix.

In an example embodiment, a system comprises a processing device that is coupled to a capacitive fingerprint sensor array. The processing device is configured to scan the capacitive fingerprint sensor array in a fully-differential multi-phase mode, to receive measurements that represent a finger on the capacitive fingerprint sensor array, and to generate a fingerprint image for the finger based on the measurements. In an example aspect of this embodiment, to generate the fingerprint image the processing device is configured at least to: generate an excitation matrix that represents polarities of control signals applied to multiplex multiple electrodes of the capacitive fingerprint sensor array, and reduce the excitation matrix by one row and one column; generate an output signal matrix that represents the measurements, and reduce the output signal matrix by one row; and generate a recovered image matrix representing the fingerprint image by concatenating one row of constants to a multiplication product of the output signal matrix and an inverse matrix of the excitation matrix. In an example aspect of this embodiment, the capacitive fingerprint sensor array comprises multiple electrodes disposed at a pitch between 0.05 mm and 0.07 mm.

Various embodiments of the techniques for multi-phase scanning described herein provide significant improvements with respect to one or more of the following:
1) the techniques described herein provide new methods for reconstruction of fingerprint images by using reduced equations sets, which allows for obtaining a fingerprint image by using zero-sum MPTX excitation sequences, zero-sum MPRX excitation sequences, and combined zero-sum MPTX/MPRX sequences;
2) the techniques described herein provide for hardware baseline compensation circuits, which allow for improving the receiver channel's useful signal dynamic range when using non-zero sum MPTX and/or MPRX sequences;
3) the techniques described herein provide for sensing grid reference electrodes, which allows the use of non-zero sum MPRX sequences with noise cancellation performance that is comparable to the noise cancellation of the zero-sum MPRX sequences;
4) the techniques described herein provide for compensation sensing grid electrodes, which allows the use of non-zero sum MPTX sequences with a dynamic range of the sensing channel that is comparable to the dynamic range of the sensing channel used for zero-sum MPTX sequences;
5) the techniques described herein provide for a method of eliminating the differential amplifier gain imbalance, which allows the use of lower-cost sensing hardware that avoids additional trim and with performance that is comparable to the performance of more expensive, higher quality amplifiers;
6) the techniques described herein provide for a method of RX output signal deconvolution by using pseudorandom sequences that use only multiplication by factor of ±1 and lower cost deconvolution engine without hardware multipliers;
7) the techniques described herein provide for a method of baseline compensation that improves image quality, especially when used with zero-sum MPTX/MPRX sensing techniques.

Multi-Phase Signal Deconvolution Basics

Conventional methods for signal deconvolution typically use multiplication on an inverse of the excitation matrix based on which a drive or output signal was convoluted. Thus, such conventional methods for signal deconvolution work only with excitation sequences that have non-zero sums. However, such conventional methods do not work for an excitation matrix based on zero-sum sequences because the excitation matrix in this case has a singularity and consequently any measurement signals cannot be deconvoluted to obtain signal values for all sensor elements that were part of the convolution. As a result, there are no known conventional methods for fingerprint image reconstruction based on fully-differential zero-sum MPRX sequences, fully-differential zero-sum MPTX excitation sequences, or their combination.

The techniques for multi-phase scanning described herein address these problems and shortcomings of the conventional signal deconvolution methods by providing novel methods, devices, and systems for capacitive sensor array scanning and fingerprint image reconstruction. In some embodiments, the techniques described herein allow for reconstructing a detected/unknown fingerprint image by using fully-differential zero-sum excitation sequences for driving TX electrodes, fully-differential zero-sum sequences for sensing RX electrodes, and/or by a combination of such sequences. In various embodiments, the techniques described herein provide novel methods for mathematical image reconstruction, novel electrode arrangements for capacitive fingerprint sensor arrays, and novel hardware baseline compensation circuits.

For example, the techniques described herein address the problems caused by common mode noise (e.g., noise coming from a charger or from AM transmitters) in capacitive fingerprint or touch applications. In some embodiments, such common mode noise could be virtually eliminated when differential scanning is used according to the techniques described herein since the same noise signal is applied to both of the differential amplifier inputs. In another example, using fully-differential multi-phase mode to drive the TX electrodes according to the techniques described herein allows for eliminating the non-informative baseline capacitances of the sensor array elements since a measurement signal acquired at the differential receiver represents only to the capacitance differences caused by the features (e.g., ridges and valleys) of the fingerprint. Since the baseline component of the output measurement signal does not provide any useful information for the sensing circuits and reduces their dynamic range, by performing baseline compensation the fully-differential, multi-phase mode scanning techniques described herein do not require the use of higher channel gain settings and prevent increase of the impact of the conversion circuit quantization noise.

Example Operational Contexts

Conventional capacitive fingerprint sensing techniques do not provide hardware that supports multi-phase mode scanning. For example, such conventional fingerprint sensing techniques do not provide TX and RX multiplexers that support multiple electrodes' connection to the same drive or sense buses. In contrast, the multi-phase scanning techniques described herein provide for fully-differential multi-phase scanning with baseline compensation and multiphase support, both for the TX and RX sides of a scan operation. In various embodiments this can be accomplished by a combination of the special sensors and/or processing devices, hardware, hardware acceleration elements, and special image reconstruction processing methods.

FIG. 1 is a block diagram illustrating an embodiment of an example sensor system according to some of the techniques described herein that may rely on non-zero sum excitation sequences. In the embodiment illustrated in FIG. 1, sensor system 10 includes capacitive fingerprint sensor array (or sensor grid) 121 coupled to capacitive fingerprint sensor 101 that is configured for acquiring fingerprint images from the sensor array 121. In other embodiments of the techniques described herein that are directed to a touch application, a sensor system may include a capacitive touch sensor array that is coupled to a capacitive touch sensor configured to detect, track, and/or compute position coordinates of contact(s) on the touch sensor array.

Capacitive fingerprint sensor array 121 includes a grid of N receive (RX) electrodes and M transmit (TX) electrodes. For example, capacitive fingerprint sensor array 121 includes TX electrode 122 and RX electrode 123, which are electrically insulated from each other and from the rest of the TX and RX electrodes disposed in the array. The TX and RX electrodes of capacitive fingerprint sensor array 121 are arranged so that each TX electrode may be capacitively coupled with each of the RX electrodes at a corresponding sensor element. For example, sensor element 124 is formed at the location area of sensor array 121 where TX electrode 122 intersects the location of RX electrode 123. Each of the TX electrodes in sensor array 121 is coupled to capacitive fingerprint sensor 101 through TX multiplexer 112, and each of the RX electrodes is coupled to the capacitive fingerprint sensor through RX multiplexer 113.

In various embodiments, a capacitive fingerprint sensor (e.g., such as sensor 101 in FIG. 1) may be configured to use mutual capacitance sensing to acquire output signals, and to generate digital values (e.g., such as counts) that represent mutual capacitances caused by a portion of a user's finger on the sensor elements of a capacitive fingerprint sensor array (e.g., such as sensor array 121 in FIG. 1). With mutual capacitance sensing, one set of electrodes (e.g., such as the column electrodes) of the sensor array are designated as TX electrodes. The TX electrodes are driven with TX drive signals that are applied to the TX electrodes by a TX multiplexer. Another set of electrodes (e.g., such as the row electrodes) of the sensor array are designated as RX electrodes that may intersect, but are electrically insulated from, the TX electrodes. Because of the capacitive coupling between the TX electrodes and the RX electrodes, a TX drive signal applied to a TX electrode induces a current within each of the RX electrodes. Thus, the output signals from the RX electrodes represent the mutual capacitances of the sensor elements formed by the TX and the RX electrodes. The output signals from the RX electrodes may be measured by sampling and then the samples may be converted to digital values (e.g., counts). The digital values representing the mutual capacitances of all the sensor elements of the capacitive fingerprint sensor array allow a sensor or a processing device to reconstruct a fingerprint image of the user's finger (or a portion thereof) in accordance with the techniques described herein. The fingerprint image may then be used by the processing device or by a separate host-based application to perform some action or operation—e.g., such as comparing the acquired fingerprint image to images in a fingerprint database in order to allow/deny access to the user or to authenticate the user.

In FIG. 1, capacitive fingerprint sensor 101 is implemented as an analog frond end block configured to interact with sensor array 121 and to provide analog signal processing (e.g. such as amplification, integration, and conversion to digital values). Capacitive fingerprint sensor 101 includes band-pass filter (BPF) 103, variable-gain differential amplifier (VGA) 104, low-pass filter (LPF) 106, TX multiplexer 112, RX multiplexer 113, signal generator 114, programmable delay element 115, mixer 116, and analog-to-digital converter (ADC) 117. In various embodiments, the output of ADC 117 may be coupled to a processing logic or device (not shown in FIG. 1), which may be implemented on the same integrated circuit (IC) chip/module as capacitive fingerprint sensor 101 or on a different chip/module.

Signal generator 114 uses a clock-driven signal to produce TX drive signals that are applied to the TX electrodes of capacitive fingerprint sensor array 121 through TX multiplexer 112. In some embodiments, signal generator 114 may include a set of switches that operate according to a clock signal, where the switches may generate the TX drive signals by periodically connecting the output of signal generator 114 to one or more voltage sources. The output of signal generator 114 is coupled to TX multiplexer 112, which allows the TX drive signal(s) to be applied sequentially to each of the M TX electrodes of capacitive fingerprint sensor array 121 in a controlled sequence.

The TX drive signals applied to the TX electrodes in capacitive fingerprint sensor array 121 capactively induce output signals in the RX electrodes of the sensor array. The outputs of the RX electrodes are coupled to RX multiplexer 113, which allows the output signals from one or more RX electrodes to be multiplexed to the inputs of BPF 103. BPF 103 is coupled to the outputs of RX multiplexer 113 to receive the output signals and is configured to filter out undesired (e.g., noise) components of the output signals. The inputs of VGA 104 are coupled to the outputs of BPF 103, which allows VGA 104 to receive and process the filtered output signals and to generate an amplified output signal.

An input of mixer 116 is coupled to the output of VGA 104 to receive the amplified output signal. Mixer 116 is also coupled to programmable delay element 115 to receive a delay line signal. Mixer 116 is configured to operate as a synchronous detector, where the synchronous detector's reference signal is based on the amplified output signal received from VGA 104 and the delay line signal is used to achieve maximum signal at the synchronous detector output, as the synchronous detector itself is a phase selective circuit. LPF 106 is coupled to the output of mixer 116 to receive the maximized mixer output signal and is configured to filter out the high-frequency carrier products caused by the TX drive signal. ADC 117 is coupled to the output of LPF 106 and is configured to sample the output signal from LPF 106 into a digital value (e.g., a count $N_{ADC}$). Firmware or a sequencer may then be used to transfer the generated digital value to the memory of a processing device or a host-based fingerprint application (not shown in FIG. 1) that is coupled to the output of ADC 117. In this manner, digital values can be generated to represent the mutual capacitances of the sensor elements of capacitive fingerprint sensor array 121. The generated digital values can then be used by the processing device or host-based fingerprint application to reconstruct a fingerprint image according to some embodiments of the techniques described herein.

Figure 2A:
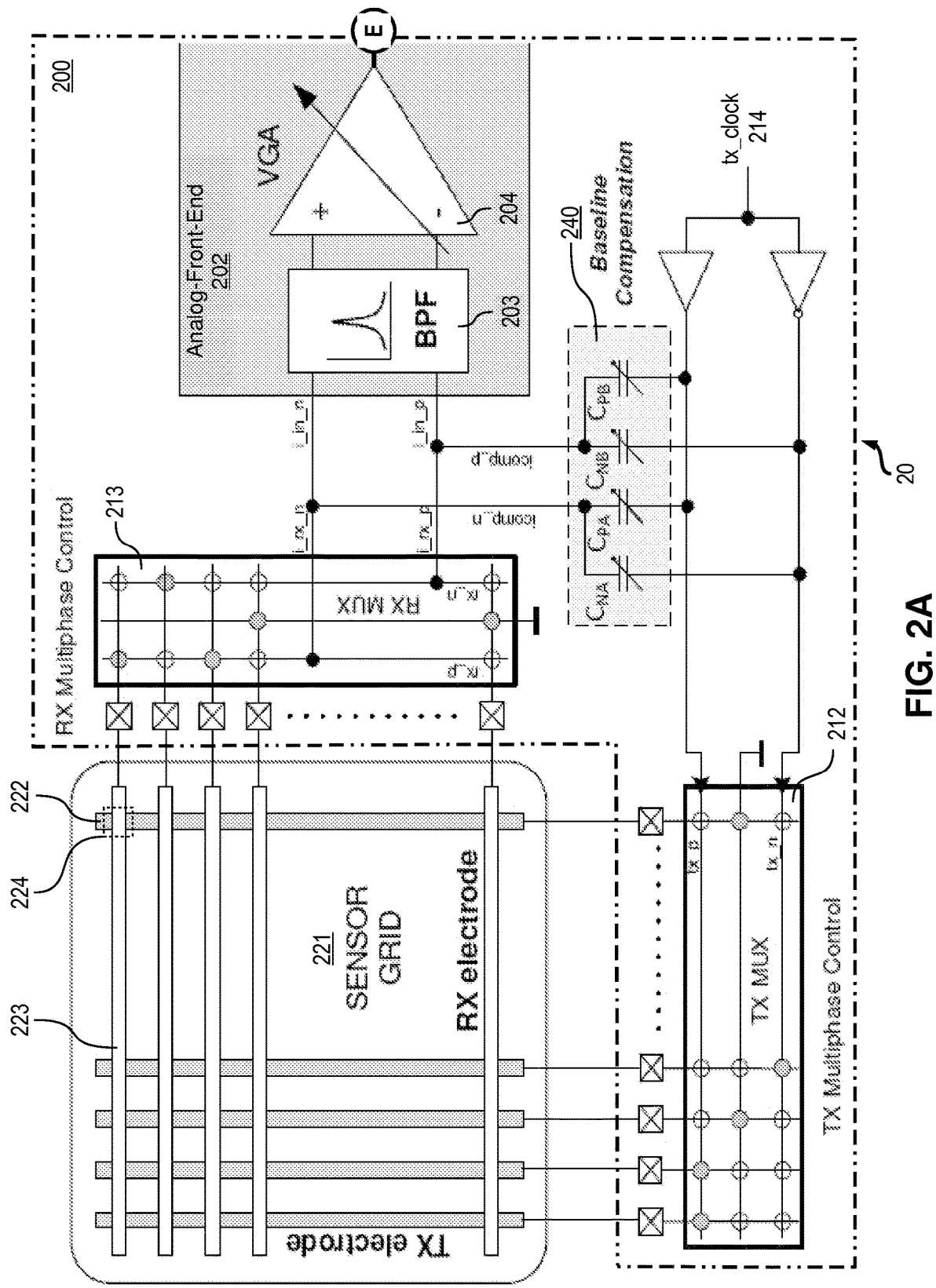
FIGS. 2A and 2B show partial views that together form a single complete view illustrating an embodiment of an example sensor system according to some of the techniques described herein.
Figure 2B:
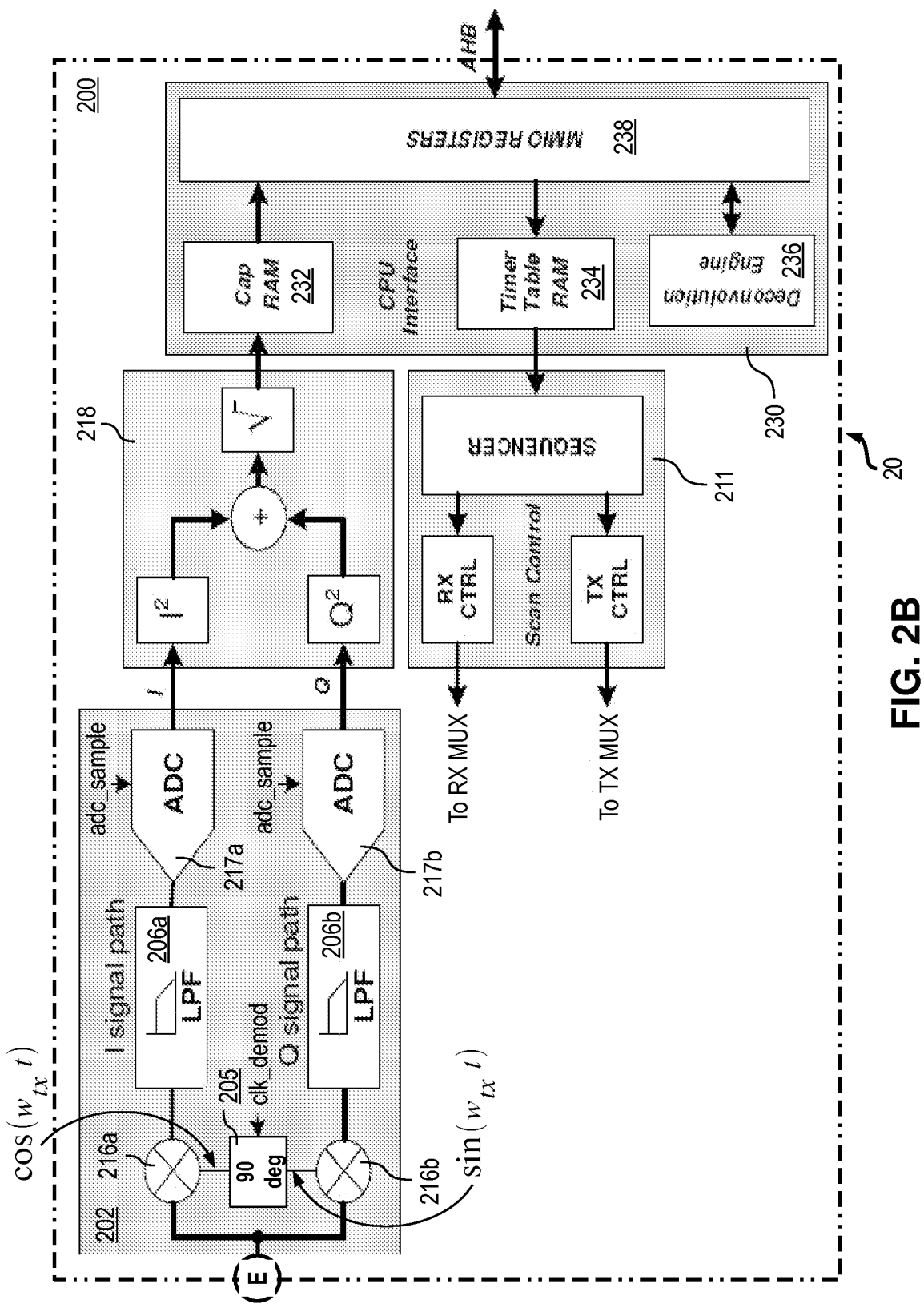

FIGS. 2A and 2B show partial views that together form a single complete view illustrating an embodiment of an example sensor system according to some of the techniques described herein. The partial views in FIGS. 2A and 2B are joined together along edge "E" to form the complete view of sensor system 20. In the embodiment illustrated in FIGS. 2A and 2B, sensor system 20 includes capacitive fingerprint sensor array (or sensor grid) 221 coupled to processing device 200 that is configured for acquiring fingerprint images from sensor array 221.

Similarly to sensor array 121 in FIG. 1, capacitive fingerprint sensor array 221 in FIG. 2A includes a grid of N receive (RX) electrodes and M transmit (TX) electrodes. For example, capacitive fingerprint sensor array 221 includes TX electrode 222 and RX electrode 223, which are electrically insulated from each other and from the rest of the TX and RX electrodes disposed in the array. The TX and RX electrodes of capacitive fingerprint sensor array 221 are arranged so that each TX electrode may be capacitively coupled with each of the RX electrodes at a corresponding sensor element. For example, sensor element 224 is formed at the location area of sensor array 221 where TX electrode 222 intersects the location of RX electrode 223. Each of the TX electrodes in sensor array 221 is coupled to processing device 200 through TX multiplexer 212, and each of the RX electrodes is coupled to the processing device through RX multiplexer 213.

Similarly to sensor array 121 in FIG. 1, the TX and RX electrodes in capacitive fingerprint sensor array 221 in FIG. 2A are arranged and configured to acquire a fingerprint image from a user's finger (or a portion thereof) when the finger is in contact with the surface of the sensor array. In various embodiments, in order to acquire a usable fingerprint image, a capacitive fingerprint sensor array (e.g., such as sensor array 221) may be configured to include: an active (sensing) area in the range from 4×4 mm to 12×2 mm; a number of RX electrodes in the range from 100 to 150; TX and/or RX electrodes made of non-transparent metal material and having electrode pitch size in the range of from 0.04 mm to 0.08 mm; hardware sense elements that can detect/sense a finger-induced signal with capacitance of (approximately) 0.05 fF; and hardware timing elements that operate scan operations at a frequency in the range from 500 kHz to 30 MHz, with the sub-range of 5 MHz to 6 MHz being preferable for better skin sense. In such various embodiments, a finger contact typically covers all of the TX/RX electrodes of the capacitive fingerprint sensor array at the same time, which allows a processing device to acquire an accurate fingerprint image. Such structure and operational characteristics of a capacitive fingerprint sensor array differ substantially from the structure and operational characteristics of a typical capacitive touch (e.g., touch-screen) sensor array, which may be configured to include: an active (sensing) area of about 50×100 mm for a smartphone (and even larger active areas for tablets and laptop/notebook computers); a number of RX electrodes of about 10 to 20 depending on screen area and electrode pitch; TX and/or RX electrodes typically made of transparent (e.g., indium-tin oxide, or ITO) material and having electrode pitch size about 3 mm to 5 mm; hardware sense elements that can detect/sense a contact signal with capacitance of (approximately) 300 fF; and hardware timing elements that operate scan operations at a frequency of about 100 kHz to about 500 kHz. For a typical capacitive touch (e.g., touch-screen) sensor array, a contact from a single conductive object (e.g., user's finger or a stylus) typically covers only a small fraction of the touch-screen active area (e.g., touching 3 to 5 TX/RX electrodes at the same time), with some touch-screen applications allowing for detecting and tracking contacts from multiple conductive objects that collectively cover substantially less than all of the active area of the sensor array.

In various embodiments of the techniques described herein, a processing device (e.g., such as device 200 in FIG. 2A) may be configured to use mutual capacitance sensing to acquire output signals, and to generate digital values (e.g., such as counts) that represent mutual capacitances caused by a user's finger on the sensor elements of a capacitive fingerprint sensor array (e.g., such as sensor array 221 in FIG. 2A) that is coupled to the processing device. For example, processing device 200 may reside on a common carrier substrate such as an integrated circuit (IC) die substrate, or a multi-chip module substrate. Alternatively, the components of processing device 200 may be one or more separate integrated circuits or discrete components. In one example embodiment, processing device 200 may be a programmable system that is manufactured on a single IC die such as, for example, a device from the Programmable System on a Chip (PSoC™) family of devices, developed by Cypress Semiconductor Corporation, San Jose, Calif.

As illustrated in FIGS. 2A and 2B, processing device 200 includes analog front end 202, scan control engine 211, TX multiplexer 212, RX multiplexer 213, channel engine 218, and central processing unit (CPU) interface 230. CPU interface 230 is coupled to one or more CPUs or CPU subsystems (not shown in FIGS. 2A and 2B) over a bus (e.g., such an Advanced High-performance Bus, or AHB). In some (but not necessarily all) embodiments, processing device 200 may also include baseline compensation component 240 that is configured to perform multi-phase scanning techniques that use baseline compensation as described herein. The processing device components illustrated in the embodiment of FIGS. 2A and 2B are configured to perform the techniques for multi-phase scanning described herein. It is noted, however, that in various embodiments different processing devices may include the same and/or different components (e.g., microprocessors, microcontrollers, application-specific integrated circuits (ASICs), etc.) that may be configured in various ways to perform the techniques described herein. Thus, processing device 200 and the components thereof in FIGS. 2A and 2B are to be regarded in an illustrative rather than a restrictive sense.

Referring to FIG. 2B, scan control engine 211 includes a sequencer, a TX control circuit, and a RX control circuit. The sequencer is implemented as a programmable hardware circuit that is configured to control the frequency and other timing characteristics of scan operations on capacitive fingerprint sensor array 221. The sequencer determines the control sequence for a scan operation based on timer table 234 of CPU interface 230. The TX control circuit is configured to control multiplexing by TX multiplexer 212 (in FIG. 2A) of drive signals to multiple TX electrodes of capacitive fingerprint sensor array 221. The RX control circuit is configured to control multiplexing of output signals from multiple RX electrodes of capacitive fingerprint sensor array 221 to analog front end 202.

Referring to FIG. 2A, TX multiplexer 212 is configured to connect multiple TX electrodes to (possibly multiple) TX drive signals at the same time. TX multiplexer 212 is coupled to a signal generator (not shown) to receive TX clock signal 214. TX clock signal 214 is used to generate TX drive signals that are applied to the TX electrodes of capacitive fingerprint sensor array 221 through TX multiplexer 212. TX multiplexer 212 may include a set of (possibly programmable) switches that operate according to control signals received from the TX control circuit of scan control engine 211 (in FIG. 2B). When operated in fully-differential multi-phase scan mode, TX multiplexer 212 may concurrently apply to multiple TX electrodes three TX drive signals: a positive TX clock signal (e.g., indicated in FIG. 2A as "tx_p"), an inverted TX clock signal that has the same magnitude but the opposing polarity of the TX clock signal (e.g., indicated in FIG. 2A as "tx_n"), and a system ground signal. According to a controlled sequence generated by the sequencer in scan control engine 211, during a scan operation the positive TX clock signal ("tx_p") is applied to a number of TX electrodes, the inverted TX clock signal ("tx_n") is applied to the same number of other TX electrodes, and the system ground signal is applied to the remaining TX electrodes of capacitive fingerprint sensor array 221. When applied to the TX electrodes of the sensor array, the TX drive signals capacitively induce output signals in the RX electrodes of the sensor array.

RX multiplexer 213 is coupled to the RX electrodes of capacitive fingerprint sensor array 212 and is configured to multiplex the output signals from multiple RX electrodes at the same time to the inputs of analog front end 202. RX multiplexer 213 may include a set of (possibly programmable) polarity switching circuits that operate according to control signals received from the RX control circuit of scan control engine 211. For example, when operated in fully-differential scan mode, RX multiplexer 213 may concurrently multiplex (and/or switch the polarities of) the output signals from multiple RX electrodes according to a controlled sequence that is generated by the sequencer in scan control engine 211. In this manner, in these embodiments the output signals from the multiple RX electrodes may be convoluted into output signals with opposing polarity (e.g., indicated in FIG. 2A as "i_rx_p" and "i_rx_n").

Analog front end 202 is coupled to RX multiplexer 213 to receive the (possibly convoluted) output signals from the RX electrodes of capacitive fingerprint sensor array 221. Analog front end 202 is configured as a differential receiver and includes band-pass filter (BPF) 203, variable-gain differential amplifier (VGA) 204, phase-shifted reference signal generator 205, a pair of multipliers 216a and 216b, a pair of low-pass filters (LPFs) 206a and 206b, and a pair of simultaneously sampling analog-to-digital converters (ADCs) 217a and 217b. The inputs of BPF 203 are coupled to the outputs of RX multiplexer 213 to receive the output signals from the RX electrodes. The outputs of BPF 203 are coupled to the inverting input and the non-inverting input of VGA 204. VGA 204 is coupled to a quadrature demodulator, which includes multipliers 216a and 216b, reference signal generator 205, LPFs 206a and 206b, and ADCs 217a and 217b. Specifically, the output of VGA 204 is coupled to the signal inputs of both multipliers 216a and 216b. Each of multipliers 216a and 216b is driven by one of two reference signals that are generated by reference signal generator 205, where each reference signal is shifted at a 90-degree phase from the other. The outputs of multipliers 216a and 216b are coupled to the inputs of LPFs 206a and 206b, respectively, and LPFs 206a and 206b are configured to remove the high-frequency components from their respective input signals. The outputs of LPFs 206a and 206b are coupled to the inputs of ADCs 217a and 217b, respectively, and ADCs 217a and 217b are configured to simultaneously sample their respective inputs and to generate respective digital values (e.g., counts). The digital values generated by ADCs 217a and 217b respectively represent the phase-shifted, filtered I-component and Q-component of the output signal from VGA 204.

The outputs of analog front end 202 (e.g., the outputs of ADCs 217a and 217b) are coupled to the inputs of channel engine 218. Thus, channel engine 218 is configured to receive the digitized I-component and Q-component values from ADCs 217a and 217b. Channel engine 218 includes: a pair of hardware blocks configured to square the I-component and Q-component values, respectively; a summing block configured to integrate the squared I-component and Q-component values; and a hardware calculation block configured to compute the square root from the integration sum of the squared I-component and Q-component values, where the square root is a digital value that represents the mutual capacitance of a given/known sensor element of capacitive fingerprint sensor array 221. The result square root value is stored in a RAM memory 232 of CPU interface 230.

CPU interface 230 includes RAM memory buffer 232, timer table 234, deconvolution engine 236, and registers 238. RAM memory buffer 232 may be implemented in volatile memory to store a matrix of result values that represent mutual capacitances of the sensor elements of capacitive fingerprint sensor array 221. Timer table 234 may be implemented in volatile or non-volatile memory to store the timing intervals for the control sequence(s) that are used by the sequencer of scan control engine 211 to control scan operations. Deconvolution engine 236 may be implemented as a block of one or more hardware logic elements such as, for example, logic gates, look-up tables (LUTs), and the like. Deconvolution engine 236 is configured to deconvolute the result matrix(es) of scan operations by performing the various computational and other operations of the techniques described herein. Registers 238 are used to communicate control, address, and data information to/from one or more CPUs or CPU subsystems (not shown in FIG. 2B) of processing device 200.

In some (but not necessarily all) embodiments of the techniques described herein, a processing device may also include a baseline compensation component. In the embodiment of FIG. 2A, processing device 200 includes a hardware baseline compensation circuit 240 that is configured to improve the receiver channel's useful signal dynamic range by applying opposite-phase compensation signals that remove any imbalances between the two input signals to BPF 203. (Generally, a signal dynamic range refers to the range of signal magnitudes, or their representations as digital values, that is useful for distinguishing between the desired features detected by the sensor array—e.g., such as the contrast between the ridges and valleys of a fingerprint.) For example, baseline compensation circuit 240 includes two pairs of variable capacitors that are coupled between the inverted and non-inverted TX drive signal lines and the inverted and non-inverted RX output signal lines at the inputs of BPF 203. The pairs of variable capacitors can be tuned to generate opposite-phase compensation signals (e.g., applied to input signals "i_in_p" and "i_in_n" of BPF 203) with desirable values that can compensate for any imbalances caused by the structure of the sensor array, signal routing lines or switches in the processing device, etc. It is noted that in various embodiments a baseline compensation circuit may include different elements (e.g., such as current sources) to achieve equivalent functionality.

To perform a scan operation, the components of sensor system 20 operate as follows. The CPU of processing device 200 configures the sequencer in scan control engine 211 for scanning the sensor elements in capacitive fingerprint sensor array 221, and arranges desired scanning timing parameters such as the operation frequency, number of TX periods/slots per one sensor intersection, scan initialization delays, etc. Once the CPU initializes the sensor array scanning, the sequencer configures TX multiplexer 212 and RX multiplexer 213 for each sensor element in the sensor array 221 and enables signals to the TX control circuit and RX control circuit of scan control engine 211. At this point in time, a drive period of the scan operation is initiated and one or more TX electrodes are energized/driven with drive signals based on TX clock signal 214. The drive signals, when applied to the driven TX electrode(s), capacitively induce output signals in the RX electrodes of sensor array 221. When a user's finger is present on capacitive fingerprint sensor array 221, the induced RX output signals reflect the details (e.g., ridges, contrast, etc.) of the user's fingerprint.

The output signals coming from one or more RX electrodes are applied to the inputs of RX multiplexer 213 and are passed to the inputs of BPF 203 in analog front end 202. BPF 203 filters out the off-band noise components that are injected by a finger or are coming from other sources (e.g., such as switching regulators inside a smartphone). BPF 203 can be either active or passive—e.g., various embodiments and implementations may use a passive-based filter (e.g. LC filter) or an active (e.g. gyrator-based) filter, or their combination.

The output signals, filtered by BPF 203, are applied to the differential amplifier inputs of VGA 204. VGA 204 operates as a variable gain amplifier, its gain level is set in the firmware of processing device 200, for example depending on the magnitudes of the mutual capacitance values of the sensor elements in capacitive fingerprint sensor array 221.

The amplified output signal of VGA 204 is supplied to the pair of synchronous detectors in the quadrature demodulator of analog front end 202. A pair of quadrature shifted reference signals is supplied by reference signal generator 205 to multipliers 216a and 216b of the quadrature demodulator. The frequency of the quadrature detector reference signal is the same as the frequency of TX clock signal 214. The TX clock signal frequency may be in the range of several megahertz, e.g., in the range of 5 MHz to 10 MHz. For example, some processing devices can operate scan operations at the TX frequency e.g., such as 5 MHz and some at a higher frequency, e.g. 9 MHz.

The output signals from multipliers 216a and 216b are applied to the pair of LPFs 206a and 206b. LPFs 206a and 206b remove the high-frequency conversion products, leaving the DC levels of the corresponding LPF input signals. Thereafter, the DC component of the output signal from each of the LPFs (206a or 206b) is passed to its own corresponding ADC (ADC 217a or 217b). Each of ADCs 217a and 217b converts its input analog signal to a digital value (e.g., a count). The digital values (e.g., sample counts) output from ADCs 217a and 217b represent the I-component and the Q-component, respectively, of the amplified output signal received from VGA 204. The output signals from ADC's 217a and 217b are the output from the quadrature demodulator and provide constant output-signal vs. the input-signal phase in relation to the demodulator reference signals.

The digital values (e.g., sample counts) output from ADCs 217a and 217b are processed by channel engine 218. Channel engine 218 performs several functions: it calculates the squares of the I-component and Q-component counts received from ADCs 217a and 217b; integrates the squared I-component and Q-component values into an integration sum; and computes the square root from the integration sum, where the square root is a digital value that represents the mutual capacitance of a given/known sensor element of capacitive fingerprint sensor array 221. The square root result is stored in RAM memory 232 of CPU interface 230—e.g., the square root result may be stored in a matrix or other suitable data structure that is initialized in RAM memory 232 to represent the grid of sensor elements of sensor array 221. Thus, when a user's finger is present on capacitive fingerprint sensor array 221, the matrix of result values stored in RAM memory 232 reflects the details (e.g., ridges, contrast, etc.) of the user's fingerprint.

Sensing Grid Connections in Multi-Phase Scan Configurations

In various embodiments, the techniques for multi-phase scanning described herein are implemented for a capacitive fingerprint sensor array that includes a grid of M TX electrodes and N RX electrodes. When a user's finger is present on the sensor array and the sensor array is scanned, the sensor element at each intersection of an RX electrode and a TX electrode contains unknown mutual capacitance Cm that needs to be measured.

Figure 3:
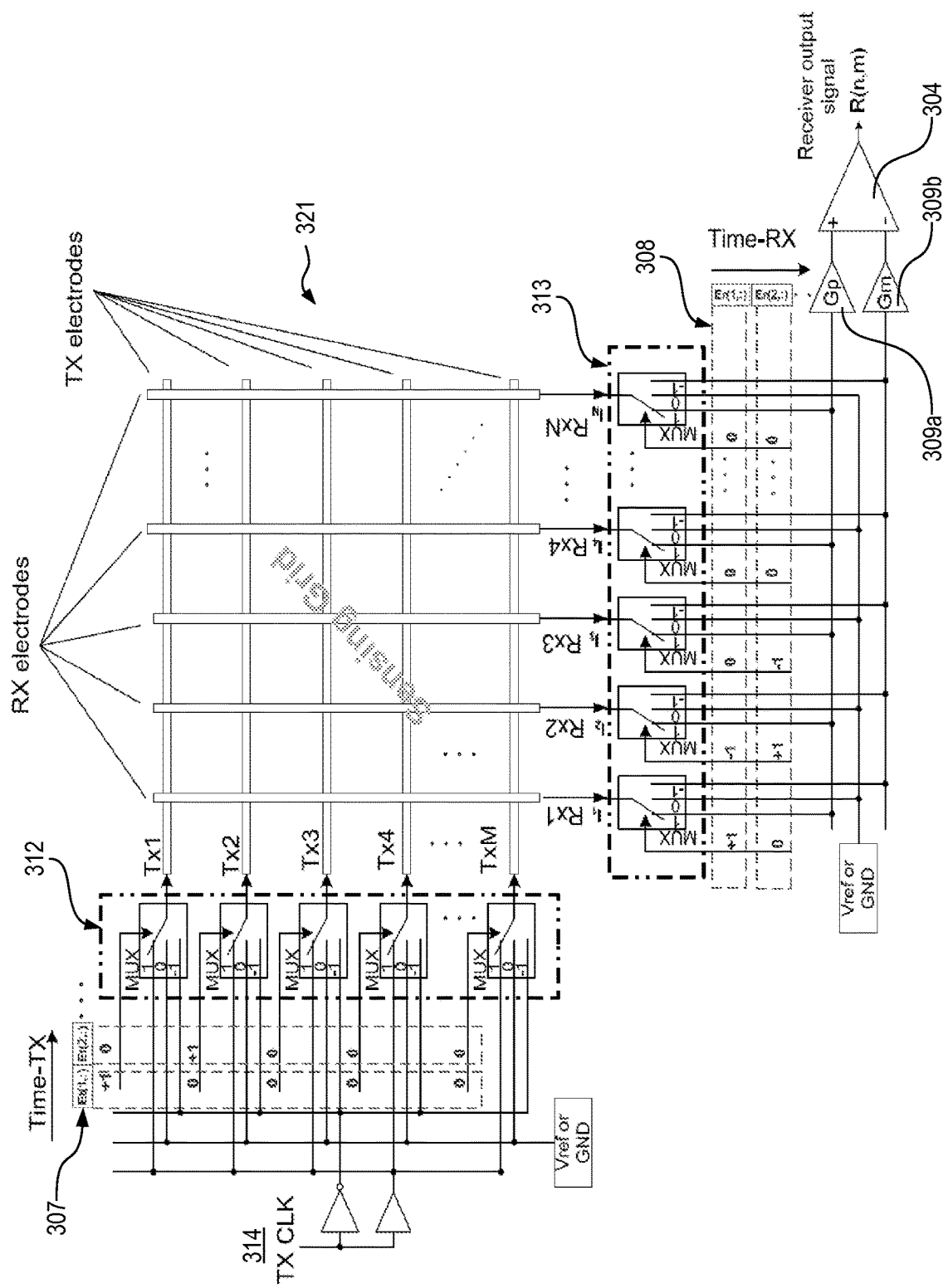
FIG. 3 illustrates connections of TX and RX electrodes of a capacitive fingerprint sensor array to TX drivers and RX receive channels, according to an example embodiment.

The results and methods of various embodiments of the techniques described herein are based on the sensing grid connections illustrated in FIG. 3. FIG. 3 illustrates an example of the connections of a sensor array's TX and RX electrodes to TX drivers and to RX receive channels, respectively, according to various embodiments of the techniques described herein. In FIG. 3, capacitive fingerprint sensor array 321 is similar to capacitive fingerprint sensor array 221 in sensor system 20 of FIGS. 2A/2B. Each of the TX electrodes in sensor array 321 is coupled to a processing device (not shown in FIG. 3) through TX multiplexer 312, and each of the RX electrodes of the sensor array is coupled to the processing device through RX multiplexer 313. In FIG. 3, block 307 illustrates how the TX electrode connections to sensor array 321 correspond to a TX excitation matrix for embodiments that may use multi-phase TX scan mode. Block 308 illustrates how the RX electrode connections to sensor array 321 correspond to an RX excitation matrix for embodiments that may use multi-phase RX scan mode. It is noted that a combination of the TX and RX electrode connections illustrated in FIG. 3 may also be used for embodiments that may use a multi-phase combined RX/TX scan mode.

TX Electrode Connections.

In FIG. 3, each TX electrode is connected to a 3:1 multiplexer (MUX) which connects it to one of three sources: a TX clock signal (e.g., TX CLK signal 314), an inverted TX clock signal (e.g., inverted TX CLK), or to a Vref signal (which may be a system ground). Each MUX is controlled with a control signal set by the processing device (e.g., by the sequencer in scan control engine 211 in FIG. 2B), where the control signal can take one of three polarity values: +1, 0, or −1, that corresponds to one of the three TX source signals: the TX clock signal, the Vref signal, or the inverted TX clock signal, respectively. It is noted that a TX excitation matrix is formed by rows with data elements representing the polarity value (e.g., +1, 0, or −1) for each TX electrode in a given column (or row, as featured in FIG. 3) during a given period of a scan operation.

RX Electrode Connections.

The embodiment in FIG. 3 illustrates that there is one differential receiver connected to the RX electrodes of sensor array 321; it is noted, however, that different embodiments may use a different number of differential receivers that may be connected to the RX electrodes, e.g., up to the number N of the RX electrodes. In FIG. 3, the differential receiver is connected to all of the RX electrodes by using separate polarity switching circuits for each RX electrode. Each polarity switching circuit can be controlled separately by a control signal from the processing device (e.g., by the sequencer in scan control engine 211 in FIG. 2B), where the control signal could take one of three values:

- 0 (indicates that this RX electrode is disconnected from the differential receiver);
- 1 (indicates that this RX electrode is connected to the positive input of the differential receiver);
- −1 (indicates that this RX electrode is connected to the negative input of the differential receiver).

It is noted that an RX excitation matrix is formed by rows with data elements representing the polarity value (e.g., +1, 0, or −1) for each RX electrode in a given row (or column, as featured in FIG. 3) during a given period of a scan operation. It is also noted that in FIG. 3, the notation "R(n, m)" represents the output signal from the sensor element located at the intersection of the "n"-th RX electrode and the "m"-th TX electrode. The Gp and Gm amplifiers (309a and 309b) connected to the inputs of differential amplifier 304 show the gains mismatches for the positive and negative inputs. In the ideal theoretical case, the positive gain Gp and the negative gain Gm cancel each other out, e.g., Gp=−Gm, but in reality in actual hardware they do not, e.g., Gp≠−Gm. This causes some problems, as discussed below.

The techniques described herein provide three basic scanning mechanisms that are based on the TX and RX sensing grid connections shown in FIG. 3:

multi-phase RX (MPRX) scanning;

multi-phase TX (MPTX) scanning;

combined multi-phase RX and TX scanning.

To better explain these scanning mechanisms, a matrix-based description is provided below.

Matrix Form Representations of Multi-Phase Scanning

A matrix-form representation of a multi-phase scanning technique is described below, and the sections that follow use similar representations to describe the multi-phase RX (MPRX) scanning technique, the multi-phase TX (MPTX) scanning technique, and the combined multi-phase RX and TX scanning technique. As used herein, matrix refers to a data structure configured to store data values. In various embodiments and implementations according to the techniques described herein, a matrix may be implemented in volatile storage (e.g., such as random access memory, or RAM), in non-volatile storage (e.g., such as flash memory, read-only memory or ROM, etc.), or in any other suitable storage device.

Matrix X of Unknown Mutual Capacitances of Sensor Elements.

The matrix X of unknown mutual capacitances $Cm_{N,M}$ has a dimension of N by M, which corresponds to a sensor array with N RX electrodes and M TX electrodes, respectively. Each data element of matrix X corresponds to an unknown mutual capacitance Cm at a sensor element located at a given TX/RX intersection. The mutual capacitance of a sensor element is not known since the output signal received from the sensor array is a convoluted signal that may represent measurements from multiple RX electrodes (e.g., per MPRX scanning), measurements induced by TX drive signals on multiple TX electrodes (e.g., per MPTX scanning), or measurements induced by multiple TX electrodes and measured on multiple RX electrodes (per a combined MPTX/MPRX scanning). The matrix X is expressed in Equation 1 below:

$$X = \begin{pmatrix} Cm_{1,1} & \cdots & Cm_{1,M} \\ \vdots & \ddots & \vdots \\ Cm_{N,1} & \cdots & Cm_{N,M} \end{pmatrix} \quad \text{(Eq. 1)}$$

RX Excitation Matrix Er.

Each row of matrix Er represents an excitation vector including data values that correspond to the polarities of control signals that control the polarity switching circuits of an RX multiplexer at a given moment in time. For example, as illustrated below, the first row of matrix Er includes information about RX electrode connections at a first RX time slot, the second row about RX electrode connections at a second RX time slot, and so on. An RX time slot indicates a period of a scan operation during which the RX multiplexer has a frozen/fixed configuration that does not change during the period.

$$\begin{pmatrix} Er_{1,1} & \cdots & Er_{1,N} \\ \vdots & \ddots & \vdots \\ Er_{N,1} & \cdots & Er_{N,N} \end{pmatrix}$$

TX Excitation Matrix Et.

Each row of matrix Et represents an excitation vector including data values that correspond to the polarities of control signals that control the TX multiplexer at a given moment in time. For example, as illustrated below, the first row of matrix Et includes information about TX electrode connections at a first TX time slot, the second row about TX electrode connections at a second TX time slot, and so on. A TX time slot indicates a period of a scan operation during which the TX multiplexer has a frozen/fixed configuration that does not change during the period.

$$\begin{pmatrix} Et_{1,1} & \cdots & Et_{1,M} \\ \vdots & \ddots & \vdots \\ Et_{M,1} & \cdots & Et_{M,M} \end{pmatrix}$$

Receiver Output Signals' Matrices Rr and Rt.

Matrix Rr includes digital values representing the output signals, which are obtained during a multi-phase MPRX scan operation and which represent the unknown mutual capacitances measured at the sensor elements of a capacitive fingerprint sensor array. Matrix Rt includes digital values representing the output signals, which are obtained during a multi-phase MPTX scan operation and which represent the unknown mutual capacitances measured at the sensor elements of the capacitive fingerprint sensor array. The matrices Rr and Rt are expressed below in Equations 2 and 3, respectively:

$$Rr = \begin{pmatrix} Rr_{1,1} & \cdots & Rr_{1,M} \\ \vdots & \ddots & \vdots \\ Rr_{N,1} & \cdots & Rr_{N,M} \end{pmatrix} \quad \text{(Eq. 2)}$$

$$Rt = \begin{pmatrix} Rt_{1,1} & \cdots & Rt_{1,N} \\ \vdots & \ddots & \vdots \\ Rt_{M,1} & \cdots & Rt_{M,N} \end{pmatrix} \quad \text{(Eq. 3)}$$

Example of Multi-Phase RX Scanning

According to the techniques described herein, in multi-phase RX scanning the polarities of the RX receiver input signals (the RX electrode output signals) are alternated according to the Er matrix created based on a circular rotation of the excitation vector Er_Vect in Equation 4 below:

$$Er\_\text{Vect} = [+1\ -1\ \ldots\ 0\ -1\ 0\ \ldots\ +1] \quad \text{(Eq. 4)}$$

The sum of the data values in the excitation vector Er_Vect defines the sum of the multi-phase RX excitation sequence. If the number of the +1 data elements matches number of −1 data elements in the excitation vector, this means that the sum of the multi-phase sequence is equal to zero (e.g., it is a fully-differential, or zero-sum excitation sequence). In the physical realm, this means that the number of the RX electrodes connected to the inverting input of the differential amplifier equals the number of the RX electrodes connected to the non-inverting input of the differential amplifier. This configuration provides the best common-mode noise suppression for the capacitive fingerprint sensor system, as the configuration allows the differential amplifier to suppers any noise in the measured output signals. An example of such configuration is illustrated in FIG. 4.

Figure 4:
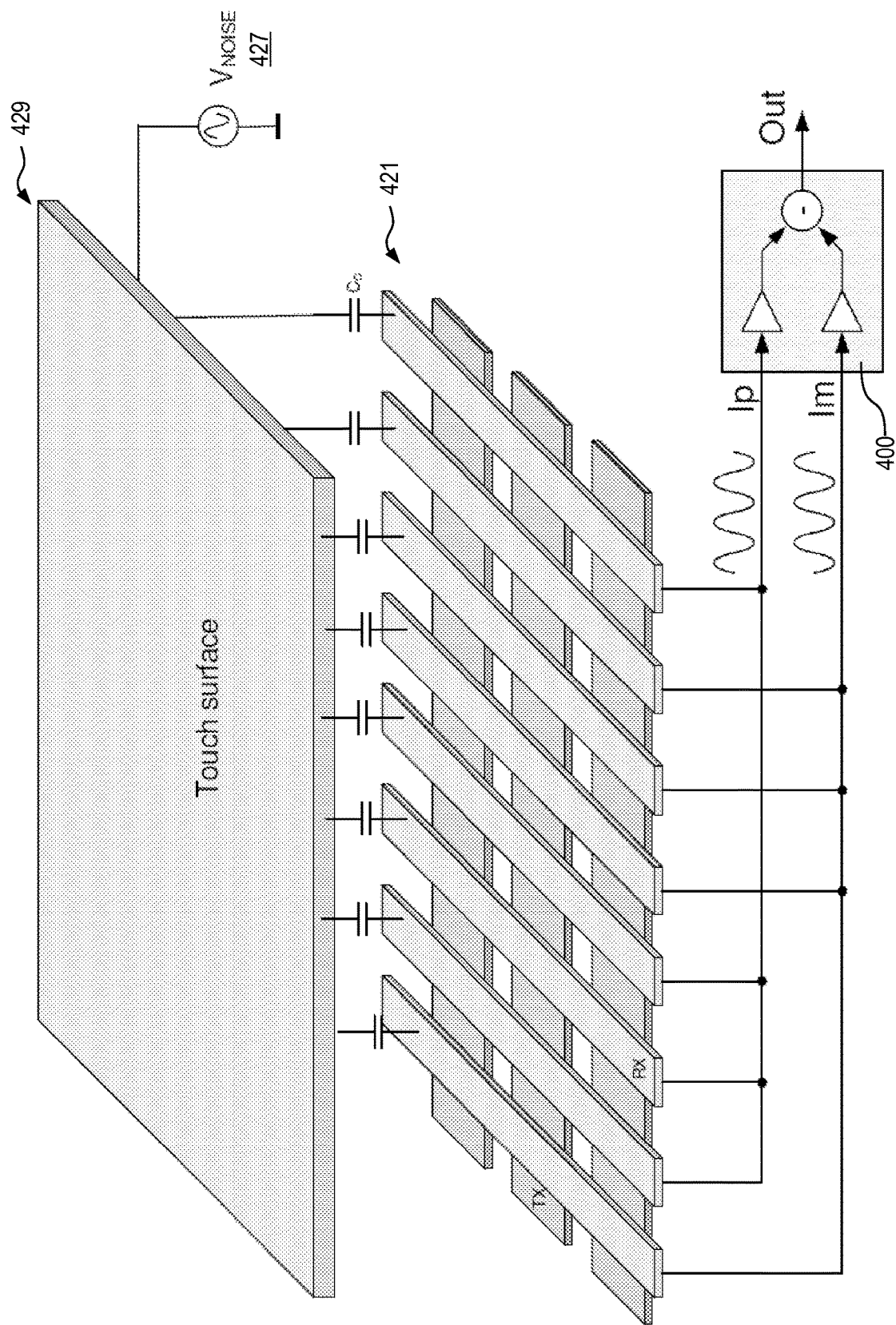
FIG. 4 illustrates an example of common-mode noise suppression by using zero-sum RX excitation sequences, according to some embodiments.

FIG. 4 is a block diagram illustrating an example of common-mode noise suppression by using zero-sum RX excitation sequences according to some embodiments of the techniques described herein. In FIG. 4, capacitive fingerprint sensor array 421 is similar to capacitive fingerprint sensor array 221 in sensor system 20 of FIGS. 2A/2B. Sensor array 421 is disposed below touch surface 429, which may be electrically, inductively, or otherwise (e.g., intentionally or not intentionally) coupled to a noise source 425. Noise source 425 may be one or more switching elements. LCD driver circuit elements, chargers, AM transmitters, and/or any other components that can affect sensor array 421 during operation of the sensor system. The embodiment in FIG. 4 uses a zero-sum RX excitation vector and processing device 400 includes a differential receiver, which is coupled as described herein to suppress the noise from noise sources such as source 427.

As an example, suppose the excitation vector Er_Vect contains only two non-zero data elements, where one of these is +1 and the other is −1. This means that at any given RX time slot only two RX electrodes are coupled to the differential receiver in such way that the output of one of the of RX electrodes is coupled (e.g., by an RX multiplexer) to the positive receiver input and the output of the other RX electrode is coupled (by the RX multiplexer) to the negative receiver input. Thus, this excitation vector is a zero-sum vector because the sum of its data elements equals to zero.

The excitation vector Er_Vect may be defined through a parameter, e.g., such as a "shift" parameter. The shift parameter is equal to the difference between the indices (within the excitation vector) of the +1 and the −1 non-zero elements in the excitation vector Er_Vect. For instance, at shift=2 and excitation_vector_length=6, an Er_Vect is shown in Equation 5 below:

$$Er\_\text{Vect} = [+1\ 0\ -1\ 0\ 0\ 0] \quad \text{(Eq. 5)}$$

In this instance, an excitation matrix Er matrix may be obtained as shown in Equation 6 below:

$$Er = \begin{bmatrix} 1 & 0 & -1 & 0 & 0 & 0 \\ 0 & 1 & 0 & -1 & 0 & 0 \\ 0 & 0 & 1 & 0 & -1 & 0 \\ 0 & 0 & 0 & 1 & 0 & -1 \\ -1 & 0 & 0 & 0 & 1 & 0 \\ 0 & -1 & 0 & 0 & 0 & 1 \end{bmatrix} \quad \text{(Eq. 6)}$$

As can be seen in the excitation matrix Er of Equation 6, the +1 and the −1 non-zero elements of the excitation vector Er_Vect are offset by one position in each row of the matrix, with the data element at end of the previous row being rotated to the beginning of the next row while maintaining the shift parameter at 2 (i.e., shift=2 for each row of the matrix). In this manner, the excitation matrix Er matrix is generated by a circular rotation of the excitation vector Er_Vect with shift=2.

Sensor array scanning based on an Er excitation matrix can be mathematically described as matrices multiplication, as shown in Equation 7 below:

$$Rr = Er \cdot X \quad \text{(Eq. 7)}$$

where, per the notation above, X is the matrix of unknown mutual capacitances of the sensor elements in the sensor array, Er is the RX excitation matrix, and Rr is the receiver output signal matrix. Mathematically, Equation 7 can be considered as a convolution procedure of RX excitation matrix Er and the matrix X of unknown mutual capacitances. It is noted that the output signal matrix Rr "collects" information about the contrast of a fingerprint image through the TX electrode(s) that is/are used to induce the output signals, but the information about the baseline capacitances of the sensor elements at these TX electrode(s) is lost because the differential amplifier outputs signals that represent only capacitance differences between the sensor elements.

The recovery of the original fingerprint image represented in matrix X can be done with a deconvolution procedure, applied to the Rr matrix, as illustrated in Equation 8 below:

$$Yr = \text{inverse}(Er) \cdot Rr \quad (\text{Eq. 8})$$

where the matrix Yr is the recovered image matrix for the fingerprint image represented in matrix X.

However, there is a problem in the case when the excitation matrix Er is created based on circular rotation of a zero-sum excitation vector. The problem is that the rank (e.g., the maximum number of linearly independent row vectors) of such kind of Er matrix is one less than the matrix dimension, and as a result the inverse matrix, inverse(Er), of the Er matrix cannot be calculated. The conventional methods for signal deconvolution do not provide a solution for this problem.

Figure 5:
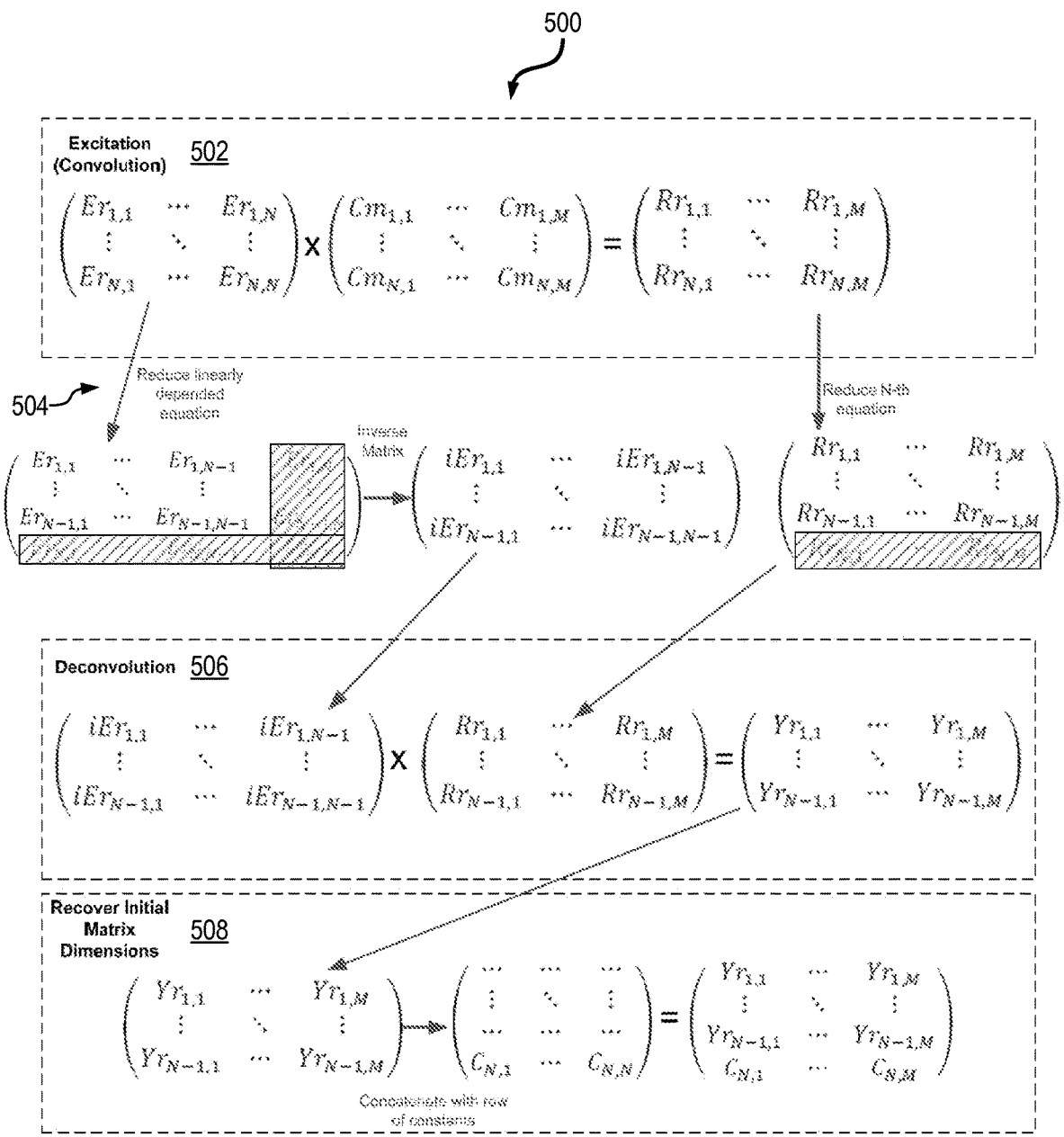
FIG. 5 illustrates an example method of using a reduced set of linear equations to recover a fingerprint image that is sensed based on zero-sum multi-phase RX scanning, according to some embodiments.

In some embodiments, the techniques described herein address this problem by providing a method for recovering a fingerprint image by using a reduced set of linear equations. For example, a processing device may be configured to use a reduced set of linear equations to address the above problem. To avoid singularity, the inverse matrix is calculated based on a reduced excitation matrix as described below. The excitation matrix Er is reduced by one row and one column, and one unknown in Equation 7 is fixed to a constant value. To even the dimensions of the inverse(Er) matrix and the Rr matrix, one row in the Rr matrix is reduced (e.g., removed). Thus, the dimension of the resulting recovered image matrix Yr will be one less than the original matrix X. To even the dimensions of the X and Yr matrices, one row of constant values (e.g., a row of zeros) is concatenated to the Yr matrix. FIG. 5 illustrates this method of zero-sum multi-phase RX excitation (convolution) and deconvolution in matrix terms, in accordance with the techniques described herein.

The operations of the method in FIG. 5 are described as being performed by a processing device or component(s) thereof (e.g., such as processing device 200 or its RX multiplexer 213 and deconvolution engine 236 in FIGS. 2A/2B). It is noted, however, that various implementations and embodiments may use various, and possibly multiple, components to perform the operations of the method in FIG. 5. For example, in various embodiments a processing device may be configured with firmware instructions which, when executed by one or more processors or other hardware components (e.g., microcontrollers, ASICs, and the like) are operable to perform the operations of the method in FIG. 5. In another example, in various embodiments a processing device may be implemented in a single IC component or its functionality may be spread across two or more IC components that may perform some additional operations and functionalities. Thus, the description hereinafter, of the method in FIG. 5 as being performed by a processing device, is to be regarded in an illustrative rather than a restrictive sense.

Referring to FIG. 5, a processing device performs a scan operation on a capacitive fingerprint sensor array based on an excitation matrix Er. The excitation matrix Er may be stored in volatile or non-volatile memory of the processing device, and is generated based on circular rotation from a zero-sum excitation vector Er_Vect.

As part of the scan operation on the capacitive fingerprint sensor array, in operation 502 the processing device performs excitation (convolution) in accordance with Equation 7 above. At RX time slots corresponding to the rows of excitation matrix Er, the processing device configures an RX multiplexer according to the corresponding row of the excitation matrix, drives the TX electrodes of the sensor array, and receives measurement output signals that are stored in output signal matrix Rr. The measurements stored in matrix Rr are convoluted representations based on a multiplication of the excitation matrix Er and the matrix X of unknown capacitances $Cm_{N,M}$ corresponding to the sensor elements of the sensor array. The processing device then reduces the excitation matrix Er by one row and one column, and also reduces the output signal matrix Rr matrix by one row, as indicated by reference 504.

In operation 506, the processing device performs deconvolution in accordance with Equation 8 above. The processing device computes the inverse matrix, inverse(Er), of the reduced excitation matrix Er, and multiplies the inverse matrix to the reduced-by-one-row output signal matrix Rr to obtain a reduced-by-one-row matrix Yr.

In operation 508, the processing device evens out the dimensions of the X matrix and the reduced-by-one-row matrix Yr. The processing device concatenates the one row of constant values (e.g., a row of zeros) to the reduced-by-one-row Yr matrix. The result is the recovered image matrix Yr, which represents the fingerprint image detected on the sensor array.

Figure 6A:
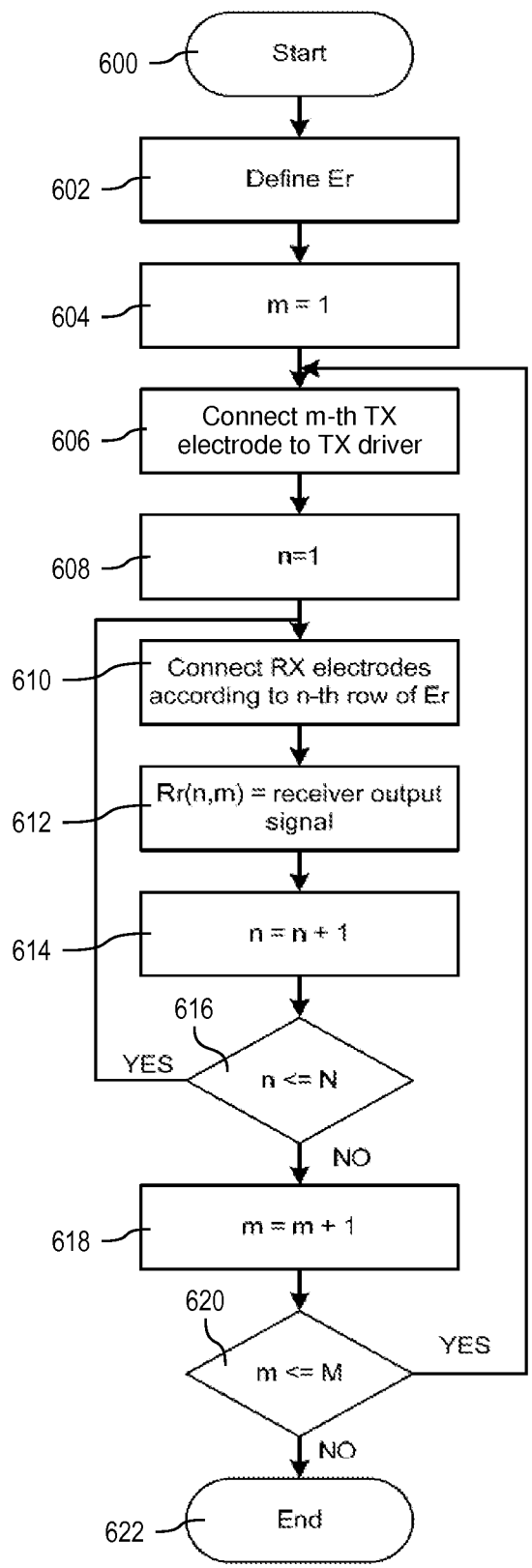
FIG. 6A illustrates an example method of excitation (convolution) for multi-phase RX scanning according to some embodiments.
Figure 6B:
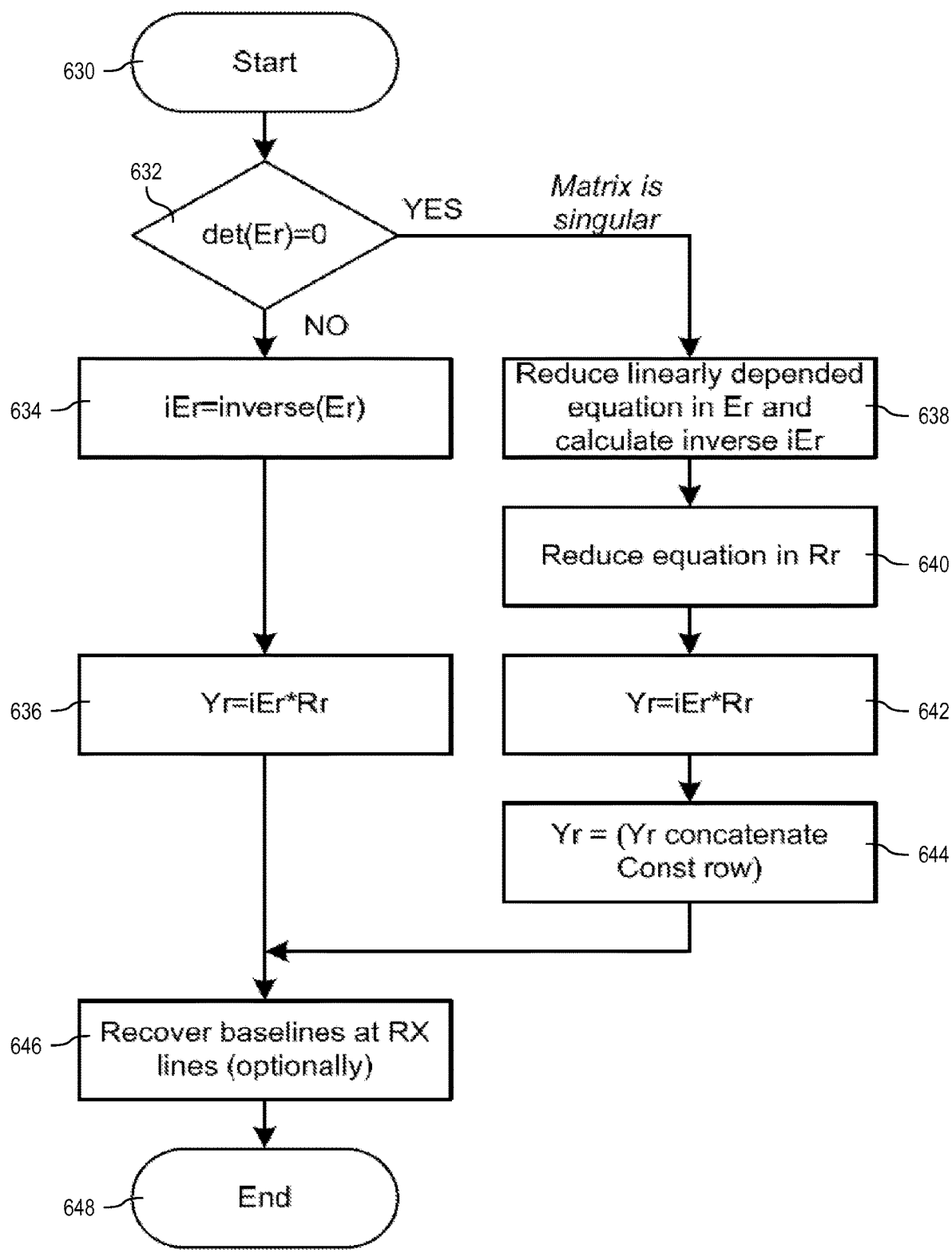
FIG. 6B illustrates an example method of deconvolution for multi-phase RX scanning according to some embodiments.

FIG. 6A is a flow diagram illustrating an example method of excitation (convolution) for multi-phase RX scanning according to an example embodiment. FIG. 6B is a flow diagram illustrating an example method of deconvolution for multi-phase RX scanning according to the example embodiment. The operations of the methods in FIGS. 6A and 6B are described as being performed by a processing device or component(s) thereof (e.g., such as processing device 200 or its TX multiplexer 212. RX multiplexer 213, and deconvolution engine 236 in FIGS. 2A/2B). It is noted, however, that various implementations and embodiments may use various, and possibly multiple, components to perform the operations of the methods in FIGS. 6A and 6B. For example, in various embodiments a processing device may be configured with firmware instructions which, when executed by one or more processors or other hardware components (e.g., microcontrollers, ASICs, and the like) are operable to perform the operations of the methods in FIGS. 6A and 6B. In another example, in various embodiments a processing device may be implemented in a single IC component or its functionality may be spread across two or more IC components that may perform some additional operations and functionalities. In addition, in some embodiments the methods in FIGS. 6A and 6B can be performed by a processing device to reconstruct a matrix (e.g., such as a heat map) of digital counts that represents a contact by a conductive object (e.g., a stylus or finger) on a capacitive touch sensor array. Thus, the description hereinafter, of the methods in FIGS. 6A and 6B as being performed by a processing device and/or for fingerprint image reconstruction, is to be regarded in an illustrative rather than a restrictive sense.

Referring to FIG. 6A, in operation 600 a processing device starts the excitation (convolution) for a multi-phase RX scan operation on a capacitive fingerprint sensor array that has N RX electrodes and M TX electrodes. In operation 602, the processing device initializes (or otherwise defines) an RX excitation matrix Er, and stores the excitation matrix in volatile or non-volatile memory. For example, according to the techniques described herein, the processing device may generate the excitation matrix Er based on circular rotation of a zero-sum excitation vector Er_Vect. In operation 604, the processing device initializes to 1 a current-electrode variable (e.g., "m"), which indicates the current TX electrode that is to be driven by the processing device as part of the scan operation.

In operation 606, the processing device couples the current (e.g, "m-th") TX electrode to a TX driver, while the other TX electrodes are coupled to the system ground (or to another reference signal). For example, the processing device may configure a TX multiplexer to connect the current (e.g., "m-th") TX electrode to a TX driver while connecting the rest of the TX electrodes to the system ground. In operation 608, the processing device that initializes to 1 a current-row variable (e.g., "n"), which denotes the current time slot during which multiple RX electrodes are to be sensed in accordance with the current (e.g., "n-th") row of the excitation matrix Er.

In operation 610, the processing device connects multiple RX electrodes to a differential receiver of the processing device in accordance with the current (e.g., "n-th") row of the excitation matrix Er. For example, the processing device may configure an RX multiplexer according to control signals that are defined by the data elements in the current row of the excitation matrix Er. When the scan operation is performed in a fully-differential multi-phase mode, the number of the +1 data elements matches number of the −1 data elements in the current row of the excitation matrix Er. In such case, the RX multiplexer: couples a number of RX electrodes to the non-inverting input of the differential receiver; switches the polarity of and couples the same number of RX electrodes to the inverting input of the differential receiver; and couples any remaining RX electrodes to the system ground (or to another reference signal).

In operation 612, the differential receiver in the processing device receives an output signal, and processes the output signal to generate a digital value Rr(n, m), as described heretofore. The digital value for the received output signal is a convoluted (with the corresponding row in the excitation matrix) representation of the unknown mutual capacitances at sensor elements located along the "m-th" TX electrode of the sensor array. The processing device stores the generated digital value at the corresponding entry (e.g., (n, m)) in the output signal matrix Rr, and proceeds with operation 614. In operation 614, the processing device increments the current-row variable (e.g., "n") to indicate the next row in the excitation matrix Er (e.g., to indicate the next time slot for sensing RX electrodes based on the current TX electrode). In operation 616, the processing device checks whether the incremented current-row variable is less than or equal to the number of rows N in the excitation matrix Er. If the incremented current-row variable is less than or equal to N, the processing device determines that some more RX electrodes still need to be scanned based on the current TX electrode, so the processing device continues to repeat operations 610, 612, 614, and 616 for the next row in the excitation matrix Er. If in operation 616 the processing device determines that the incremented current-row variable is greater than the number of rows N in the excitation matrix Er, the processing device determines that it has scanned all RX electrodes based on the current TX electrode, so the processing device continues with operation 618.

In operation 618, the processing device increments the current-electrode variable (e.g., "m") to indicate the next TX electrode that is to be coupled to the TX driver and energized for scanning. In operation 620, the processing device checks whether the incremented current-electrode variable is less than or equal to the number M of TX electrodes in the capacitive fingerprint sensor array. If the incremented current-electrode variable is less than or equal to M, the processing device determines that some more TX electrodes still need to be driven, so the processing device continues to repeat operations 606, 608, 610, 612, 614, 616, 618, and 620 for the next TX electrode. If in operation 620 the processing device determines that the incremented current-electrode variable is greater than the number M of the TX electrodes, the processing device determines that the scanning of all TX electrodes has been completed and all digital values for output signal matrix Rr have been generated. The processing device then continues with operation 622 to end the current scan cycle of the scan operation and to proceed with other operations of the scan operation (if any).

The operations in FIG. 6B may be performed by a deconvolution engine of the processing device. In FIG. 6B, at the start of operation 630 an excitation matrix Er and an output signal matrix Rr have been generated according to the method of FIG. 6A, and have been stored in volatile or non-volatile memory. In operation 630, a processing device starts the deconvolution process by accessing the excitation matrix Er. In operation 632, the processing device computes the determinant of the excitation matrix Er and checks whether the computed determinant is equal to zero, e.g., whether det(Er)=0. (The determinant of a matrix is a scalar value that is computed from the data elements of a matrix based on a specific arithmetic expression. The determinant of a matrix provides information about the system of linear equations represented by the matrix—e.g., if the determinant is a non-zero value, then the system of equations has a unique solution; if the determinant is zero, then the matrix is singular and the system of equations has infinite number of solutions.)

If in operation 632 the processing device determines that the determinant of the excitation matrix Er is a non-zero value. e.g., det(Er)≠0, the processing device proceeds with operations 634 and 636. In operation 634, the processing device computes the inverse matrix, iEr, of the excitation matrix Er. In operation 636, the processing device computes the recovered image matrix Yr by multiplying the inverse matrix iEr to the output signal matrix Rr, e.g., Yr=iEr*Rr. The recovered image matrix Yr is stored in volatile or non-volatile memory and represents the fingerprint image detected by the scan operation on the capacitive sensor array. Thereafter, the processing device may optionally proceed with operation 646, or may end the deconvolution at operation 648.

If in operation 632 the processing device determines that the determinant of the excitation matrix Er is zero, e.g., det(Er)=0, the processing device determines that the excitation matrix Er is singular and proceeds with operations 638, 640, 642, and 644 to use a reduced set of linear equations to recover the fingerprint image represented in the output signal matrix Rr. In operation 638, the processing device reduces the excitation matrix Er by one row and one column (e.g., by removing one row and one column from the matrix), and computes the inverse matrix, iEr, of the reduced excitation matrix Er. In operation 640, the processing device reduces the output signal matrix Rr by one row (e.g., by removing one row from the matrix). In operation 642, the processing device computes a reduced-by-one-row matrix Yr by multiplying the computed inverse matrix iEr to the reduced output signal matrix Rr, e.g., Yr=iEr*Rr. In operation 644, the processing device computes the recovered image matrix Yr by concatenating one row of constant values (e.g., a row of zeros) to the reduced-by-one-row matrix Yr, e.g., Yr=(Yr concat ConstRow). The recovered image matrix Yr is stored in volatile or non-volatile memory and represents the fingerprint image detected by the scan operation on the capacitive sensor array. Thereafter, the processing device may optionally proceed with operation 646, or may end the deconvolution at operation 648.

In some embodiments, the processing device may optionally perform operation 646 to improve the fingerprint image quality by recovering contrast information at the RX electrodes. For example, in operation 646 the processing device may use a post-processing method on the recovered image matrix Yr for baseline compensation (e.g., as described hereinafter with respect to FIG. 17). In operation 648, the processing device ends the deconvolution and may proceed with other fingerprint image processing operations.

Example of Multi-Phase TX Scanning

According to the techniques described herein, multi-phase TX scanning works in a similar way as the multi-phase RX scanning described above. In multi-phase TX scanning, the polarities of the TX drive signals applied to the TX electrodes are controlled by a TX multiplexer according to an Et excitation matrix created based on a circular rotation of an excitation vector Et_Vect, e.g., as described below in Equation 9:

$$Et\_Vect=[+1\ 0\ \ldots\ +1\ 0\ -1\ \ldots\ +1] \quad \text{(Eq. 9)}$$

Zero-sum and non-zero sum MPTX excitation sequences may be generated in the same way as described above for MPRX excitation sequences. For example, in the simplest case an excitation vector Et_Vect may contain only two non-zero data elements, one of which is +1 and the other is −1, e.g., according to Equation 10 below:

$$Et\_Vect=[+1\ -1\ \ldots\ 0\ 0\ \ldots\ 0] \quad \text{(Eq. 10)}$$

The excitation vector Et_Vect in Equation 10 indicates that, in a given TX time slot of the scan operation, only two TX electrodes are driven in such way that one of the TX electrodes is driven with a positive TX drive signal (e.g., TX_CLK) and the other TX electrode is driven with a negative TX drive signal (e.g., inverted TX_CLK), with the rest of the TX electrodes being held at a reference signal (e.g., such as a system ground).

In some embodiments of multi-phase TX scanning, a scan operation on a capacitive fingerprint sensor array may be described mathematically as matrices multiplication based on an excitation matrix Et, e.g., according to Equation 11 below:

$$Rt=Et \cdot X' \quad \text{(Eq. 11)}$$

where X' is the transposed matrix of unknown mutual capacitances Cm of the sensor elements in the sensor array. Et is the TX excitation matrix, and Rt is the output signal matrix. Mathematically, Equation 11 can be considered as a convolution procedure of the TX excitation matrix Et and the transposed matrix X' of unknown mutual capacitances. It is noted that the output signal matrix Rt "collects" information about the contrast of a fingerprint image through the RX electrode(s) that is/are sensed, but the information about baseline capacitances of the sensor elements at these RX electrode(s) is lost because the differential amplifier outputs signals that represent only capacitance differences between the sensor elements.

The recovery of the original fingerprint image represented in matrix X' can be done with a deconvolution procedure, similar to the RX deconvolution procedure described above, that is applied to the Rt matrix, e.g., as illustrated in Equation 12 below:

$$Yt=(\text{inverse}(Et) \cdot Rt)' \quad \text{(Eq. 12)}$$

where matrix Yt is the recovered image matrix for the fingerprint image represented in matrix X'. However, in this case the same singularity problem exists as described above for the RX excitation matrix Er, and the conventional methods for signal deconvolution do not provide a solution for this problem. Namely, when the excitation matrix Et is created based on circular rotation of a zero-sum excitation vector, the rank of matrix Et is one less than the matrix dimension and as a result its inverse matrix inverse(Et) cannot be calculated.

The techniques described herein address this problem by providing a similar method of using a reduced set of linear equations as described above for multi-phase RX scanning. For example, in some embodiments a processing device may be configured to use a reduced set of linear equations to address the above problem as follows. The excitation matrix Et is reduced by one row and one column, and its inverse matrix inverse(Et) is calculated. To even the dimensions of the inverse(Et) matrix and the Rt matrix, one row in the Rt matrix is reduced (e.g., removed). Thus, the dimension of the resulting recovered image matrix Yt will be one less than the original matrix X'. To even the dimensions of the X' and Yt matrices, one row of constant values (e.g., a row of zeros) is concatenated to the Yt matrix.

Figure 7A:
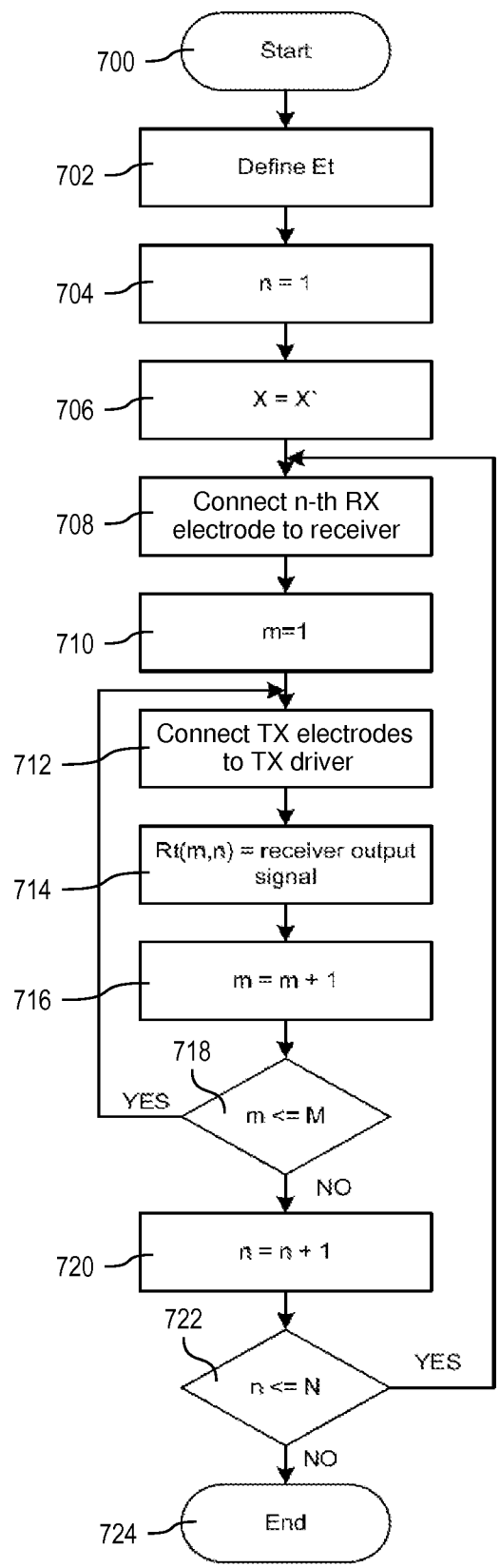
FIG. 7A illustrates an example method of excitation (convolution) for multi-phase TX scanning according to some embodiments.
Figure 7B:
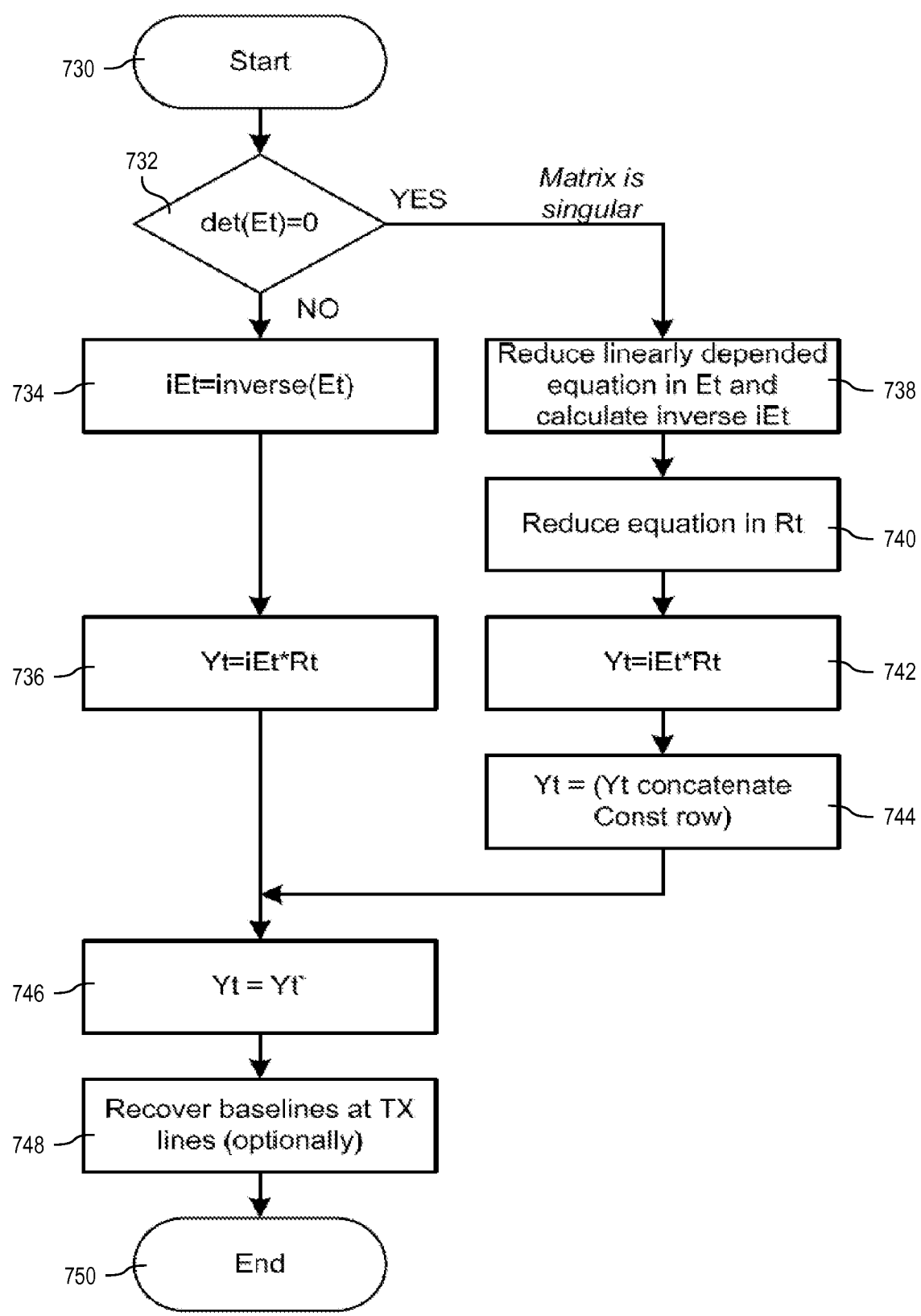
FIG. 7B illustrates an example method of deconvolution for multi-phase TX scanning according to some embodiments.

FIG. 7A is a flow diagram illustrating an example method of excitation (convolution) for multi-phase TX scanning according to an example embodiment. FIG. 7B is a flow diagram illustrating an example method of deconvolution for multi-phase TX scanning according to the example embodiment. The operations of the methods in FIGS. 7A and 7B are described as being performed by a processing device or component(s) thereof (e.g., such as processing device 200 or its TX multiplexer 212, RX multiplexer 213, and deconvolution engine 236 in FIGS. 2A/2B). It is noted, however, that various implementations and embodiments may use various, and possibly multiple, components to perform the operations of the methods in FIGS. 7A and 7B. For example, in various embodiments a processing device may be configured with firmware instructions which, when executed by one or more processors or other hardware components (e.g., microcontrollers, ASICs, and the like) are operable to perform the operations of the methods in FIGS. 7A and 7B. In another example, in various embodiments a processing device may be implemented in a single IC component or its functionality may be spread across two or more IC components that may perform some additional operations and functionalities. In addition, in some embodiments the methods in FIGS. 7A and 7B can be performed by a processing device to reconstruct a matrix (e.g., such as a heat map) of digital counts that represents a contact by a conductive object (e.g., a stylus or finger) on a capacitive touch sensor array. Thus, the description hereinafter, of the methods in FIGS. 7A and 7B as being performed by a processing device and/or for fingerprint image reconstruction, is to be regarded in an illustrative rather than a restrictive sense.

Referring to FIG. 7A, in operation 700 a processing device starts the excitation (convolution) for a multi-phase TX scan operation on a capacitive fingerprint sensor array that has N RX electrodes and M TX electrodes. In operation 702, the processing device initializes (or otherwise defines) a TX excitation matrix Et, and stores the excitation matrix in volatile or non-volatile memory. For example, according to the techniques described herein, the processing device may generate the excitation matrix Et based on circular rotation of a zero-sum excitation vector Et_Vect. In operation 704, the processing device initializes to 1 a current-electrode variable (e.g, "n"), which indicates the current RX electrode that is to be sensed by the processing device as part of the scan operation. In some embodiments, the processing device may optionally perform operation 706 to obtain an empty transposed matrix X' of the unknown mutual capacitances Cm of the sensor elements in the sensor array, where the matrix X' represents a fingerprint image sensed at the sensor array.

In operation 708, the processing device couples the current (e.g., "n-th") RX electrode to the positive input of a receiver of the processing device in order to sense an output signal that is induced by the driven TX electrodes, while the rest of the RX electrodes are coupled to the system ground. For example, the processing device may perform operation 708 by configuring an RX multiplexer according to suitable control signals. In operation 710, the processing device that initializes to 1 a current-row variable (e.g., "m"), which denotes the current time slot during which multiple TX electrodes are driven (energized) in accordance with the current (e.g., "m-th") row of the excitation matrix Et.

In operation 712, the processing device couples multiple TX electrodes to a TX driver in accordance with the current (e.g., "m-th") row of the excitation matrix Et. For example, the processing device may configure a TX multiplexer according to control signals that are defined by the data elements in the current row of the excitation matrix Et. When the scan operation is performed in a fully-differential multi-phase mode, the number of the +1 data elements matches number of the −1 data elements in the current row of the excitation matrix Et. In such case, the TX multiplexer: couples a number of TX electrodes to a positive TX drive signal (e.g., such as a TX clock signal); couples the same number of TX electrodes to a negative TX drive signal (e.g., such as an inverted TX clock signal); and couples any remaining TX electrodes to the system ground.

In operation 714, the differential receiver in the processing device senses (e.g., receives) an induced output signal at the current (e.g., "n-th") RX electrode, and processes the output signal to generate a digital value Rt(m, n), as described heretofore. The digital value for the received output signal is a convoluted representation of the unknown mutual capacitances at sensor elements located through the "n-th" RX line of the sensor array and the corresponding "m-th" row of the excitation matrix. The processing device stores the generated digital value at the corresponding entry (e.g., (m, n)) in the output signal matrix Rt, and proceeds with operation 716. In operation 716, the processing device increments the current-row variable (e.g., "m") to indicate the next row in the excitation matrix Et (e.g., to indicate the next time slot for driving multiple TX electrodes). In operation 718, the processing device checks whether the incremented current-row variable is less than or equal to the number of rows M in the excitation matrix Et. If the incremented current-row variable is less than or equal to M, the processing device determines that some more TX electrodes still need to be driven in order to induce output signal on the current RX electrode, so the processing device continues to repeat operations 712, 714, 716, and 718 for the next row in the excitation matrix Et. If in operation 718 the processing device determines that the incremented current-row variable is greater than the number of rows M in the excitation matrix Et, the processing device determines that all TX electrodes have been driven and sensed on the current RX electrode, so the processing device continues with operation 720.

In operation 720, the processing device increments the current-electrode variable (e.g., "n") to indicate the next RX electrode that is to be sensed. In operation 722, the processing device checks whether the incremented current-electrode variable is less than or equal to the number N of RX electrodes in the capacitive fingerprint sensor array. If the incremented current-electrode variable is less than or equal to N, the processing device determines that some more RX electrodes still need to be sensed, so the processing device continues to repeat operations 708, 710, 712, 714, 716, 718, 720, and 722 for the next RX electrode. If in operation 722 the processing device determines that the incremented current-electrode variable is greater than the number N of the RX electrodes, the processing device determines that the scanning of all RX electrodes has been completed and all digital values for output signal matrix Rt have been generated. The processing device then continues with operation 724 to end the current scan cycle of the scan operation and to proceed with other operations of the scan operation (if any).

The operations in FIG. 7B may be performed by a deconvolution engine of the processing device. In FIG. 7B, at the start of operation 730 an excitation matrix Et and an output signal matrix Rt have been generated according to the method of FIG. 7A, and have been stored in volatile or non-volatile memory. In operation 730, a processing device starts the deconvolution process by accessing the excitation matrix Et. In operation 732, the processing device computes the determinant of the excitation matrix Et and checks whether the computed determinant is equal to zero, e.g., whether det(Et)=0.

If in operation 732 the processing device determines that the determinant of the excitation matrix Et is a non-zero value, e.g., det(Et)≠0, the processing device proceeds with operations 734 and 736. In operation 734, the processing device computes the inverse matrix, iEt, of the excitation matrix Et. In operation 736, the processing device computes the recovered image matrix Yt by multiplying the inverse matrix iEt to the output signal matrix Rt, e.g., Yt=iEt*Rt. The recovered image matrix Yt is stored in volatile or non-volatile memory and represents (e.g., in transposed form) the fingerprint image detected by the scan operation on the capacitive sensor array. Thereafter, the processing device proceeds with operation 746.

If in operation 732 the processing device determines that the determinant of the excitation matrix Et is zero, e.g., det(Et)=0, the processing device determines that the excitation matrix Et is singular and proceeds with operations 738, 740, 742, and 744 to use a reduced set of linear equations to recover the fingerprint image represented in the output signal matrix Rt. In operation 738, the processing device reduces the excitation matrix Et by one row and one column (e.g., by removing one row and one column from the matrix), and computes the inverse matrix, iEt, of the reduced excitation matrix Et. In operation 740, the processing device reduces the output signal matrix Rt by one row (e.g., by removing one row from the matrix). In operation 742, the processing device computes a reduced-by-one-row matrix Yt by multiplying the computed inverse matrix iEt to the reduced output signal matrix Rt, e.g., Yt=iEt*Rt. In operation 744, the processing device computes the recovered image matrix Yt by concatenating one row of constant values (e.g., a row of zeros) to the reduced-by-one-row matrix Yt, e.g., Yt=(Yt concat ConstRow). The recovered image matrix Yt is stored in volatile or non-volatile memory and represents (e.g., in transposed form) the fingerprint image detected by the scan operation on the capacitive sensor array. Thereafter, the processing device proceeds with operation 746.

In operation 746, the processing device transposes the recovered image matrix Yt, e.g., Yt=Yt', and stores it in volatile or non-volatile memory. After the transpose operation, the matrix Yt' is dimensionally equivalent to the matrix X and represents the fingerprint image detected by the scan operation on the capacitive sensor array.

In some embodiments, the processing device may optionally perform operation 748 to improve the fingerprint image quality by recovering contrast information at the TX electrodes. For example, in operation 748 the processing device may use a post-processing method on the recovered image matrix Yt' for baseline compensation (e.g., as described hereinafter with respect to FIG. 17). In operation 750, the processing device ends the deconvolution and may proceed with other fingerprint image processing operations.

Example of Combined Multi-Phase RX-TX Scanning

According to the techniques described herein, some embodiments may use a combined multi-phase RX-TX scanning on a capacitive fingerprint sensor array. In a combined multi-phase RX-TX scanning, multiple TX electrodes are driven concurrently and induced output signals are sensed (received) on multiple RX electrodes concurrently. The combined multi-phase RX-TX scanning techniques use both an RX excitation matrix Er and a TX excitation matrix Et. When the Er and Et excitation matrices are generated based on circular rotation from zero-sum excitation vectors, e.g., Er_Vect and Et_Vect, respectively, the scan operation on the sensor array is performed in a fully-differential multi-phase mode.

Figure 8A:
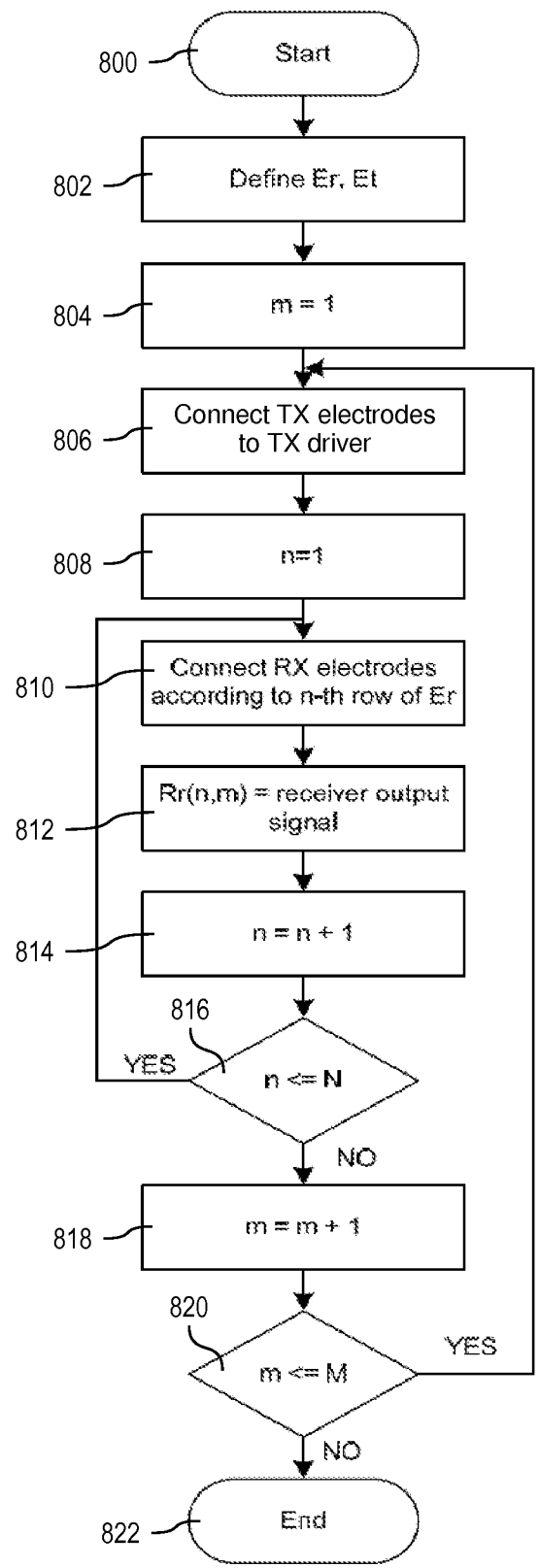
FIG. 8A illustrates an example method of excitation (convolution) for multi-phase RX-TX scanning according to some embodiments.
Figure 8B:
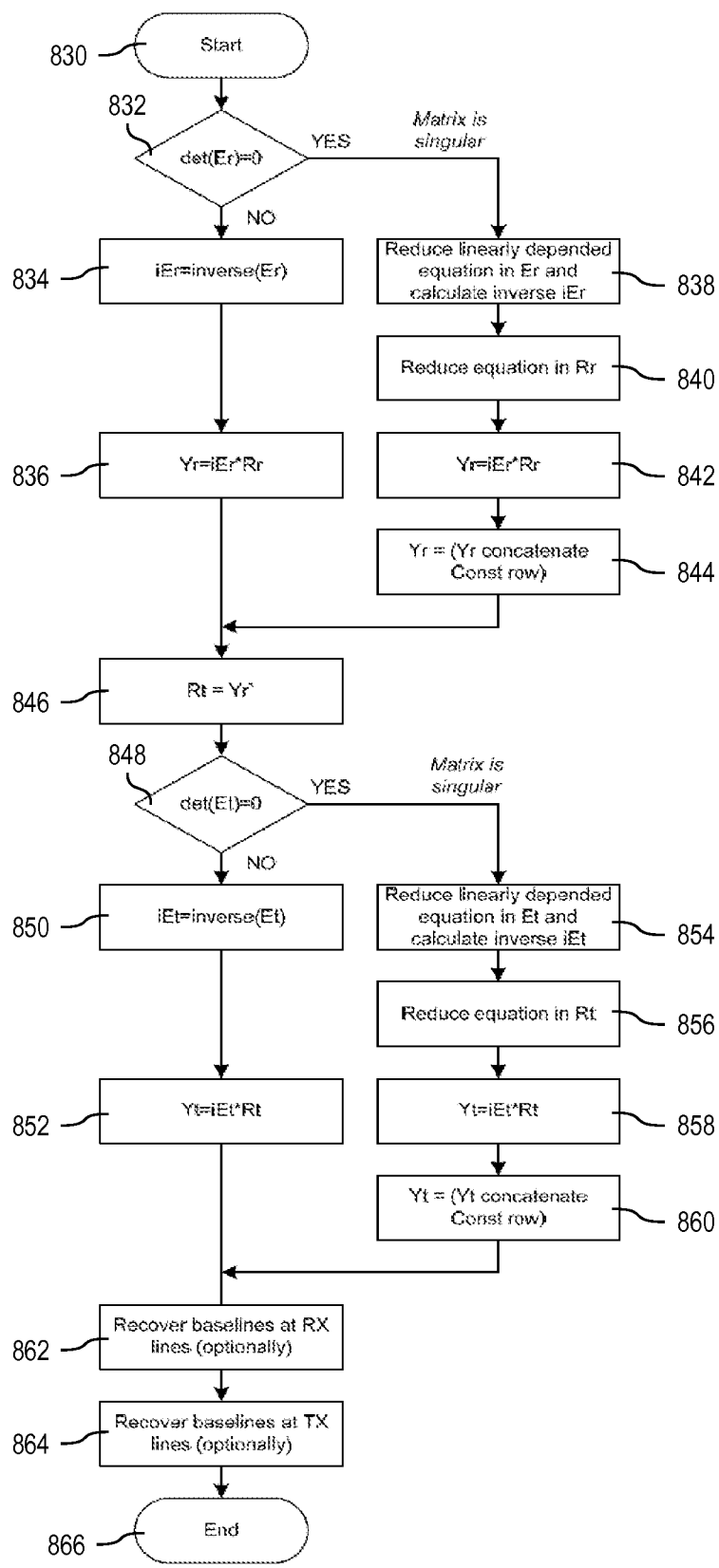
FIG. 8B illustrates an example method of deconvolution for multi-phase RX-TX scanning according to some embodiments.

FIG. 8A is a flow diagram illustrating an example method of excitation (convolution) for multi-phase RX-TX scanning according to an example embodiment. FIG. 8B is a flow diagram illustrating an example method of deconvolution for multi-phase RX-TX scanning according to the example embodiment. The operations of the methods in FIGS. 8A and 8B are described as being performed by a processing device or component(s) thereof (e.g., such as processing device 200 or its TX multiplexer 212, RX multiplexer 213, and deconvolution engine 236 in FIGS. 2A/2B). It is noted, however, that various implementations and embodiments may use various, and possibly multiple, components to perform the operations of the methods in FIGS. 8A and 8B. For example, in various embodiments a processing device may be configured with firmware instructions which, when executed by one or more processors or other hardware components (e.g., microcontrollers, ASICs, and the like) are operable to perform the operations of the methods in FIGS. 8A and 8B. In another example, in various embodiments a processing device may be implemented in a single IC component or its functionality may be spread across two or more IC components that may perform some additional operations and functionalities. In addition, in some embodiments the methods in FIGS. 8A and 8B can be performed by a processing device to reconstruct a matrix (e.g., such as a heat map) of digital counts that represents a contact by a conductive object (e.g., a stylus or finger) on a capacitive touch sensor array. Thus, the description hereinafter, of the methods in FIGS. 8A and 8B as being performed by a processing device and/or for fingerprint image reconstruction, is to be regarded in an illustrative rather than a restrictive sense.

Referring to FIG. 8A, in operation 800 a processing device starts the excitation (convolution) for a multi-phase RX-TX scan operation on a capacitive fingerprint sensor array that has N RX electrodes and M TX electrodes. In operation 802, the processing device initializes (or otherwise defines) an RX excitation matrix Er and a TX excitation matrix Et, and stores these excitation matrices in volatile or non-volatile memory. For example, according to the techniques described herein, the processing device may generate the excitation matrix Er based on circular rotation of a zero-sum excitation vector Er_Vect and the excitation matrix Et based on circular rotation of a zero-sum excitation vector Et_Vect. In operation 804, the processing device initializes to 1 a current-m-row variable (e.g., "m"), which denotes the current time slot during which multiple TX electrodes are to be driven in accordance with the current (e.g., "m-th") row of the TX excitation matrix Et.

In operation 806, the processing device couples multiple TX electrodes to a TX driver in accordance with the current (e.g., "m-th") row of the excitation matrix Et. For example, the processing device may configure a TX multiplexer according to control signals that are defined by the data elements in the current row of the excitation matrix Et. When the scan operation is performed in a fully-differential multi-phase mode, the number of the +1 data elements matches number of the −1 data elements in the current row of the excitation matrix Et. In such case, the TX multiplexer: couples a number of TX electrodes to a positive TX drive signal (e.g., such as a TX clock signal); couples the same number of TX electrodes to a negative TX drive signal (e.g., such as an inverted TX clock signal): and couples any remaining TX electrodes to the system ground. In operation 808, the processing device that initializes to 1 a current-n-row variable (e.g., "n"), which denotes the current time slot during which multiple RX electrodes are to be sensed in accordance with the current (e.g., "n-th") row of the excitation matrix Er.

In operation 810, the processing device connects multiple RX electrodes to a differential receiver of the processing device in accordance with the current (e.g., "n-th") row of the excitation matrix Er. For example, the processing device may configure an RX multiplexer according to control signals that are defined by the data elements in the current row of the excitation matrix Er. When the scan operation is performed in a fully-differential multi-phase mode, the number of the +1 data elements matches number of the −1 data elements in the current row of the excitation matrix Er. In such case, the RX multiplexer: couples a number of RX electrodes to the non-inverting input of the differential receiver; switches the polarity of and couples the same number of RX electrodes to the inverting input of the differential receiver; and couples any remaining RX electrodes to the system ground.

In operation 812, the differential receiver in the processing device receives an output signal, and processes the output signal to generate a digital value Rr(n, m), as described heretofore. The digital value for the received output signal is a convoluted representation of the unknown mutual capacitance across the sensor elements according to "n-th" row of the Er excitation matrix and "m-th" column of the Et excitation matrix. The processing device stores the generated digital value at the corresponding entry (e.g., (n, m)) in the output signal matrix Rr, and proceeds with operation 814. In operation 814, the processing device increments the current-n-row variable (e.g., "n") to indicate the next row in the excitation matrix Er (e.g., to indicate the next time slot for sensing multiple RX electrodes based on the currently-driven multiple TX electrodes). In operation 816, the processing device checks whether the incremented current-n-row variable is less than or equal to the number of rows N in the excitation matrix Er. If the incremented current-n-row variable is less than or equal to N, the processing device determines that more multiples of RX electrodes still need to be scanned based on the currently-driven TX electrodes, so the processing device continues to repeat operations 810, 812, 814, and 816 for the next row in the excitation matrix Er. If in operation 816 the processing device determines that the incremented current-n-row variable is greater than the number of rows N in the excitation matrix Er, the processing device determines that it has scanned all multiples of RX electrodes based on the currently-driven TX electrodes, so the processing device continues with operation 818.

In operation 818, the processing device increments the current-m-electrode variable (e.g., "m") to indicate the next row in the excitation matrix Et (e.g., to indicate the next time slot for driving multiple TX electrodes). In operation 820, the processing device checks whether the incremented current-m-electrode variable is less than or equal to the number of rows M in the excitation matrix Et. If the incremented current-m-electrode variable is less than or equal to M, the processing device determines that more multiples of TX electrodes still need to be driven, so the processing device continues to repeat operations 806, 808, 810, 812, 814, 816, 818, and 820 for the next row in the excitation matrix Et. If in operation 820 the processing device determines that the incremented current-m-electrode variable is greater than the number of rows M in the excitation matrix Et, the processing device determines that the driving of all multiples of TX electrodes has been completed and all digital values for output signal matrix Rr have been generated. The processing device then continues with operation 822 to end the current scan cycle of the scan operation and to proceed with other operations of the scan operation (if any).

The operations in FIG. 8B may be performed by a deconvolution engine of the processing device. At the start of operation 830, an excitation matrix Er, an excitation matrix Et, and an output signal matrix Rr have been generated according to the method of FIG. 8A, and have been stored in volatile or non-volatile memory. In operation 830, a processing device starts the deconvolution process by accessing the excitation matrix Er. In operation 832, the processing device computes the determinant of the excitation matrix Er and checks whether the computed determinant is equal to zero, e.g., whether det(Er)=0.

If in operation 832 the processing device determines that the determinant of the excitation matrix Er is a non-zero value, e.g., det(Er) #0, the processing device proceeds with operations 834 and 836. In operation 834, the processing device computes the inverse matrix, iEr, of the excitation matrix Er. In operation 836, the processing device computes the recovered image matrix Yr by multiplying the inverse matrix iEr to the output signal matrix Rr, e.g., Yr=iEr*Rr.

The recovered image matrix Yr is stored in volatile or non-volatile memory. Thereafter, the processing device proceeds with operation 846.

If in operation 832 the processing device determines that the determinant of the excitation matrix Er is zero, e.g., det(Er)=0, the processing device determines that the excitation matrix Er is singular and proceeds with operations 838, 840, 842, and 844 to use a reduced set of linear equations. In operation 838, the processing device reduces the excitation matrix Er by one row and one column (e.g., by removing one row and one column from the matrix), and computes the inverse matrix, iEr, of the reduced excitation matrix Er. In operation 840, the processing device reduces the output signal matrix Rr by one row (e.g., by removing one row from the matrix). In operation 842, the processing device computes a reduced-by-one-row matrix Yr by multiplying the computed inverse matrix iEr to the reduced output signal matrix Rr, e.g., Yr=iEr*Rr. In operation 844, the processing device computes the recovered image matrix Yr by concatenating one row of constant values (e.g., a row of zeros) to the reduced-by-one-row matrix Yr, e.g., Yr=(Yr concat ConstRow). The recovered image matrix Yr is stored in volatile or non-volatile memory. Thereafter, the processing device proceeds with operation 846.

In operation 846, the processing device generates output signal matrix Rt by transposing the recovered image matrix Yr, e.g., Rt=Yr', and stores the generated Rt matrix in volatile or non-volatile memory. At the end of operation 846, the digital values in the Rt matrix have been deconvoluted with respect to the convolution performed based on the RX excitation matrix Er, but these digital values are still convoluted because of the convolution performed based on the TX excitation matrix Et.

Thus, the processing device continues the deconvolution process by accessing the excitation matrix Et. In operation 848, the processing device computes the determinant of the excitation matrix Et and checks whether the computed determinant is equal to zero, e.g., whether det(Et)=0.

If in operation 848 the processing device determines that the determinant of the excitation matrix Et is a non-zero value, e.g., det(Et)≠0, the processing device proceeds with operations 850 and 852. In operation 850, the processing device computes the inverse matrix, iEt, of the excitation matrix Et. In operation 852, the processing device computes the recovered image matrix Yt by multiplying the inverse matrix iEt to the output signal matrix Rt, e.g., Yt=iEt*Rt. The recovered image matrix Yt is stored in volatile or non-volatile memory. Thereafter, the processing device may optionally proceed with operations 862 and/or 864, or may end the deconvolution at operation 866.

If in operation 848 the processing device determines that the determinant of the excitation matrix Et is zero, e.g., det(Et)=0, the processing device determines that the excitation matrix Et is singular and proceeds with operations 854, 856, 858, and 860 to use a reduced set of linear equations to recover the fingerprint image represented in the output signal matrix Rt. In operation 854, the processing device reduces the excitation matrix Et by one row and one column (e.g., by removing one row and one column from the matrix), and computes the inverse matrix, iEt, of the reduced excitation matrix Et. In operation 856, the processing device reduces the output signal matrix Rt by one row (e.g., by removing one row from the matrix). In operation 858, the processing device computes a reduced-by-one-row matrix Yt by multiplying the computed inverse matrix iEt to the reduced output signal matrix Rt, e.g., Yt=iEt*Rt. In operation 860, the processing device computes the recovered image matrix Yt by concatenating one row of constant values (e.g., a row of zeros) to the reduced-by-one-row matrix Yt, e.g., Yt=(Yt concat ConstRow). The recovered image matrix Yt is stored in volatile or non-volatile memory and represents the fingerprint image detected/sensed at the capacitive fingerprint sensor array. Thereafter, the processing device may optionally proceed with operations 862 and/or 864, or may end the deconvolution at operation 866.

In some embodiments, the processing device may optionally perform operations 862 and/or 864 to improve the fingerprint image quality by recovering contrast information at the RX electrodes and/or the TX electrodes, respectively. For example, in operation 862 the processing device may use a post-processing method on the recovered image matrix Yr for baseline compensation on the RX electrodes (e.g., as described hereinafter with respect to FIG. 17). In another example, in operation 864 the processing device may use a post-processing method on the recovered image matrix Yr (which may or may not be baseline-compensated per operation 862) for baseline compensation on the TX electrodes (e.g., as described hereinafter with respect to FIG. 17). In operation 866, the processing device ends the deconvolution and may proceed with other fingerprint image processing operations.

Examples of Multi-Phase Scanning with Non-Zero Sum Excitation

According to the techniques described herein, some embodiments may use multi-phase scanning with non-zero sum excitation sequences to achieve comparable results as embodiments that use fully-differential multi-phase scanning. At least some non-zero sum multi-phase sequences have been used in touch applications to provide better noise suppression for scan operations on capacitive touch sensor arrays. Thus, some embodiments of the techniques described herein may leverage tested non-zero sum excitation sequences to get similar performance benefits (e.g., in terms of the common noise suppression for MPRX scanning and channel dynamic range for MPTX scanning) as zero-sum excitation sequences. In addition, excitation matrices formed using non-zero sum sequences are not singular, and therefore embodiments that use such non-zero-sum excitation matrices require simpler deconvolution processing.

According to the techniques described herein, non-zero sum multi-phase sequences may be used successfully with the help of:

1. additional hardware compensation circuits at the front of the sensing channel; and
2. using special sensor array designs (e.g., such as designs with reference electrodes).

One example of a hardware baseline compensation circuit is illustrated in the sensing channel of the embodiment in FIG. 2. FIGS. 9A and 9B illustrate how the hardware baseline compensation component 240 of FIG. 2 increases the useful dynamic range for the change in digital values (e.g., ADC counts) in response to a user's finger (or portion thereof) on the capacitive fingerprint sensor array. The boost in dynamic range may be accomplished by reducing the non-informative value of the input current to the differential receiver and increasing amplifier gain to boost signal level.

Referring to FIG. 9A, plot 902 illustrates the dynamic signal range (~5%) of an output signal induced on RX electrode(s) of a capacitive fingerprint sensor array without the use of a hardware baseline compensation circuit. Plot 904 illustrates the dynamic signal range (also ~5%) of the corresponding digital value ($N_{ADC}$). Referring to FIG. 9B, plot 912 illustrates the dynamic signal range (~5%) of an output signal induced on RX electrode(s) of a capacitive fingerprint sensor array with the use of a hardware baseline compensation circuit. Plot 914 illustrates the dynamic signal range (~50%) of the corresponding digital value ($N_{ADC}$). As can be seen from FIGS. 9A and 9B, the use of a hardware baseline compensation circuit increased the dynamic range of the change in digital values about 10 times, e.g., from ~5% in plot 904 to ~50% in plot 914.

Figure 10:
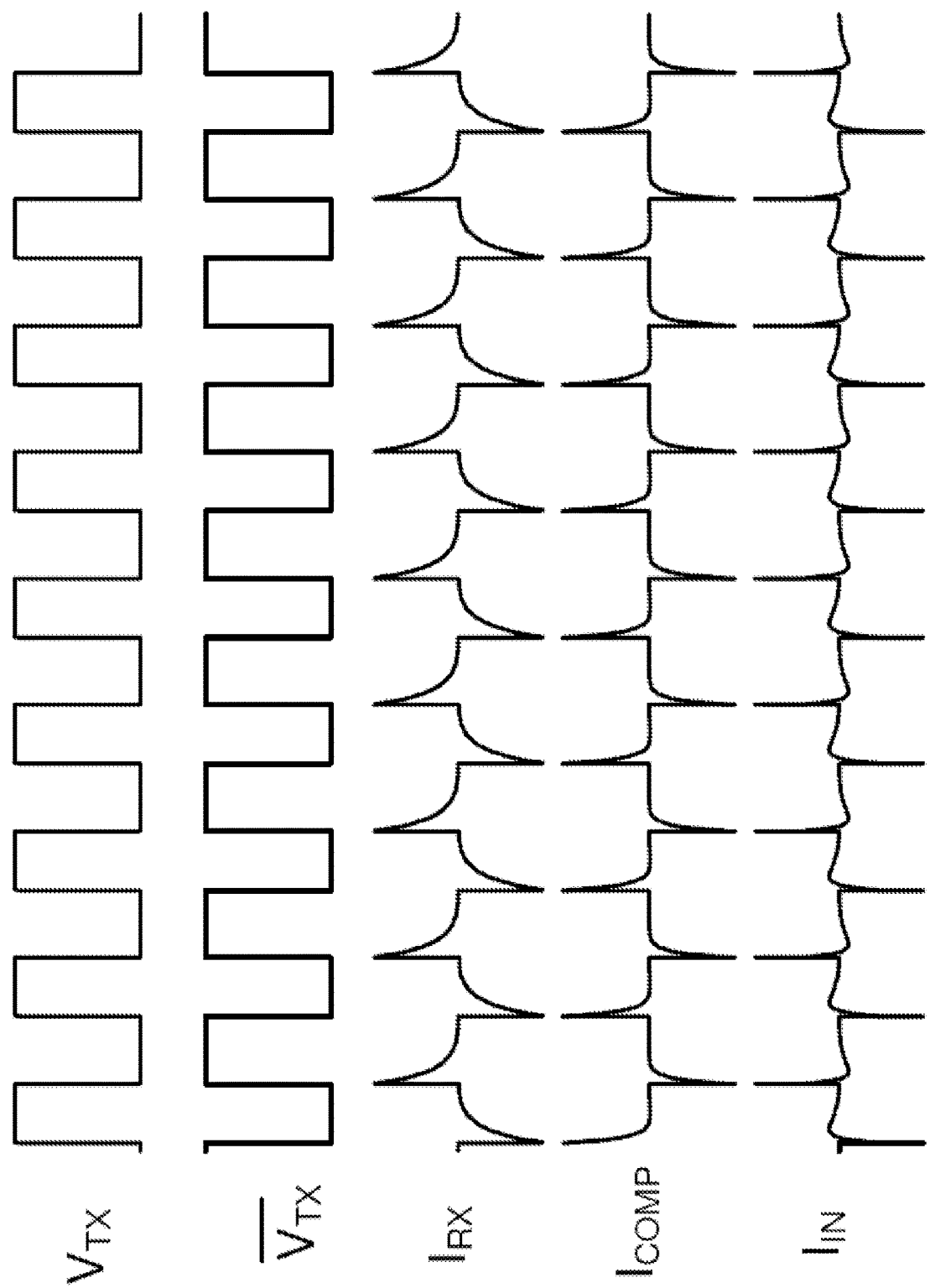
FIG. 10 illustrates operating waveforms for various signals used in multi-phase scanning with a hardware baseline compensation circuit, according to an example embodiment.

FIG. 10 illustrates operating waveforms of various signals used in multi-phase scanning with hardware baseline compensation circuit, such as hardware baseline compensation component 240 in the embodiment of FIG. 2.

Figure 11:
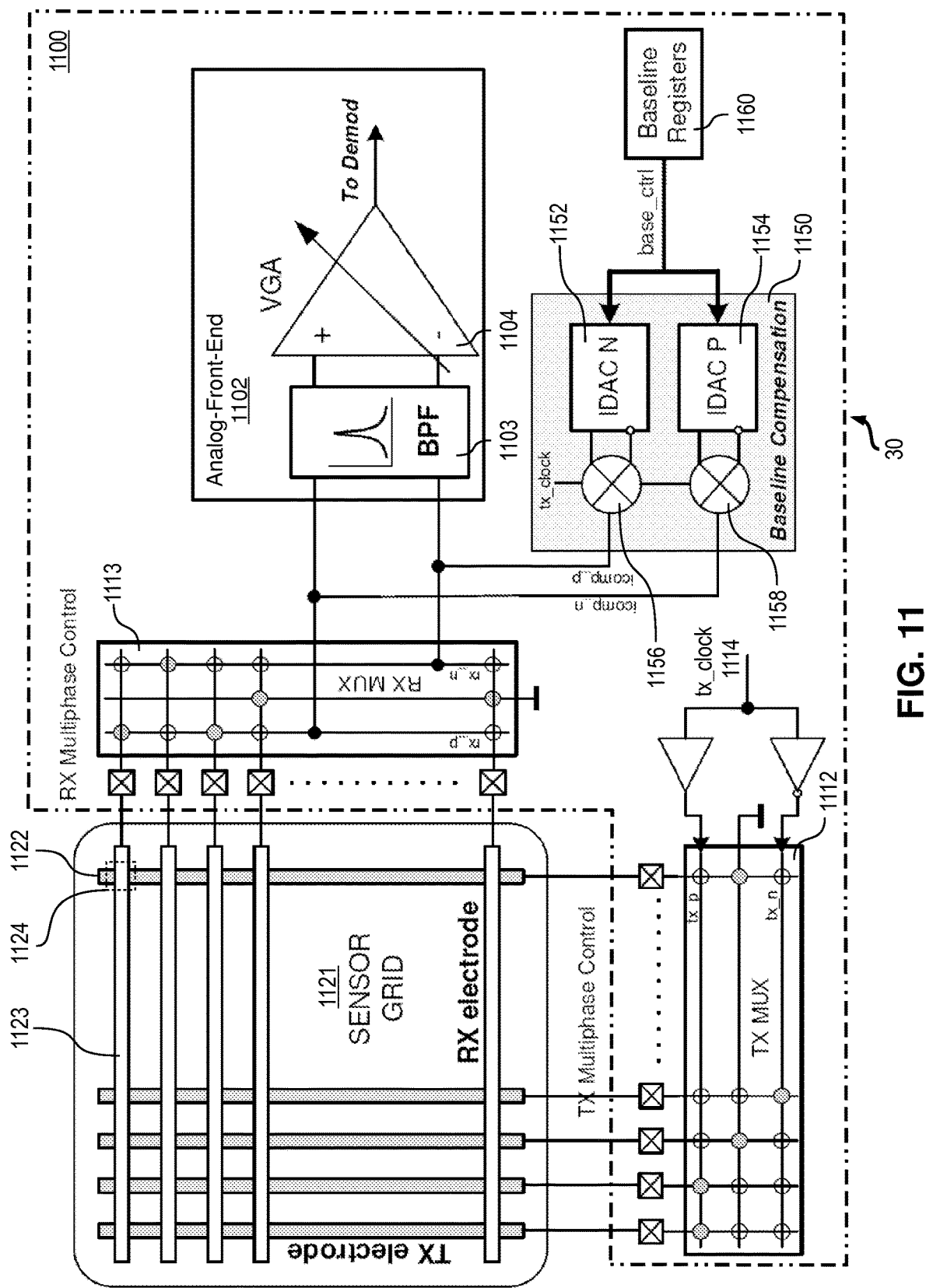
FIG. 11 illustrates an example sensor system according to some of the techniques described herein.

Some embodiments may use hardware baseline compensation circuits with current sources, instead of variable capacitors (e.g., as in component 240 in FIG. 2) to perform hardware baseline compensation. FIG. 11 illustrates an example sensor system that uses two balanced current output digital-to-analog converters (IDACs) and two mixers to balance a differential receiver's input signals.

Sensor system 30 in FIG. 11 is similar to sensor system 20 in FIGS. 2A/2B, except for the use of IDAC-based baseline compensation component. Referring to FIG. 11, capacitive fingerprint sensor array 1121 in FIG. 11 includes a grid of N RX electrodes and M TX electrodes. For example, capacitive fingerprint sensor array 1121 includes TX electrode 1122 and RX electrode 1123, which are arranged to form sensor element 1124. Each of the TX electrodes in sensor array 1121 is coupled to processing device 1100 through TX multiplexer 1112, and each of the RX electrodes is coupled to the processing device through RX multiplexer 1113. TX multiplexer 1112 is coupled to a signal generator (not shown) to receive TX clock signal 1114, which is used to generate TX drive signals that are applied to the TX electrodes. When applied to the TX electrodes, the TX drive signals induce output signals on the RX electrodes. RX multiplexer 1113 is configured to multiplex the output signals from multiple RX electrodes at the same time to the inputs of analog front end 1102. Analog front end 1102 is configured as a differential receiver to receive the (convoluted) output signals from the RX electrodes of sensor array 1121. Analog front end 1102 includes band-pass filter (BPF) 1103, which is coupled to variable-gain differential amplifier (VGA) 1104. VGA 1104 is coupled to a quadrature modulator (not shown), which in turn is coupled to a channel engine (not shown) that is configured to convert the RX output signal to digital values.

Processing device 1100 includes hardware baseline compensation circuit 1150, which is controlled based on configuration information stored in baseline registers 1160. Baseline compensation circuit 1150 includes IDAC 1152 that is coupled to mixer 1156 to generate positive compensation signals (e.g., "icomp_p"), and IDAC 1154 that is coupled to mixer 1158 to generate negative compensation signals (e.g., "icomp_n"). The negative input of BPF 1103 (in analog front end 1102) is coupled to the output of mixer 1156 to receive the positive compensation signals, and the positive input of BPF 1103 is coupled to the output of mixer 1158 to receive the negative compensation signals. Baseline compensation component 1150 operates by generating compensation currents through each of IDACs 1152 and 1154, and alternating the polarity of the compensation currents by using the pair of mixers 1156 and 1158, respectively, one mixer per an inverting and non-inverting input of BPF 1103. The compensation current values may be set as configuration in firmware, or a hardware sequencer may be used.

In some embodiments that use non-zero sum MPRX excitation sequences, hardware baseline compensation circuits (e.g., such as components 240 in FIGS. 2 and 150 in FIG. 11) may be able to provide common noise balancing only to capacitive sensor arrays that are specially designed for this purpose. For example, a capacitive fingerprint sensor array may have a grid design that can be used for: a) noise listening by balancing signals on the inputs of the differential receiver, and b) baseline compensation (removal) in conjunction with a hardware baseline compensation component. In some embodiments, such special sensor design may use RX reference electrodes to pickup noise without picking up the signal from a user's finger on the capacitive fingerprint sensor array. To illustrate such special designs, first a conventional sensing configuration for zero-sum MPRX excitation sequences is discussed with respect to FIG. 12.

Figure 12:
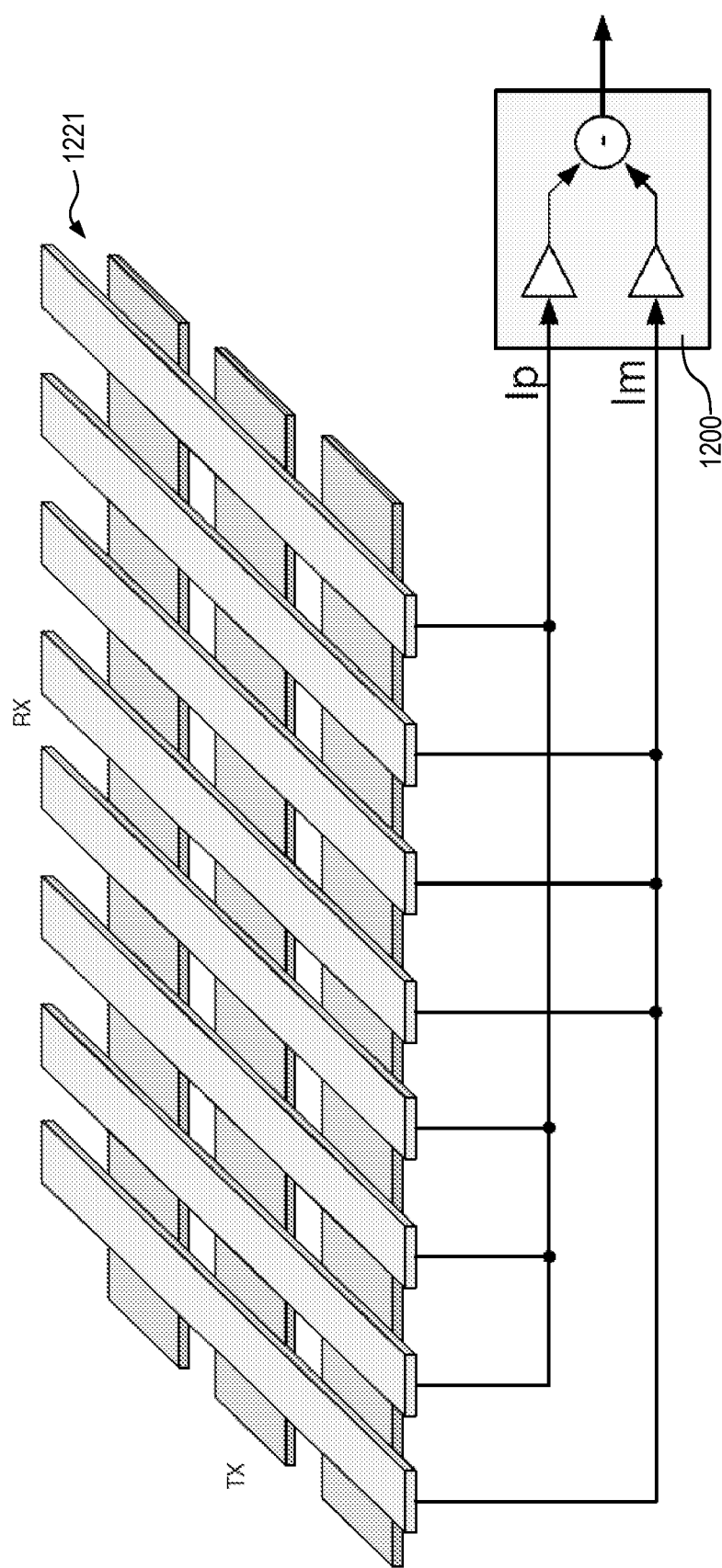
FIG. 12 illustrates an example of a conventional scanning configuration for zero-sum MPRX excitation sequences, according to some embodiments.

Referring to FIG. 12, processing device 1200 includes a differential receiver, which is coupled to capacitive fingerprint sensor array 1221 through an RX multiplexer (not shown). Capacitive fingerprint sensor array 1221 is similar to capacitive fingerprint sensor array 221 in FIGS. 2A/2B, and is configured as a grid of N RX electrodes and M TX electrodes. In FIG. 12, processing device 1200 uses a zero-sum RX excitation vector to multiplex RX output signals when performing scan operations in fully-differential multi-phase mode. The design configuration illustrated in FIG. 12 provides the best common-mode noise suppression for the capacitive fingerprint sensor system, as the configuration allows the differential receiver to suppress any noise in the measured output signals.

Figure 13:
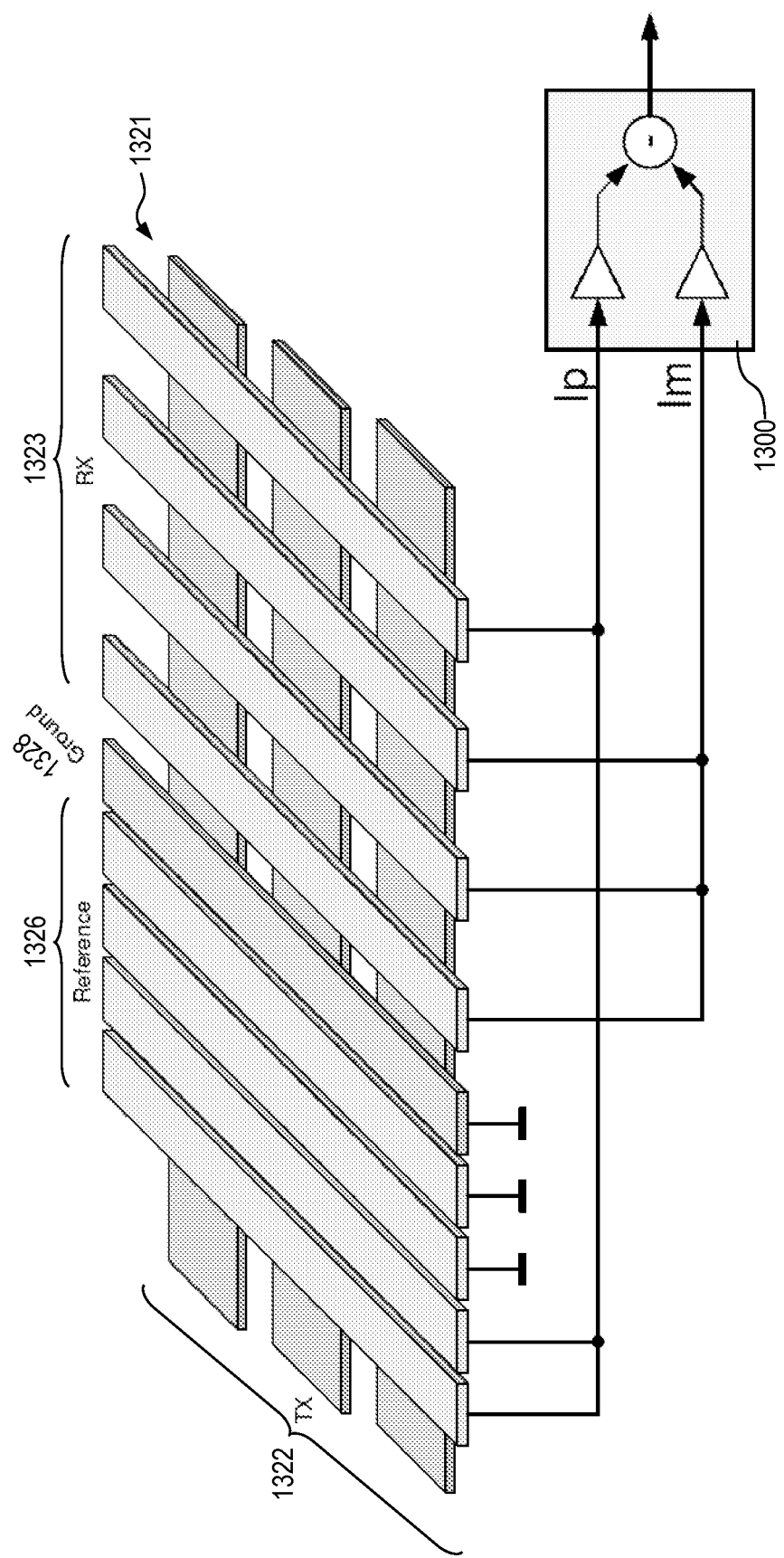
FIG. 13 illustrates an example sensor array design with reference electrodes, according to an example embodiment.

To achieve comparable common-noise suppression, some embodiments may provide special sensor array design that relies on use of reference electrodes. FIG. 13 illustrates an example sensor array design with reference and ground electrodes that can be used with non-zero sum excitation sequences. In FIG. 13, processing device 1300 is configured to use non-zero sum RX excitation sequences to multiplex RX output signals when performing scan operations in multi-phase mode. Processing device 1300 includes a differential receiver, which is coupled to capacitive fingerprint sensor array 1321 through an RX multiplexer (not shown). Capacitive fingerprint sensor array 1321 is configured as a grid of TX electrodes 1322, RX electrodes 1323, reference electrodes 1326, and one or more ground electrodes 1328. TX electrodes 1322 are disposed in one (e.g., horizontal) direction, while RX electrodes 1323, reference electrodes 1326, and ground electrode(s) 1328 are disposed in a different (e.g., vertical) direction. Reference electrodes 1326 and ground electrode(s) 1328 may all be disposed on one side of sensor array 1321 (e.g., as illustrated in FIG. 13), but it is noted that these electrodes may be disposed according to various alternative arrangements. The additional reference electrodes 1326 can sense finger noise, but putting a finger on them does not cause any useful signal change so the finger placement does not induce any output current when the TX electrodes are driven. Thus, a reference electrode 1326 serves three functions:
  a. a reference electrode catches any noise signals in same way as normal RX electrodes do to balance the noise level on the differential receiver inputs;
  b. a reference electrode provides TX signal balancing by compensating the difference between the number of RX electrodes coupled to the inverting and to the non-inverting differential receiver inputs based on the non-zero sum MPRX excitation sequences;
  c. a reference electrode does not sense any useful finger signal (e.g., a capacitance change between TX and RX electrodes due to the presence of a finger ridge or valley), and therefore does not add more unknowns in the system.

In FIG. 13, ground electrode(s) 1328 are configured to shield RX electrodes 1323 from reference electrodes 1326.

Figure 14:
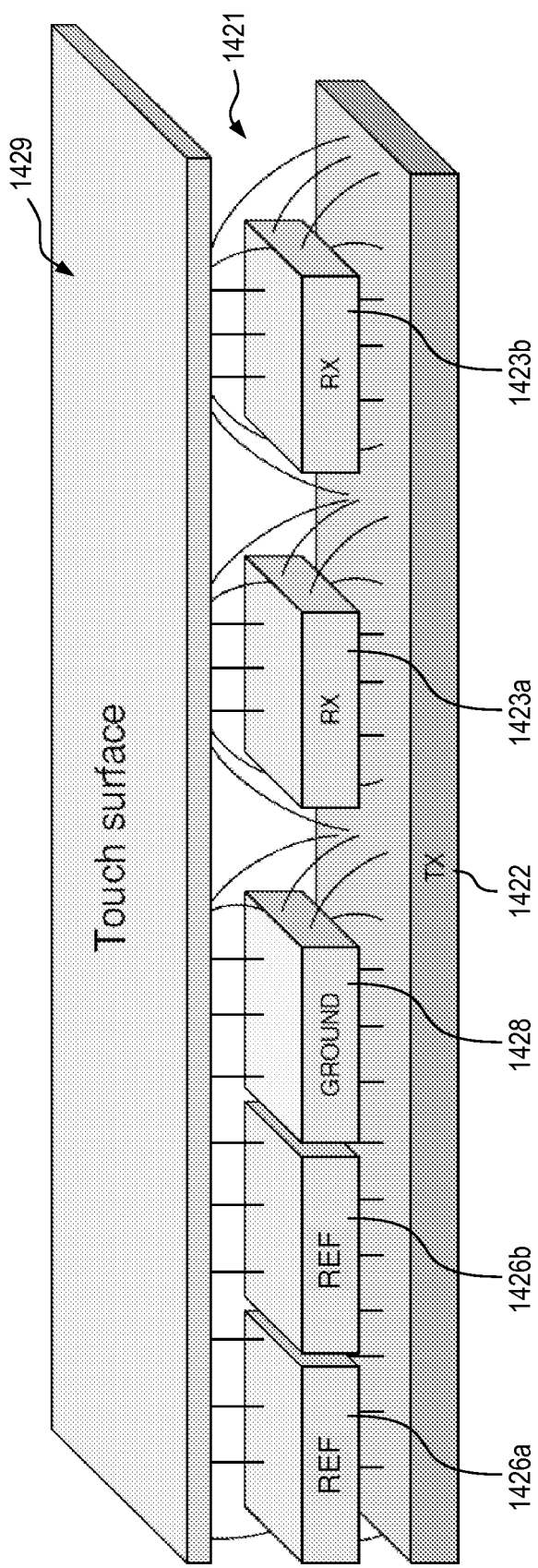
FIG. 14 illustrates electric field lines for a capacitive fingerprint sensor array with reference electrodes, according to an example embodiment.

In some embodiments, the reference electrodes in a capacitive fingerprint sensor array could be the same size and shape as normal RX electrodes, but may be separated by grounded electrodes to catch volumetric TX field lines that can otherwise reach the finger on the touch surface of the sensor array. This is illustrated in FIG. 14, which shows electric field lines for a sensor array with reference electrodes. In FIG. 14, capacitive fingerprint sensor array 1421 is disposed below touch surface 1429. For illustration purposes, FIG. 14 shows only a portion of capacitive fingerprint sensor array 1421 that includes TX electrode 1422, RX electrodes 1423a and 1423b, reference electrodes 1426a and 1426b, and ground electrode 1428. In the embodiment of FIG. 14, the distance between individual reference electrodes 1426a and 1426b should be smaller than electrode height, so the electric field from TX electrode 1422 does not reach the finger (not shown) in the area of touch surface 1429 over the reference electrodes (e.g., no field lines from TX electrode 1422 reach the area of touch surface 1429 that is over the reference electrodes, so no response signal would be caused by a finger in this area). At the same time, a reference electrode (e.g., 1426a, 1426b) provides almost the same TX-RX coupling as a normal RX electrode for the purpose of balancing the inputs to a differential receiver in a processing device. In some embodiments, the number of reference electrodes may be programmable to allow working (balancing) with different non-zero MPRX excitation sequences that have different sums.

Another alternative to using zero-sum excitation sequences are sensor array designs that provide TX compensation electrodes for use with non-zero sum excitation sequences. For example, in some embodiments it is possible to operate a fully-balanced (zero-sum current) TX driver by using non-zero sum MPTX excitation sequences with the help of additional compensation electrodes that can compensate for current injected in the RX electrodes due the imbalance between the number of the positive and the negative TX electrodes that are being driven. Current injected in TX compensation electrodes should not change in the sensor array area of a finger's touch, so the sensor array design should not allow a finger to cross the electric field lines of the TX compensation electrodes. To achieve this, in some embodiments the TX compensation electrodes could be buried in the internal sensor layers (where this is appropriate) or could be protected by ground lines on the top layer to prevent catching of the TX electrode field lines by a finger. An example of the latter design is illustrated in FIG. 15.

Figure 15:
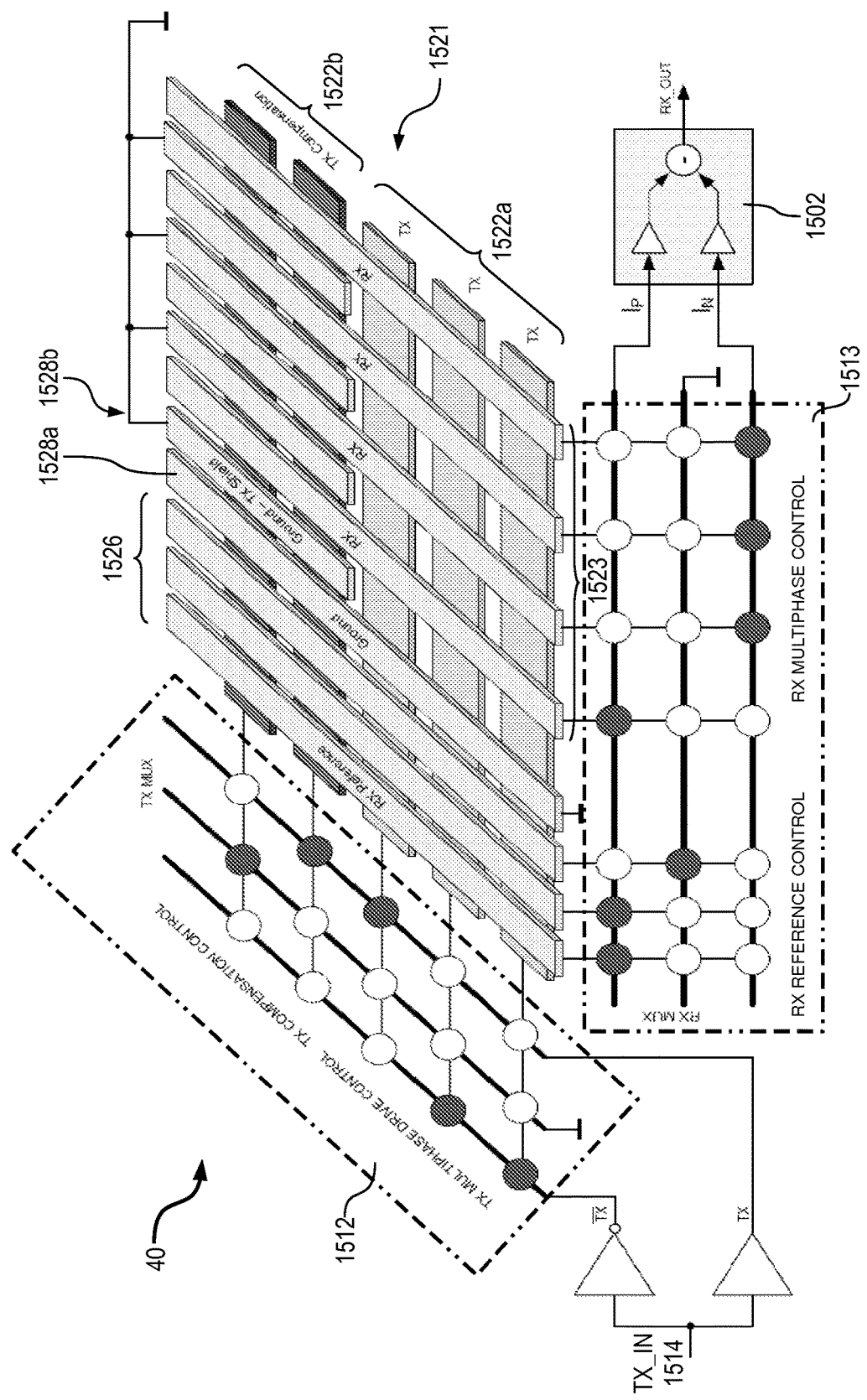
FIG. 15 illustrates an example design of a capacitive fingerprint sensor array that is suitable for use with non-zero sum TX and RX excitation sequences, according to an example embodiment.

FIG. 15 illustrates sensor system 40 that is suitable for use with non-zero sum TX excitation sequences and non-zero sum RX excitation sequences. Sensor system 40 includes differential receiver 1502, TX multiplexer 1512, RX multiplexer 1513, and capacitive fingerprint sensor array 1521. Differential receiver 1502 is coupled to capacitive fingerprint sensor array 1521 through RX multiplexer 1513. TX multiplexer 1512 is coupled to capacitive fingerprint sensor array 1521. TX multiplexer 1512 is also coupled to a signal generator (not shown) to receive TX drive signals 1514 that are applied to TX electrodes 1522a and 1522b in multi-phase mode based on non-zero sum TX excitation sequences. When applied to TX electrodes 1522a and 1522b, the TX drive signals induce output signals on RX electrodes 1523. RX multiplexer 1513 is configured to multiplex the output signals from multiple RX electrodes to the inputs of differential receiver 1502 in multi-phase mode based on non-zero sum RX excitation sequences.

Capacitive fingerprint sensor array 1521 has a design that includes both RX reference electrodes and TX compensation electrodes. As illustrated in FIG. 15, capacitive fingerprint sensor array 1521 is configured as a grid of regular TX electrodes 1522a, TX compensation electrodes 1522b, RX electrodes 1523, RX reference electrodes 1526, ground electrode 1528a, and (four) TX-shield electrodes 1528b. Regular TX electrodes 1522a and TX compensation electrodes 1522b are disposed in one (e.g., horizontal) direction. RX electrodes 1523, RX reference electrodes 1526, ground electrode 1528a, and TX-shield electrodes 1528b are disposed in a different (e.g., vertical) direction. Reference electrodes 1526 and ground electrode 1528a are disposed on one side of sensor array 1521. Similarly to the sensor array design in FIG. 14, in the sensor array design of FIG. 15 the distance between individual RX reference electrodes 1526 is smaller than electrode height in order to prevent a finger-caused response signal in this area of sensor array 1521. Ground electrode 1528a is configured to shield RX electrodes 1523 from RX reference electrodes 1526. TX compensation electrodes 1522b are disposed on one side of sensor array 1521. TX-shield electrodes 1528b are disposed partially into sensor array 1521 and over TX compensation electrodes 1522b. Thus, as illustrated in FIG. 15, portions of RX reference electrodes 1526, a portion of ground electrode 1528, and the TX-shield electrodes 1528b are disposed to protect the electric field lines of the TX compensation electrodes 1522b by being crossed by a finger on the touch surface of sensor array 1521.

The sensor array design in the embodiment of FIG. 15 illustrates how a capacitive fingerprint sensor array may be configured for use with non-zero sum TX and RX excitation sequences:
1. A fully-balanced TX drive is formed using a non-zero MPTX excitation sequence with length 3 and sum 1 with the help of one active TX compensation electrode in order to get zero input current per each RX electrode. This is illustrated by the connection settings in TX multiplexer 1512, where a solid circle indicates a connection and a white circle indicates no connection.
2. A fully-balanced RX sense is formed by using a non-zero MPRX excitation sequence with length 4 and sum 2 with the help of 2 RX reference electrodes to get a zero input current per a pair of differential RX output signals. This is illustrated by the connection settings in RX multiplexer 1513, where a solid circle indicates a connection and a white circle indicates no connection.

It is noted that not all image reconstruction methods described herein may be used for RX and TX configurations without reference electrodes or compensation electrodes, and vice versa. Table 1 below shows a compatibility grid of various fingerprint and touch reconstruction methods for a hardware configuration that allows for zero current (e.g., fully-differential) MPTX, MPRX and combined MPRX/MPTX scanning.

TABLE 1

Zero Current Combined MPRX/MPTX Options

| | Linear Equations Set | Works with Non-Zero Sum Excitation Sequences? | RX Configuration | TX Configuration | Fingerprint Application Usage | Touch Application Usage |
|---|---|---|---|---|---|---|
| 1 | Full | Yes | With additional reference electrodes | With additional compensation electrodes | Yes | No |
| 2 | Reduced | No | No addition electrodes | No addition electrodes | Yes | Yes |

Examples of Sensing Grid Excitation with Polarity Switching

The sensing grid excitation technique with polarity switching described herein is also referred to as a solution to the unmatched receiver gains problem. Such problem may exist in some embodiments that use gain amplifiers coupled to the inputs of a differential amplifier in the receiver channel. For example, in the embodiment of FIG. 3, the Gp and Gm gain amplifiers 309a and 309b are connected to the inputs of differential amplifier 304. In real hardware, however, gain amplifiers that match exactly are typically unknown and commonly the gains of these amplifiers are not equal, e.g., Gp≠-Gm. This gain mismatch causes a mismatch problem between a deconvolved (recovered) image and the original image. One of the sources of this mismatch problem may be a differential Band Pass Filter (BPF) in which, due to component tolerances and/or filter implementation particularities, the gains for the positive and negative branches are different.

An example of this problem is described below based on a multi-phase RX scanning technique. When there is a gain mismatch, the hardware scan (convolution) is performed with gains Gp=1+d and Gm=−1, where d is some deviation. In this case, the excitation vector Er_Vect may be expressed as illustrated in Equation 13 below:

$$Er\_Vect = [1 + d\ 0\ \ldots\ 0\ -1\ 0\ \ldots\ 0] \quad \text{(Eq. 13)}$$

However, the operations at the deconvolution stage consider that Gp=+1 and Gm=−1. As a result, the original/detected image X is convolved (convoluted) based on excitation vector Er_Vect=[1+d 0 . . . 0 −1 0 . . . 0] vector, and is deconvolved (deconvoluted) based on excitation vector Er_Vect=[1 0 . . . 0 −1 0 . . . 0]. This will cause distortion in the recovered image.

There may be two solutions to this problem:
1) determine Gp and Gm experimentally and use them at the deconvolution stage;
2) use an alternating connection of the differential receiver to specified RX electrodes with inverting of the polarity switching circuits.

The first solution needs periodical measuring of the Gp and Gm coefficients of the gain amplifiers and taking these coefficients into account at the deconvolution stage. The second solution requires a double scan of each sensor array element with normal and inverted polarity, but always using Gp=−Gm at the deconvolution stage. An example of the latter solution is illustrated in the method of FIG. 16.

Figure 16:
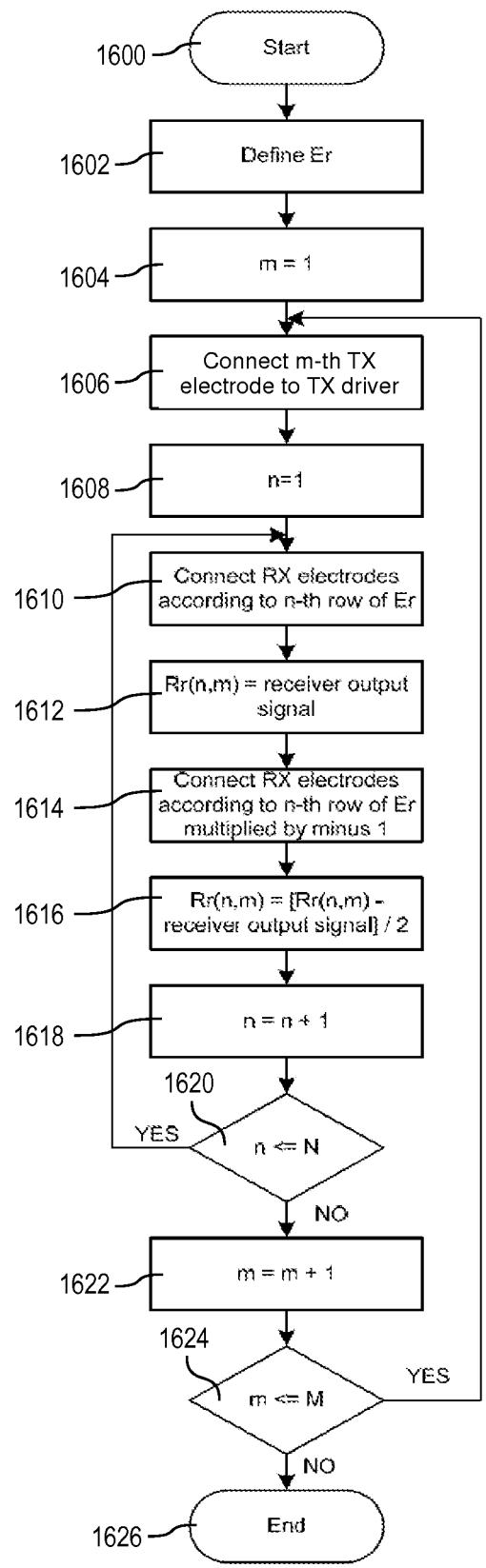
FIG. 16 illustrates an example method of excitation (convolution) for multi-phase RX scanning with polarity switching, according to an example embodiment.

FIG. 16 illustrates an example method of excitation (convolution) for multi-phase RX scanning with alternating of polarity at each sensor element (e.g., each sensor element is scanned twice with opposite polarity). The operations of the method in FIG. 16 are described as being performed by a processing device or component(s) thereof (e.g., such as processing device 200 or its TX multiplexer 212. RX multiplexer 213 and deconvolution engine 236 in FIGS. 2A/2B). It is noted, however, that various implementations and embodiments may use various, and possibly multiple, components to perform the operations of the method in FIG. 16. For example, in various embodiments a processing device may be configured with firmware instructions which, when executed by one or more processors or other hardware components (e.g., microcontrollers, ASICs, and the like) are operable to perform the operations of the method in FIG. 16. In another example, in various embodiments a processing device may be implemented in a single IC component or its functionality may be spread across two or more IC components that may perform some additional operations and functionalities. In addition, in some embodiments the method in FIG. 16 can be performed by a processing device to scan a contact by a conductive object (e.g., a stylus or finger) on a capacitive touch sensor array. Thus, the description hereinafter, of the method in FIG. 16 as being performed by a processing device and/or for fingerprint image reconstruction, is to be regarded in an illustrative rather than a restrictive sense.

Referring to FIG. 16, in operation 1600 a processing device starts the excitation (convolution) for a multi-phase RX scan operation on a capacitive fingerprint sensor array that has N RX electrodes and M TX electrodes. In operation 1602, the processing device initializes (or otherwise defines) an RX excitation matrix Er, and stores the excitation matrix in volatile or non-volatile memory. For example, according to the techniques described herein, the processing device may generate the excitation matrix Er based on circular rotation of a zero-sum excitation vector Er_Vect. In operation 1604, the processing device initializes to 1 a current-electrode variable (e.g., "m"), which indicates the current TX electrode that is to be driven by the processing device as part of the scan operation.

In operation 1606, the processing device couples the current (e.g, "m-th") TX electrode to a TX driver, while the other TX electrodes are coupled to the system ground (or to another reference signal). For example, the processing device may configure a TX multiplexer to connect the current (e.g., "m-th") TX electrode to a TX driver while connecting the rest of the TX electrodes to the system ground. In operation 1608, the processing device that initializes to 1 a current-row variable (e.g., "n"), which denotes the current time slot during which multiple RX electrodes are to be sensed in accordance with the current (e.g., "n-th") row of the excitation matrix Er.

In operation 1610, the processing device connects multiple RX electrodes to a differential receiver of the processing device in accordance with the current (e.g., "n-th") row of the excitation matrix Er. For example, the processing device may configure an RX multiplexer according to control signals that are defined by the data elements in the current row of the excitation matrix Er. The RX multiplexer couples a number of RX electrodes to the non-inverting input of the differential receiver, switches the polarity of and couples the same number of RX electrodes to the inverting input of the differential receiver, and couples any remaining RX electrodes to the system ground (or to another reference signal). In operation 1612, the differential receiver in the processing device receives an output signal, and processes the output signal to generate a digital value Rr(n, m). The digital value for the received output signal is a convoluted representation of the unknown mutual capacitance at a sensor element located at the N-th row and M-th column of the sensor array. The processing device stores the generated digital value at the corresponding entry (e.g., (n, m)) in the output signal matrix Rr, and proceeds with operation 1614.

In operation 1614, the processing device performs another scan on the same RX electrodes that were scanned in operations 1610 and 1612, but with switched polarity. For example, in operation 1614 the processing device connects the same multiple RX electrodes (as in operation 1610) to the differential receiver in accordance with the current (e.g., "n-th") row of the excitation matrix Er that is multiplied by −1 (which reverses the RX electrode connections' polarity). In operation 1616, the differential receiver in the processing device receives an output signal, and processes the output signal to re-compute a digital value for the sensor element at the N-th row and M-th column of the sensor array. A new digital value for the sensor element is then generated by subtracting the re-computed digital value from the stored digital value (which was computed in operation 1612) and then dividing the result by 2, e.g., $$\text{new } Rr(n, m) = \frac{Rr(n, m) - \text{recomputed } Rr(n, m)}{2}.$$

The new digital value for the sensor element is a convoluted representation of the unknown mutual capacitance of the sensor element, but it has been corrected to eliminate the distortion caused by the deviation d that represents the gain amplifiers' mismatch. The processing device stores the new digital value at the corresponding entry (e.g., (n, m)) in the output signal matrix Rr, and proceeds with operation 1618.

In operation 1618, the processing device increments the current-row variable (e.g., "n") to indicate the next row in the excitation matrix Er (e.g., to indicate the next time slot for sensing RX electrodes based on the current TX electrode). In operation 1620, the processing device checks whether the incremented current-row variable is less than or equal to the number of rows N in the excitation matrix Er. If the incremented current-row variable is less than or equal to N, the processing device determines that some more RX electrodes still need to be scanned based on the current TX electrode, so the processing device continues to repeat operations 1610, 1612, 1614, 1616, 1618, and 1620 for the next row in the excitation matrix Er. If in operation 1620 the processing device determines that the incremented current-row variable is greater than the number of rows N in the excitation matrix Er, the processing device determines that it has scanned all RX electrodes based on the current TX electrode, so the processing device continues with operation 1622.

In operation 1622, the processing device increments the current-electrode variable (e.g., "m") to indicate the next TX electrode that is to be coupled to the TX driver and energized for scanning. In operation 1624, the processing device checks whether the incremented current-electrode variable is less than or equal to the number M of TX electrodes in the capacitive fingerprint sensor array. If the incremented current-electrode variable is less than or equal to M, the processing device determines that some more TX electrodes still need to be driven, so the processing device continues to repeat operations 1606, 1608, 1610, 1612, 1614, 1616, 1618, 1620, 1622, and 1624 for the next TX electrode. If in operation 1624 the processing device determines that the incremented current-electrode variable is greater than the number M of the TX electrodes, the processing device determines that the scanning of all TX electrodes has been completed and all digital values for output signal matrix Rr have been generated. The processing device then continues with operation 1626 to end the current scan cycle of the scan operation and to proceed with other operations. After the output signal matrix Rr has been generated in this manner, the matrix may be deconvoluted to generate a fingerprint image by using the method in FIG. 6B.

Figure 19:
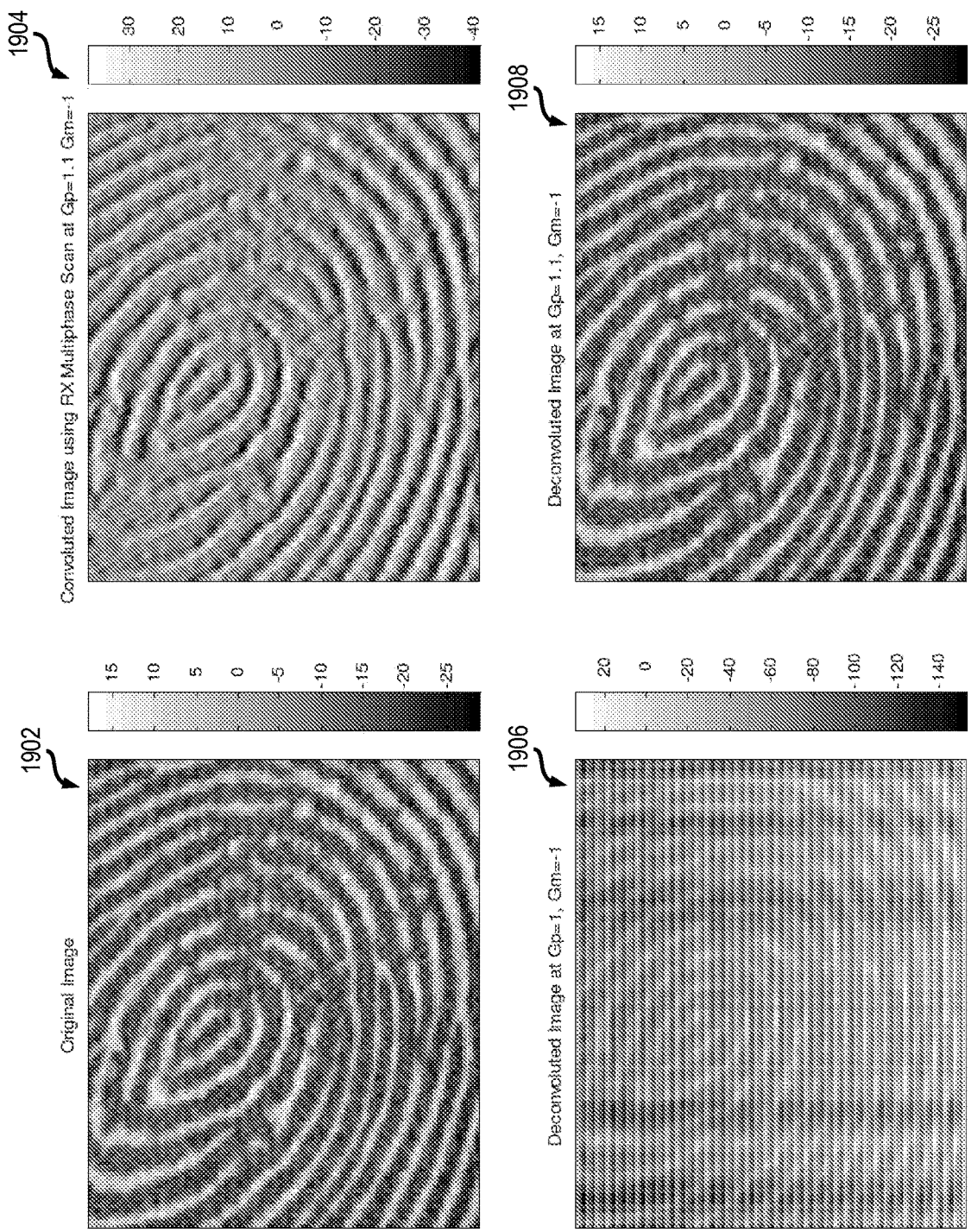
FIG. 19 illustrates the impact of unmatched gains to the quality of a generated fingerprint image, according to an example embodiment.

FIG. 19 illustrates the impact of unmatched gains (e.g., Gp≠−Gm) to the quality of a generated fingerprint image. In FIG. 19, image 1902 shows the original fingerprint that is being scanned. Image 1904 shows a fingerprint image that is convoluted with Gp=1.1 and Gm=−1 (e.g., the gain Gp is deviated by d=10%). If the operations at the deconvolution stage generate an image by considering that the receiver gains are balanced (e.g., Gp=−Gm), then a distorted image is obtained as illustrated in image 1906. But if polarity switching is used in the operations of the convolution stage (e.g., according to the method of FIG. 16), the image quality of the generated fingerprint image is noticeably increased, as illustrated by image 1908.

The method of FIG. 16 provides compensation for unmatched amplifier gains because each sensor element is scanned twice with polarity switching. Thus, the operations at the deconvolution stage can consider the gains to be matched, e.g., Gp=−Gm, without image quality distortion. It is noted that use of the method in FIG. 16 avoids the need for gains' tuning at the deconvolution stage.

Post-Processing Quality Improvement with Baseline Compensation

Some embodiments may achieve image quality improvement by using baseline compensation (in firmware or software) during post-processing operations. Post-processing operations refer to operations that are performed after a fingerprint image is generated according to the techniques described herein, or is otherwise acquired, by a processing device.

Figure 17:
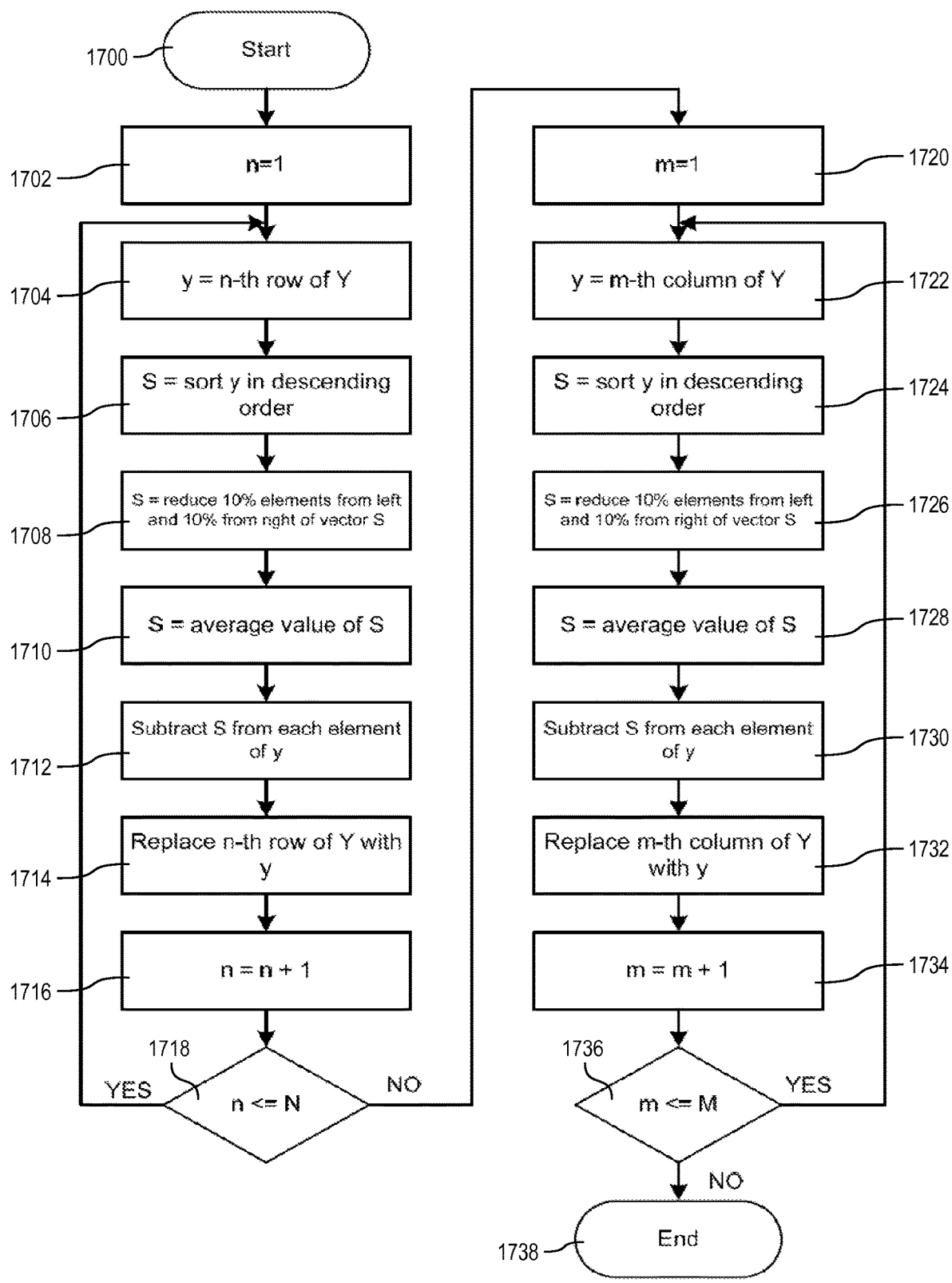
FIG. 17 illustrates an example method of post-processing baseline compensation, according to an example embodiment.

In some embodiments, performing the excitation (convolution) and the deconvolution based on zero-sum excitation vectors may cause a loss of baseline information and may distort the acquired images. In such embodiments, only the contrast through specified RX or TX electrodes may be recovered. To address these issues, the techniques described herein provide a partial baseline recovery procedure as illustrated in FIG. 17. It is noted that the method of FIG. 17 does not provide exactly the same baseline values as in the original image, but it recovers baseline values that are about the same as in the original image, thereby providing noticeable improvement to the quality of the recovered image.

FIG. 17 illustrates an example method of post-processing baseline compensation. The operations of the method in FIG. 17 are described as being performed by a processing device. It is noted, however, that various implementations and embodiments may use various, and possibly multiple, components to perform the operations of the method in FIG. 17. For example, in various embodiments a processing device may be configured with firmware or software instructions which, when executed by one or more processors or other hardware components (e.g., microcontrollers, ASICs, and the like) are operable to perform the operations of the method in FIG. 17. In another example, in various embodiments a processing device may be implemented in a single IC component or its functionality may be spread across two or more IC components that may perform some additional operations and functionalities. In addition, in some embodiments the method in FIG. 17 can be performed by a processing device to process the scan results from a capacitive touch sensor array. Thus, the description hereinafter, of the method in FIG. 17 as being performed by a processing device and/or for fingerprint images, is to be regarded in an illustrative rather than a restrictive sense.

Prior to the start of operation 1700, a fingerprint image has been generated according to the techniques described herein. For example, a processing device has generated and stored (e.g., in volatile or non-volatile memory) a recovered image matrix Y. The recovered image matrix Y represents a fingerprint image that has been acquired by the processing device from a capacitive fingerprint sensor array that has N RX electrodes and M TX electrodes. Thus, the recovered image matrix Y has N rows and M columns, with the data elements therein representing the measured mutual capacitances of the sensor elements formed at the intersections of the RX electrodes and the TX electrodes of the sensor array.

Referring to FIG. 17, in operation 1700 a processing device starts the baseline compensation procedure. In operation 1702, the processing device initializes to 1 a current-row variable (e.g., "n"), which indicates the current row of image matrix Y.

In operation 1704, the processing device accesses the vector (e.g., "y") that is formed by the data elements in the current row of image matrix Y as indicated by the current-row variable "n". In operation 1706, the processing device sorts the data elements of vector "v" in descending order, to obtain a sorted vector "S". In operation 1708, the processing device removes (reduces) 10% of the data elements from the left end of the sorted vector "S" and also removes 10% of the data elements from the right end of the sorted vector "S", to obtain a reduced vector "S". In this manner, the highest-valued 10% and the lowest-valued 10% of the data elements in vector "y" are removed from the subsequent operation that computes a compensation value for this vector "y". In operation 1710, an average value (e.g., "$S_{AVG}$") is computed from the data elements in the reduced vector "S", e.g., the data elements in the reduced vector are summed up and the sum is divided by the number of the data elements to obtain the average value "$S_{AVG}$". The computed average value "$S_{AVG}$" represents the compensation value for vector "y". In operation 1712, the average value "$S_{AVG}$" is subtracted from each data element of vector "y", to obtain a compensated vector "y". In operation 1714, the current (e.g., "n-th") row in image matrix Y is replaced with the data elements of compensated vector "y".

In operation 1716, the processing device increments the current-row variable (e.g., "n") to indicate the next row in the recovered image matrix Y. In operation 1718, the processing device checks whether the incremented current-row variable is less than or equal to the number of rows N in the image matrix Y. If the incremented current-row variable is less than or equal to N, the processing device determines that some more rows from matrix Y need to be processed, so the processing device continues to repeat operations 1704, 1706, 1708, 1710, 1712, 1714, 1716, and 1718 for the next row in matrix Y. If in operation 1718 the processing device determines that the incremented current-row variable is greater than the number of rows N in matrix Y, the processing device determines that it has processed all rows of matrix Y and continues with operation 1720.

In operation 1720, the processing device initializes to 1 a current-column variable (e.g., "m"), which indicates the current column of image matrix Y.

In operation 1722, the processing device accesses the vector (e.g., "y") that is formed by the data elements in the current column of image matrix Y as indicated by the current-column variable "m". In operation 1724, the processing device sorts the data elements of vector "y" in descending order, to obtain a sorted vector "S". In operation 1726, the processing device removes (reduces) 10% of the data elements from the left end of the sorted vector "S" and also removes 10% of the data elements from the right end of the sorted vector "S", to obtain a reduced vector "S". In this manner, the highest-valued 10% and the lowest-valued 10% of the data elements in vector "y" are removed from the subsequent operation that computes a compensation value for this vector "y". In operation 1728, an average value (e.g., "$S_{AVG}$") is computed from the data elements in the reduced vector "S", e.g., the data elements in the reduced vector are summed up and the sum is divided by the number of the data elements to obtain the average value "$S_{AVG}$". The computed average value "$S_{AVG}$" represents the compensation value for vector "y". In operation 1730, the average value "$S_{AVG}$" is subtracted from each data element of vector "v", to obtain a compensated vector "y". In operation 1732, the current (e.g., "m-th") column in image matrix Y is replaced with the data elements of compensated vector "y".

In operation 1734, the processing device increments the current-column variable (e.g., "m") to indicate the next column in the recovered image matrix Y. In operation 1736, the processing device checks whether the incremented current-column variable is less than or equal to the number of columns M in the image matrix Y. If the incremented current-column variable is less than or equal to M, the processing device determines that some more columns from matrix Y need to be processed, so the processing device continues to repeat operations 1722, 1724, 1726, 1728, 1730, 1732, 1734, and 1736 for the next column in matrix Y. If in operation 1736 the processing device determines that the incremented current-column variable is greater than the number of columns M in matrix Y, the processing device determines that it has processed all columns of matrix Y. The processing device then continues with operation 1738 to end the baseline compensation procedure and to proceed with other post-processing operations (if any). At the end of the baseline compensation procedure, the digital values in the recovered image matrix Y include baseline values that are about the same as the baseline values that were lost in the scan of the capacitive fingerprint sensor array. In this manner, the quality of the recovered image is improved.

Figure 18:
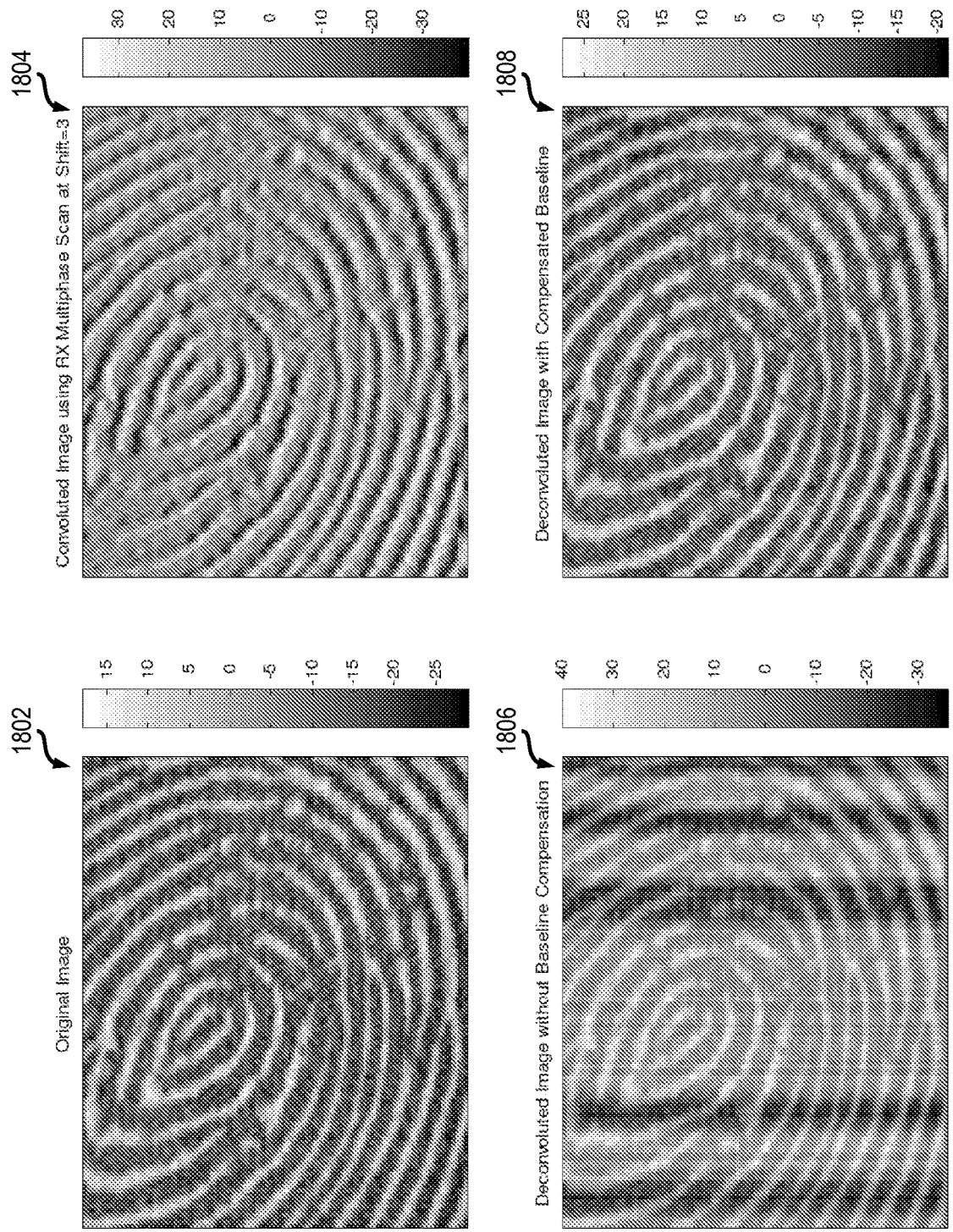
FIG. 18 illustrates the impact of post-processing baseline compensation on the quality of a generated fingerprint image, according to an example embodiment.

FIG. 18 illustrates the impact of the post-processing baseline compensation method of FIG. 17 to the quality of a generated fingerprint image. In FIG. 18, image 1802 shows the original fingerprint that is being scanned. Image 1804 shows a convoluted image generated by using multi-phase RX scanning. Image 1806 is the deconvoluted image 1804 without post-processing baseline compensation being applied. As can be seen, image 1806 has visible artifacts. Image 1808 is the deconvoluted image 1804 to which post-processing baseline compensation has been applied. As can be seen in image 1808, the post-processing baseline compensation procedure has removed the undesirable image artifacts.

Example of Image Reconstruction Using
Pseudo-Random Sequences

According to the techniques described herein, some embodiments may use multi-phase (RX or TX) scanning in combination with fingerprint image reconstruction that is based on pseudo-random excitation sequences. It is noted that these embodiments do not require solving a system of full or reduced set of linear equations.

For example, in some embodiments that use multi-phase RX scanning, an RX excitation matrix may be generated not based on a user-designed zero-sum excitation vector (e.g., such as Er_Vect) as described heretofore, but rater on an excitation vector that is generated by applying an autocorrelation function to a pseudo-random sequence having data elements of +1 and −1. In these embodiments, the RX electrodes are multiplexed to a differential receiver of a processing device according to the RX excitation matrix, thereby generating an output signal matrix with convoluted digital values. A recovered image matrix representing a detected/sensed fingerprint image is then generated based on a multiplication product of the convoluted output signal matrix and a transpose matrix of the excitation matrix, thereby effectively deconvoluting the digital values stored in the convoluted output signal matrix. In embodiments that use multi-phase TX scanning, a TX excitation matrix may be generated based on a pseudo-random sequence and an autocorrelation function in a similar manner, and the TX excitation matrix may be used in a similar manner to generate a recovered image matrix representing the fingerprint image.

In some embodiments, the excitation vector for an RX or TX excitation matrix may be based on a pseudorandomly-generated sequence with an autocorrelation function (ACF) that is close to the delta function. A detected/sensed fingerprint image is deconvoluted by multiplying a convoluted output signal matrix to the transpose matrix of the RX or TX excitation matrix. For example, an RX excitation vector may be generated by applying an autocorrelation function to a pseudorandom sequence of a given length N that corresponds to the number of the RX electrodes in a capacitive fingerprint sensor array. The excitation vector obtained in this manner may be circularly rotated (as described heretofore) in order to generate an RX excitation matrix. The multiplication product of this pseudo-random sequence circular rotation matrix on its transposed matrix is a matrix in which the same largest values are located on the diagonal only. In other words, such excitation matrix could be used for deconvolution and fingerprint image reconstruction since its properties are close to the properties of a Hadamard matrix, e.g., as defined by $H \cdot H^T = nl$.

Figure 20:
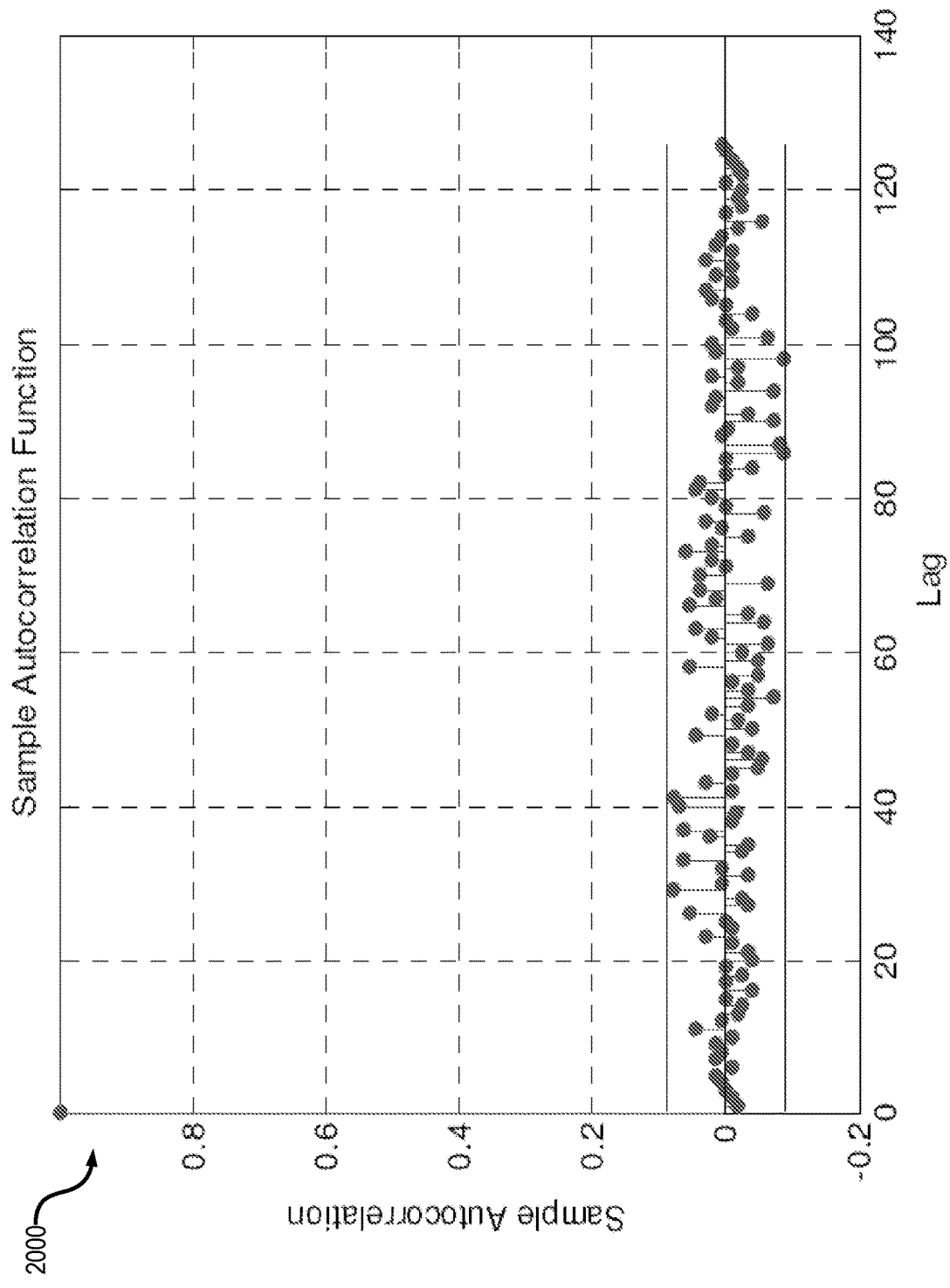
FIG. 20 illustrates a plot of an autocorrelation (ACF) function for a pseudo-random M-sequence with length 127, according to an example embodiment.

The use of excitation vectors generated based on a pseudo-random sequence as described herein provides image reconstruction with accuracy that is comparable to the techniques described herein that rely on solving a system of full or reduced set of linear equations. For example, if M-sequences have a repeating length of $2^N - 1$ and the number of data elements valued at +1 exceeds by one the number of data elements valued at −1, their sum is always equal to 1. Since the autocorrelation function (ACF) has side peaks with amplitude not more than $$\frac{1}{\sqrt{N}},$$

the function value is reduced when the sequence length increases (which is a very useful feature for capacitive fingerprint sensor arrays that typically have a hundred or more sensor elements). This is illustrated in FIG. 20, which shows graph 2000 of an ACF for a pseudo-random M-sequence with length 127.

Figure 21:
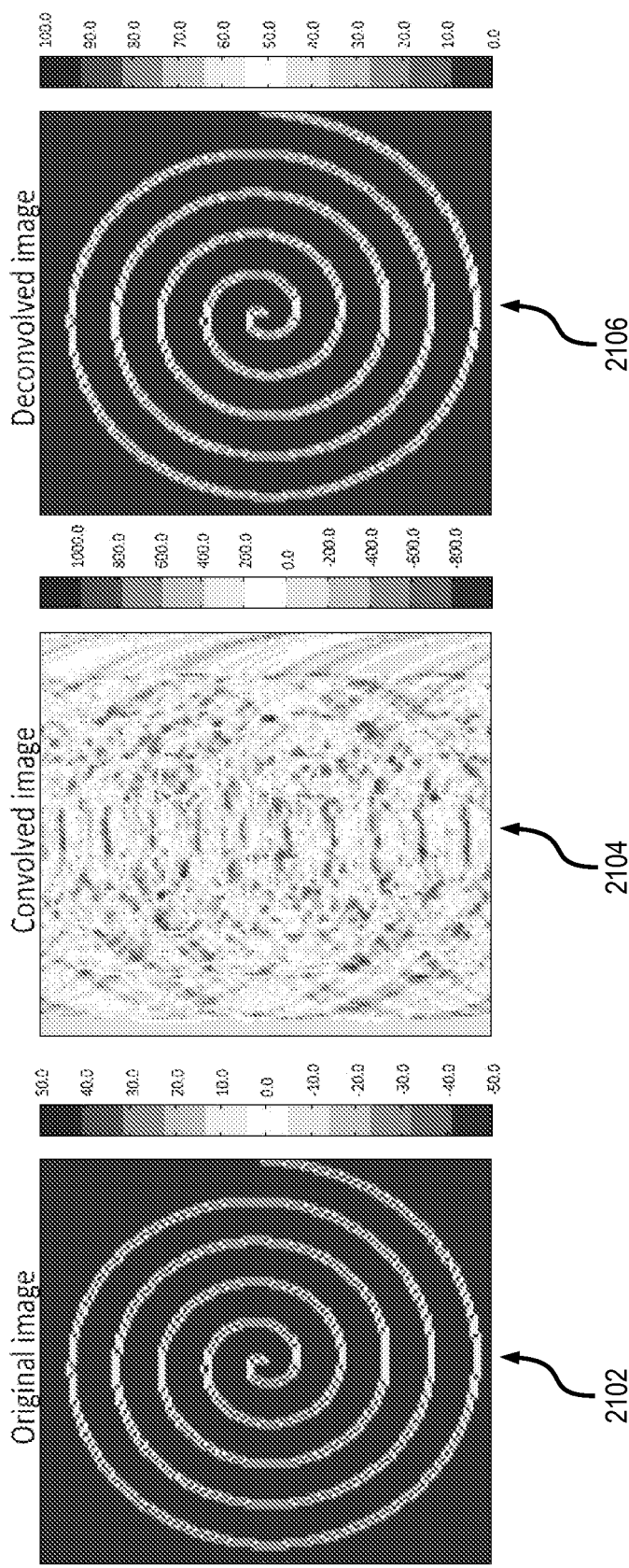
FIG. 21 illustrates an example image reconstruction by using multi-phase RX scanning based on a pseudo-random M-sequence with length of 127.

Some embodiments that use a pseudo-random sequence with and an autocorrelation function to generate an excitation matrix may achieve fingerprint image reconstruction results comparable to the other techniques described herein, but at a lower cost. For example, such embodiments typically use matrix multiplication operations that only multiply by a factor of ±1. Thus, these embodiments may employ a lower cost deconvolution engine that does not use hardware multiplier elements or circuits. This is illustrated in FIG. 21, which shows image reconstruction by using MPRX scanning based on a pseudo-random M-sequence with length of 127. As can be seen in FIG. 21, the original image 2102 is comparable in quality and accuracy with the deconvoluted image 2106 (with the convoluted image 2104 being also provided for illustration purposes).

Examples of Post-Processing Operations and Improvements

Various post-processing actions and operations may be performed based on a fingerprint image generated according to the techniques described herein. In some embodiments, a processing device or a host application (e.g., that runs on a computer system) may use the fingerprint image to authenticate a user. For example, the processing device or host application may compare the fingerprint image to images in a fingerprint database by using various fingerprint matching algorithms such as, for example, pattern-based algorithms (which compare basic fingerprint patterns such as arch, whorl, and loop), minutiae-based algorithms (which compare lower-level features, called minutiae, determined by singularities in finger ridge patterns), and the like.

Various embodiments of the techniques for multi-phase scanning in fingerprint and touch applications described herein provide some of the following improvements when compared to conventional techniques:

noise immunity improvement for common mode noise (due to noise suppression by the differential receiver used in various embodiments);

non-common mode noise reduction due to use of multi-phase drive/sense techniques, resulting in better fingerprint image in terms of Signal-to-Noise Ratio (SNR);

non-common mode noise immunity improvement due to a larger dynamic range of the differential receiver's sensing circuits;

lower internal noise due to absence of baseline compensation circuits, which can generate additional noise (e.g., in embodiments that do not use hardware elements to perform baseline compensation);

improved quality of the acquired fingerprint image due to better SNR;

improved quality of the fingerprint image due to less quantization noise in the conversion circuits because of the absence of the baseline capacitance component in the RX output signals;

improved False Acceptance Rate (FAR)/False Rejection Rate (FRR) due to better quality of the acquired fingerprint image;

reduced scanning time and power consumption due to using multi-phase scanning technique for archiving just signals with good enough SNR;

enabling the use of capacitive fingerprint scanning for navigation sensors, where the short conversion time for generating a fingerprint image allows scanning to be performed much faster and to cover larger sensor array area, which in turn results in improved movement detection (e.g., displacement) by correlation techniques or other methods that are applied on the fingerprint image post-processing (generally, navigation sensor refers to a sensor that translates movement into displacement—e.g., such as translating the movement of a finger to a displacement at a particular position on a touch-screen; translating the movement of a mouse to a pointer position on a computer screen, etc).

Various embodiments of the techniques for multi-phase scanning of fingerprint and touch sensor arrays described herein may include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. e.g., such as volatile memory and/or non-volatile memory. These instructions may be used to program one or more devices that include one or more general-purpose or special-purpose processors (e.g., such as CPUs) or equivalents thereof (e.g., such as processing cores, processing engines, microcontrollers, and the like), so that when executed by the processor(s) or the equivalents thereof, the instructions cause the device(s) to perform the described operations for multi-phase scanning described herein. A computer-readable medium may also include one or more mechanisms for storing or transmitting information in a form (e.g., software, processing application, etc.) that is readable by a machine (e.g., such as a device or a computer). The non-transitory computer-readable storage medium may include, but is not limited to, electromagnetic storage medium (e.g., floppy disks, hard disks, and the like), optical storage medium (e.g., CD-ROM), magneto-optical storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the method(s) herein are shown and described in a particular order, in some embodiments the order of the operations of each method may be altered so that certain operations may be performed in an inverse order or so that certain operation may be performed, at least in part, concurrently and/or in parallel with other operations. In other embodiments, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   receiving, by a processing device, a plurality of measurements that is representative of a portion of a finger on a capacitive fingerprint sensor array;
   wherein the plurality of measurements is obtained from sensor elements of the capacitive fingerprint sensor array in a multi-phase scan based on an excitation vector generated by applying an autocorrelation function to a pseudo-random sequence;
   generating, by the processing device, a fingerprint image for the portion of the finger based on the plurality of measurements.

2. The method of claim 1, wherein the plurality of measurements represents mutual capacitances measured at the sensor elements of the capacitive fingerprint sensor array.

3. The method of claim 1, wherein the fingerprint image is a set of data values that represents in digital format a fingerprint for the portion of the finger.

4. The method of claim 1, wherein the pseudo-random sequence has data elements of +1 and 1.

5. The method of claim 4, wherein the excitation vector represents polarities of control signals applied to multiplex multiple electrodes of the sensor elements.

6. The method of claim 1, wherein the sensor elements of the capacitive fingerprint sensor array include receive (RX) electrodes, and the method further comprises:
   generating an RX excitation matrix based on the excitation vector; and
   multiplexing the RX electrodes to one or more differential receivers of the processing device according to the RX excitation matrix.

7. The method of claim 6, wherein generating the fingerprint image comprises:
   generating, based on the plurality of measurements, an output signal matrix with convoluted digital values; and
   generating a recovered image matrix representing the fingerprint image based on a multiplication product of the output signal matrix and a transpose matrix of the RX excitation matrix.

8. The method of claim 1, wherein the sensor elements of the capacitive fingerprint sensor array include transmit (TX) electrodes, and the method further comprises:
   generating a TX excitation matrix based on the excitation vector; and
   driving the TX electrodes according to the TX excitation matrix.

9. The method of claim 8, wherein generating the fingerprint image comprises:
   generating, based on the plurality of measurements, an output signal matrix with convoluted digital values; and
   generating a recovered image matrix representing the fingerprint image based on a multiplication product of the output signal matrix and a transpose matrix of the TX excitation matrix.

10. The method of claim 1, wherein the sensor elements of the capacitive fingerprint sensor array include transmit (TX) electrodes and receive (RX) electrodes, and the method further comprises:
    generating a TX excitation matrix based on the excitation vector;
    generating an RX excitation matrix based on the excitation vector;
    driving the TX electrodes according to the TX excitation matrix; and
    multiplexing the RX electrodes to one or more differential receivers of the processing device according to the RX excitation matrix;
    wherein generating the fingerprint image comprises:
       generating, based on the plurality of measurements, an output signal matrix with convoluted digital values; and
       generating a recovered image matrix representing the fingerprint image based on a multiplication product of the output signal matrix and a transpose matrix of the TX excitation matrix or of the RX excitation matrix.

11. A system comprising:
    a capacitive fingerprint sensor array; and
    a processing device coupled to the capacitive fingerprint sensor array, the processing device configured at least to:
       perform a multi-phase scan of the capacitive fingerprint sensor array based on an excitation vector generated by applying an autocorrelation function to a pseudo-random sequence;
       receive a plurality of measurements that represents a portion of a finger on the capacitive fingerprint sensor array; and
       generate a fingerprint image for the portion of the finger based on the plurality of measurements.

12. The system of claim 11, wherein the plurality of measurements represents mutual capacitances measured at sensor elements of the capacitive fingerprint sensor array.

13. The system of claim 11, wherein the fingerprint image is a set of data values that represents in digital format a fingerprint for the portion of the finger.

14. The system of claim 11, wherein the pseudo-random sequence has data elements of +1 and 1.

15. The system of claim 14, wherein the excitation vector represents polarities of control signals applied to multiplex multiple electrodes of the capacitive fingerprint sensor array.

16. The system of claim 11, wherein the capacitive fingerprint sensor array includes receive (RX) electrodes, and the processing device is configured to:
    generate an RX excitation matrix based on the excitation vector; and
    multiplex the RX electrodes to one or more differential receivers according to the RX excitation matrix.

17. The system of claim 16 wherein, to generate the fingerprint image, the processing device is configured at least to:
    generate, based on the plurality of measurements, an output signal matrix with convoluted digital values; and
    generate a recovered image matrix representing the fingerprint image based on a multiplication product of the output signal matrix and a transpose matrix of the RX excitation matrix.

18. The system of claim 11, wherein the capacitive fingerprint sensor array includes transmit (TX) electrodes, and the processing device is configured to:
    generate a TX excitation matrix based on the excitation vector; and
    drive the TX electrodes according to the TX excitation matrix.

19. The system of claim 18 wherein, to generate the fingerprint image, the processing device is configured at least to:
- generate, based on the plurality of measurements, an output signal matrix with convoluted digital values; and
- generate a recovered image matrix representing the fingerprint image based on a multiplication product of the output signal matrix and a transpose matrix of the TX excitation matrix.

20. The system of claim 11, wherein the capacitive fingerprint sensor array includes transmit (TX) electrodes and receive (RX) electrodes, and the processing device is configured to:
- generate a TX excitation matrix based on the excitation vector;
- generate an RX excitation matrix based on the excitation vector;
- drive the TX electrodes according to the TX excitation matrix; and
- multiplex the RX electrodes according to the RX excitation matrix;
- wherein, to generate the fingerprint image, the processing device is configured at least to:
  - generate, based on the plurality of measurements, an output signal matrix with convoluted digital values; and
  - generate a recovered image matrix representing the fingerprint image based on a multiplication product of the output signal matrix and a transpose matrix of the TX excitation matrix or of the RX excitation matrix.

* * * * *